US012565098B2

(12) United States Patent (10) Patent No.: US 12,565,098 B2

Boyd (45) Date of Patent: Mar. 3, 2026

(54) EMERGENCY STOP SWITCHES FOR ELECTRIC VEHICLE

(71) Applicant: KUBOTA CORPORATION, Osaka (JP)

(72) Inventor: David Boyd, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 229 days.

(21) Appl. No.: 18/379,802

(22) Filed: Oct. 13, 2023

(65) Prior Publication Data

US 2025/0121684 A1 Apr. 17, 2025

(51) Int. Cl.
B60K 28/00 (2006.01)

(52) U.S. Cl.
CPC ........ B60K 28/00 (2013.01); *B60K 2028/006* (2013.01)

(58) Field of Classification Search
CPC . B60K 28/00; B60K 2028/006; B60L 3/0023; B60L 2250/12; B60L 2250/24; B60L 3/04; H01H 9/36; H01H 1/64; H01H 77/108; H01H 1/2083
See application file for complete search history.

(56) References Cited

U.S. PATENT DOCUMENTS

2024/0401307 A1 12/2024 Ishii et al.

FOREIGN PATENT DOCUMENTS

| CN | 115503755 | * | 12/2022 | ........... B60W 30/18 |
|---|---|---|---|---|
| DE | 102019208200 | A1 | 12/2020 | |
| EP | 3932721 | A1 | 1/2022 | |
| EP | 4349669 | A1 | 4/2024 | |
| WO | 2023188636 | A1 | 10/2023 | |

OTHER PUBLICATIONS

Official Communication issued in corresponding European Patent Application No. 24202831.4, mailed on Mar. 11, 2025, 12 pages.
Official Communication issued in corresponding European Patent Application No. 24202831.4, mailed on Mar. 19, 2025, 2 pages.
Official Communication issued in corresponding European Patent Application No. 24202831.4, mailed on Apr. 23, 2025, 2 pages.
Solectrac Electric Tractors: "How to: Operate the battery cutoff switch", https://www.youtube.com/watch?v=j59-hPkKhEo, Jul. 21, 2022, 1 page.

* cited by examiner

*Primary Examiner* — Ahmed M Saeed
(74) *Attorney, Agent, or Firm* — Keating & Bennett, LLP

(57) ABSTRACT

An electric vehicle (EV) includes a battery pack, an electric motor, an inverter connected to the electric motor, a power distribution unit (PDU) connected to the battery pack and the inverter, and at least one EV emergency stop switch configured to disconnect the battery pack from the power distribution unit (PDU) when the at least one EV emergency stop switch is activated. The first EV emergency stop switch is located at a front surface of the EV.

15 Claims, 61 Drawing Sheets

REAR ← → LEFT

RIGHT ← → FRONT

REAR ◄──────► FRONT

FRONT ◄────► REAR

151

106

10

26

45

FRONT

LEFT

RIGHT

REAR

FIG. 2

C: CONTRACTOR $I_s$: CURRENT SENSOR

DCFC: DC FAST CHARGE CONNECTOR

1: INVERTER PRECHARGE
2: A/C (X)
3: DCDC (Y)
4: OBC/DCDC (U)

DCFC: DC FAST CHARGE CONNECTOR
INV: INVERTER
IVT: HIGH PRECISION CURRENT MEASUREMENT

▭ I  CURRENT SENSOR        ◯ CONTACTOR      ⌢⌣⌢⌣ FUSE
◯ C  CONTACTOR 13 (13A)

13 (13B)

10

13B

10B

EV-ES$_3$

DBW-ES    DAB

LRF

EV ESB$_4$

FRONT    RIGHT

LEFT    REAR

FRONT

REAR

RIGHT ←——→ LEFT

Front of Vehicle

EMERGENCY STOP SWITCHES FOR ELECTRIC VEHICLE

BACKGROUND OF THE INVENTION

1. Field of the Invention

The present invention is directed to emergency stop (E-stop) switches for an electric vehicle (EV), such as an electric tractor.

2. Description of the Related Art

Electric vehicles (EVs) are becoming more prevalent as the industry moves from internal combustion engines towards fully electrically powered motors running on battery systems. In order to provide fully electrically powered agricultural work vehicles, such as a tractor, high voltage battery systems are required. The present inventor(s) have contrived novel configurations that fulfill a need to provide safety measures including emergency stop (E-stop) switches for such electrically powered agricultural work vehicles.

SUMMARY OF THE INVENTION

Preferred embodiments of the present invention provide one or more emergency stop (E-stop) switches of an electric vehicle that allows a person to safely disable or shutdown the electric vehicle while the vehicle is moving and unmanned.

An electric vehicle (EV) according to a preferred embodiment of the present invention includes a battery pack, an electric motor, an inverter connected to the electric motor, a power distribution unit (PDU) connected to the battery pack and the inverter, and a first EV emergency stop switch configured to disconnect the battery pack from the power distribution unit (PDU) when the at least one EV emergency stop switch is activated. The first EV emergency stop switch is located at a front surface of the EV.

In an EV according to a preferred embodiment of the present invention, the first EV emergency stop switch is located at a side corner portion of the EV.

In an EV according to a preferred embodiment of the present invention, the first EV emergency stop switch is located at side corner portion of the EV, and the first EV emergency stop switch extends at an angle of less than about 90 degrees and greater than about 45 degrees with respect to a front-rear direction of the EV.

An electric vehicle (EV) according to a preferred embodiment of the present invention includes a second EV emergency stop switch located at a rear surface of the EV, and the second EV emergency stop switch configured to disconnect the battery pack from the power distribution unit (PDU) when the second EV emergency stop switch is activated.

In an EV according to a preferred embodiment of the present invention, the second EV emergency stop switch is located on a right rear fender of the EV or a left rear fender of the EV.

An electric vehicle (EV) according to a preferred embodiment of the present invention includes a second EV emergency stop switch located at a side surface of the EV, and the second EV emergency stop switch configured to disconnect the battery pack from the power distribution unit (PDU) when the second EV emergency stop switch is activated.

In an EV according to a preferred embodiment of the present invention, the second EV emergency stop switch is located on a cabin frame beam of the EV.

An electric vehicle (EV) according to a preferred embodiment of the present invention includes a second EV emergency stop switch located at a left side surface of the EV, a third EV emergency stop switch located at a right side surface of the EV, and a fourth EV emergency stop switch located at a rear surface of the EV. Each of the second, third, and fourth EV emergency stop switch is configured to disconnect the battery pack from the power distribution unit (PDU) when the at least one EV emergency stop switch is activated.

In an EV according to a preferred embodiment of the present invention, each of the first, second, third, and fourth EV emergency stop switch is configured to disconnect the battery pack from the power distribution unit (PDU) when the at least one EV emergency stop switch is activated by opening contactors in the battery pack and contactors in the PDU.

In an EV according to a preferred embodiment of the present invention, the first EV emergency stop switch is configured to disconnect the battery pack from the power distribution unit (PDU) when the first EV emergency stop switch is activated by opening contactors in the battery pack and contactors in the PDU.

An electric vehicle (EV) according to a preferred embodiment of the present invention includes a drive-by-wire (DBW) system including a first mode of operation and a second mode of operation, and a DBW emergency stop switch configured to switch the drive-by-wire (DBW) system from the first mode of operation to the second mode of operation when the DBW emergency stop switch is activated.

In an EV according to a preferred embodiment of the present invention, the DBW emergency stop switch is located on a dashboard of the EV.

In an EV according to a preferred embodiment of the present invention, in the first mode of operation, the drive-by-wire (DBW) system controls functions of steering, braking, and acceleration of the EV, and in the second mode of operation, drive-by-wire (DBW) functions of steering, braking, and acceleration of the EV are disabled.

An electric vehicle (EV) according to a preferred embodiment of the present invention includes a battery pack, a power distribution unit (PDU) connected to the battery pack, a first EV emergency stop switch located at a front surface of the EV, a second EV emergency stop switch located at a left side surface of the EV, a third EV emergency stop switch located at a right side surface of the EV, and a fourth EV emergency stop switch located at a rear surface of the EV. Each of the first, second, third, and fourth EV emergency stop switch is configured to disconnect the battery pack from the power distribution unit (PDU) when the first, second, third, or fourth EV emergency stop switch is activated.

In an EV according to a preferred embodiment of the present invention, the first EV emergency stop switch is located at a side corner portion of the EV.

In an EV according to a preferred embodiment of the present invention, the first EV emergency stop switch is located at side corner portion of the EV, and the first EV emergency stop switch extends at an angle of less than about 90 degrees and greater than about 45 degrees with respect to a front-rear direction of the EV.

In an EV according to a preferred embodiment of the present invention, the third emergency stop switch is located on a left cabin frame beam of the EV, and the fourth emergency stop switch is located on a right cabin frame beam of the EV.

In an EV according to a preferred embodiment of the present invention, each of the first, second, third, and fourth EV emergency stop switch is configured to disconnect the battery pack from the power distribution unit (PDU) when the first, second, third, or fourth EV emergency stop switch is activated by opening contactors in the battery pack and contactors in the PDU.

An electric vehicle (EV) according to a preferred embodiment of the present invention includes a drive-by-wire (DBW) system including a first mode of operation and a second mode of operation, and a DBW emergency stop switch configured to switch the drive-by-wire (DBW) system from the first mode of operation to the second mode of operation when the DBW emergency stop switch is activated. The DBW emergency stop switch is located on a dashboard of the EV.

In an EV according to a preferred embodiment of the present invention, in the first mode of operation, the drive-by-wire (DBW) system controls functions of steering, braking, and acceleration of the EV. In the second mode of operation, drive-by-wire (DBW) functions of steering, braking, and acceleration of the EV are disabled.

Electric vehicles (EVs) according to preferred embodiments of the present invention as described above provide one or more emergency stop (E-stop) switches of an electric vehicle that allows a person to safely disable or shutdown the electric vehicle while the vehicle is moving and unmanned.

The above and other features, elements, steps, configurations, characteristics, and advantages of the present invention will become more apparent from the following detailed description of preferred embodiments of the present invention with reference to the attached drawings.

BRIEF DESCRIPTION OF THE DRAWINGS

FIG. 1C shows a perspective left-rear view of an electric vehicle according to a preferred embodiment of the present invention.

FIG. 2 shows a block diagram of an electrical sub-system of an electric vehicle according to a preferred embodiment of the present invention.

DETAILED DESCRIPTION OF PREFERRED EMBODIMENTS

Figure 1A:
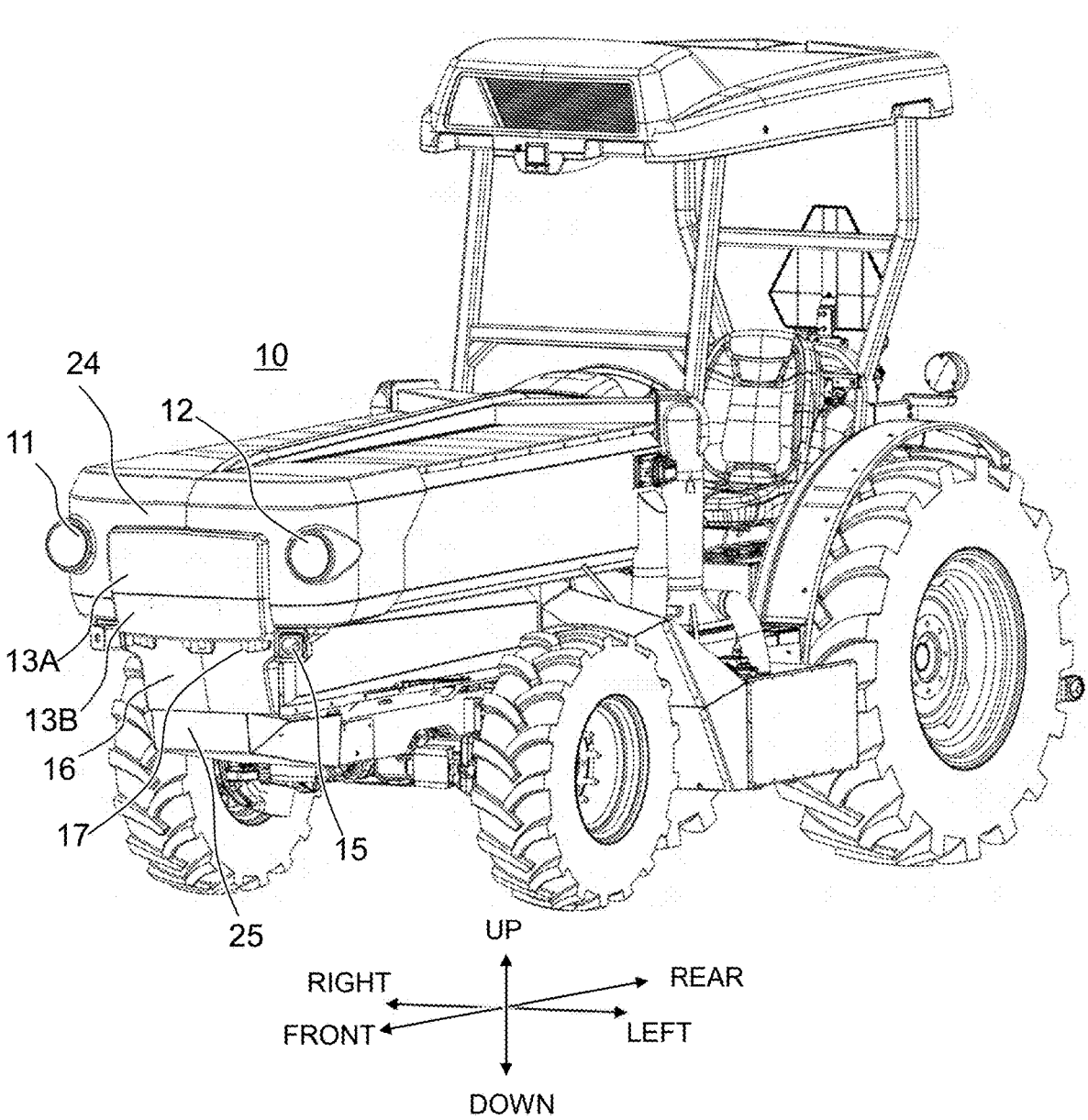
FIG. 1A shows a perspective left-front view of an electric vehicle according to a preferred embodiment of the present invention.

Hereinafter, preferred embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

Electric vehicles according to preferred embodiments of the present invention may be a tractor or other agricultural vehicle, but any desirable type of electric vehicle is applicable to and usable with preferred embodiments of the present invention.

Figure 1B:
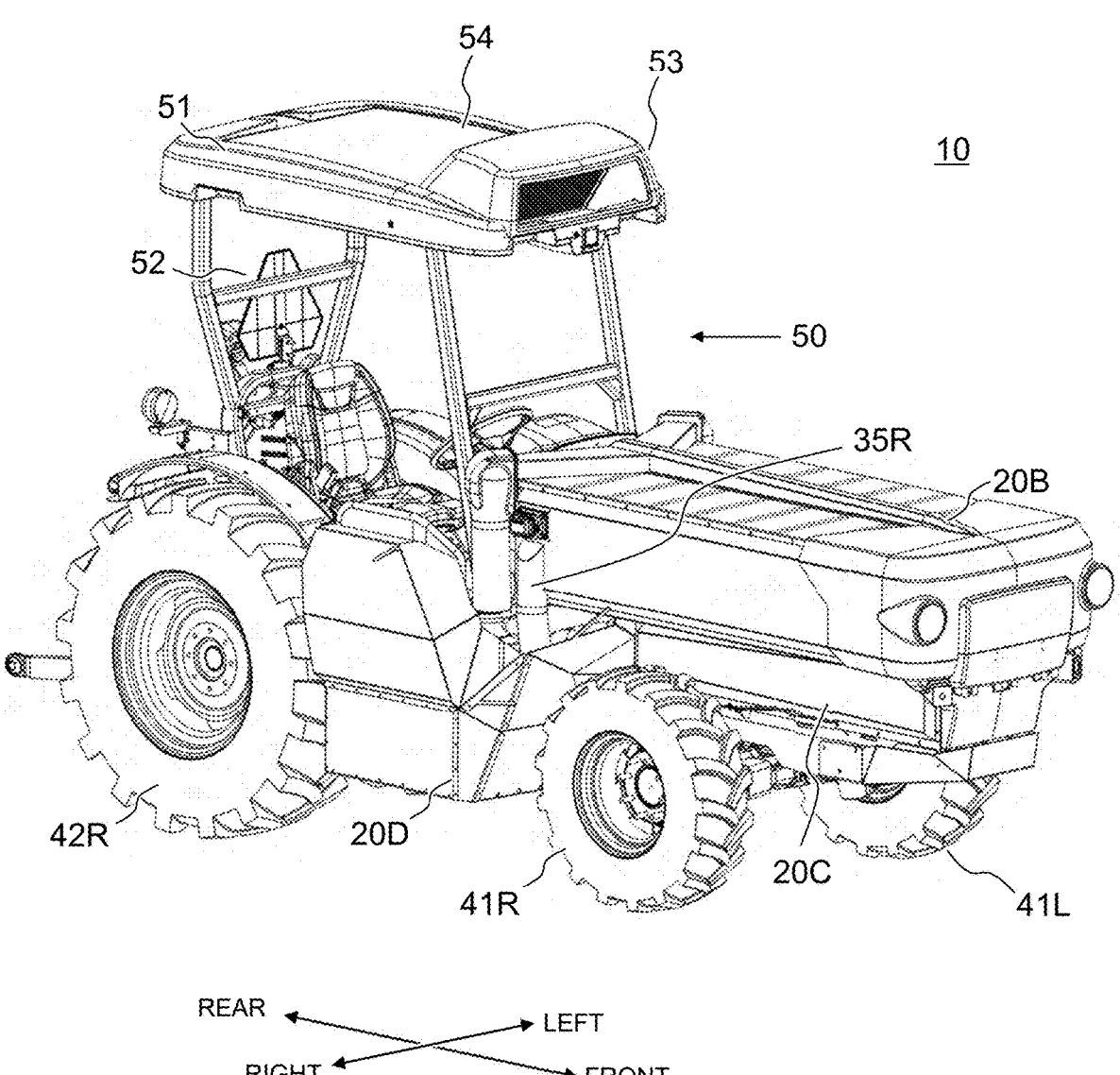
FIG. 1B shows a perspective right-front view of an electric vehicle according to a preferred embodiment of the present invention.
Figure 1C:
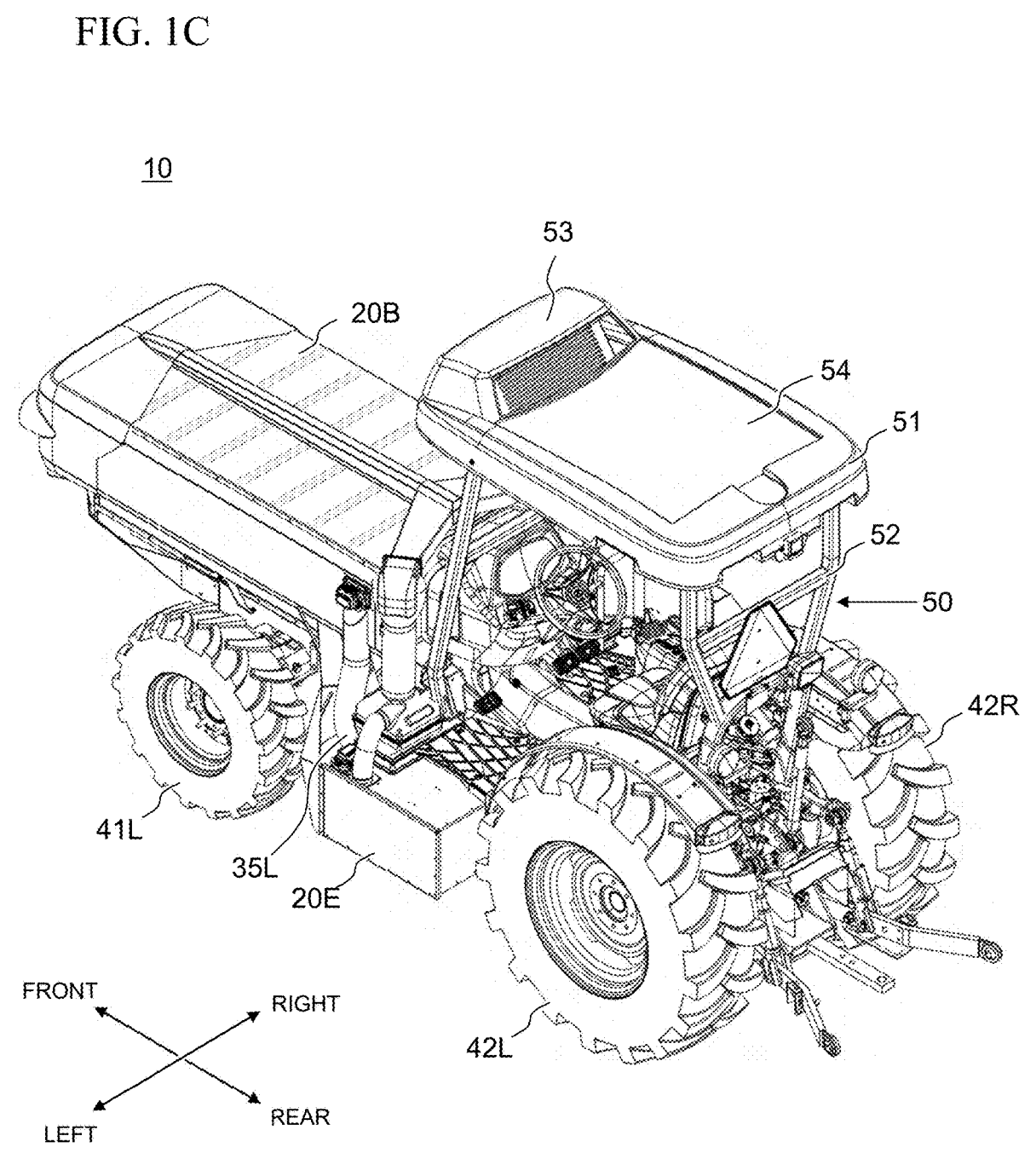
Figure 1D:
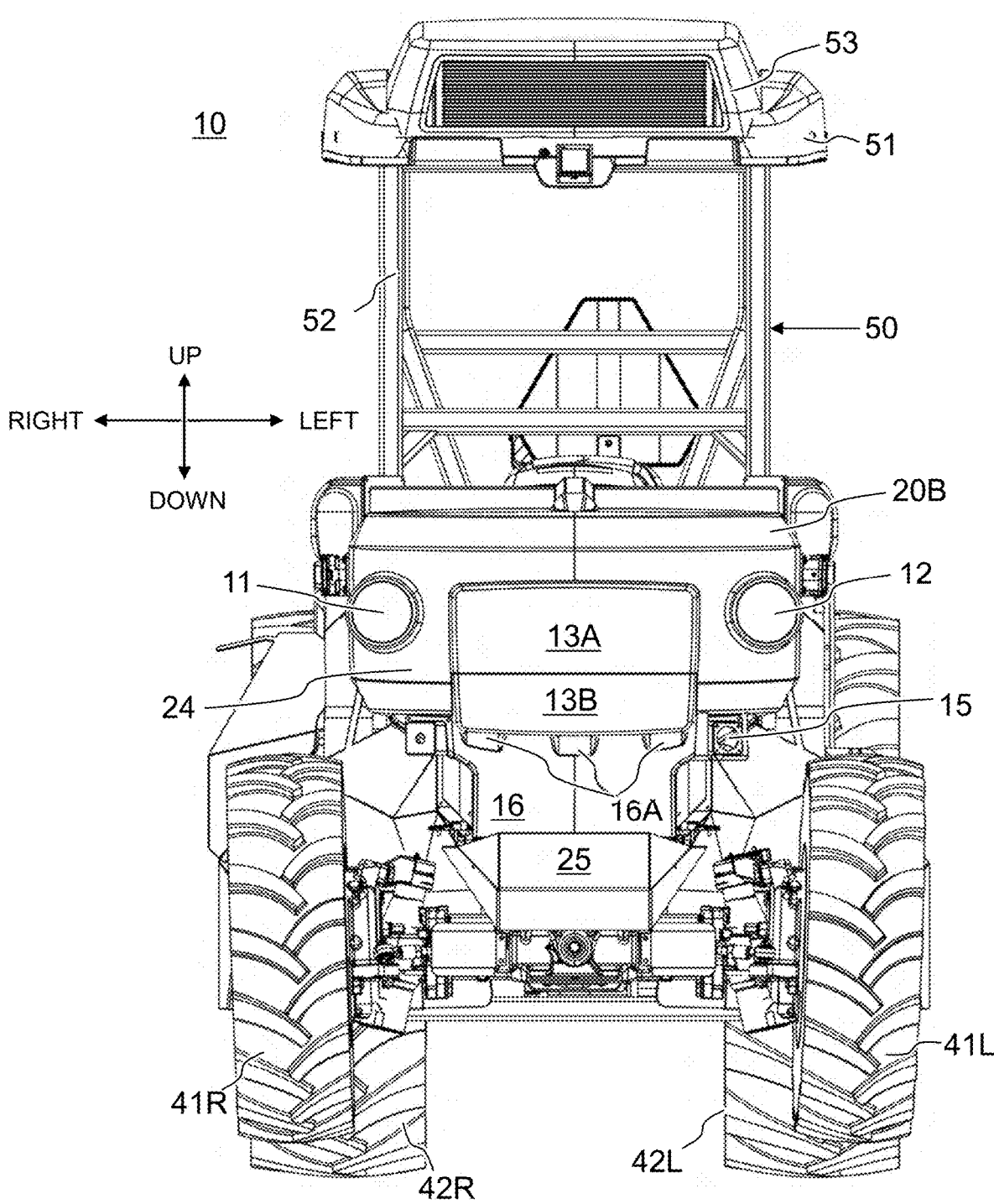
FIG. 1D shows a front facing view of an electric vehicle according to a preferred embodiment of the present invention.
Figure 1E:
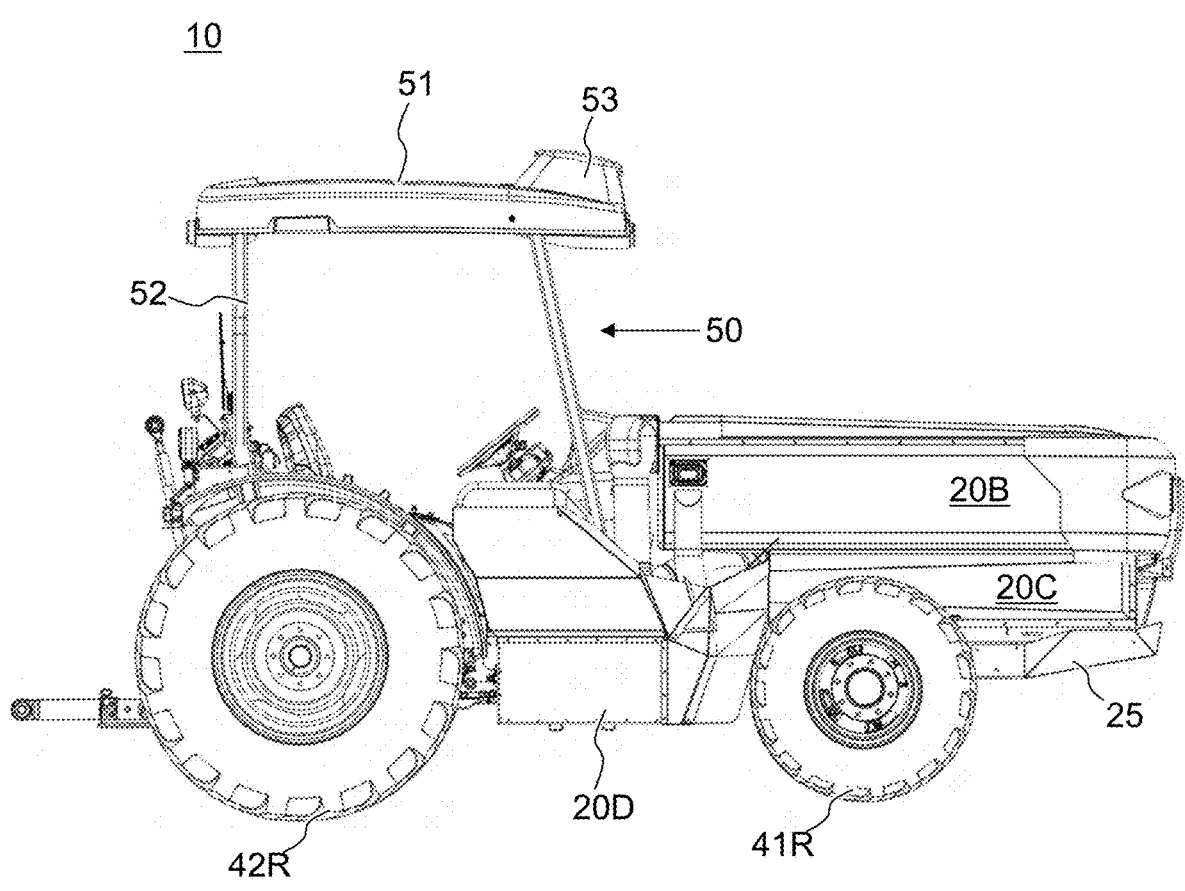
FIG. 1E shows a right side view of an electric vehicle according to a preferred embodiment of the present invention.
Figure 1F:
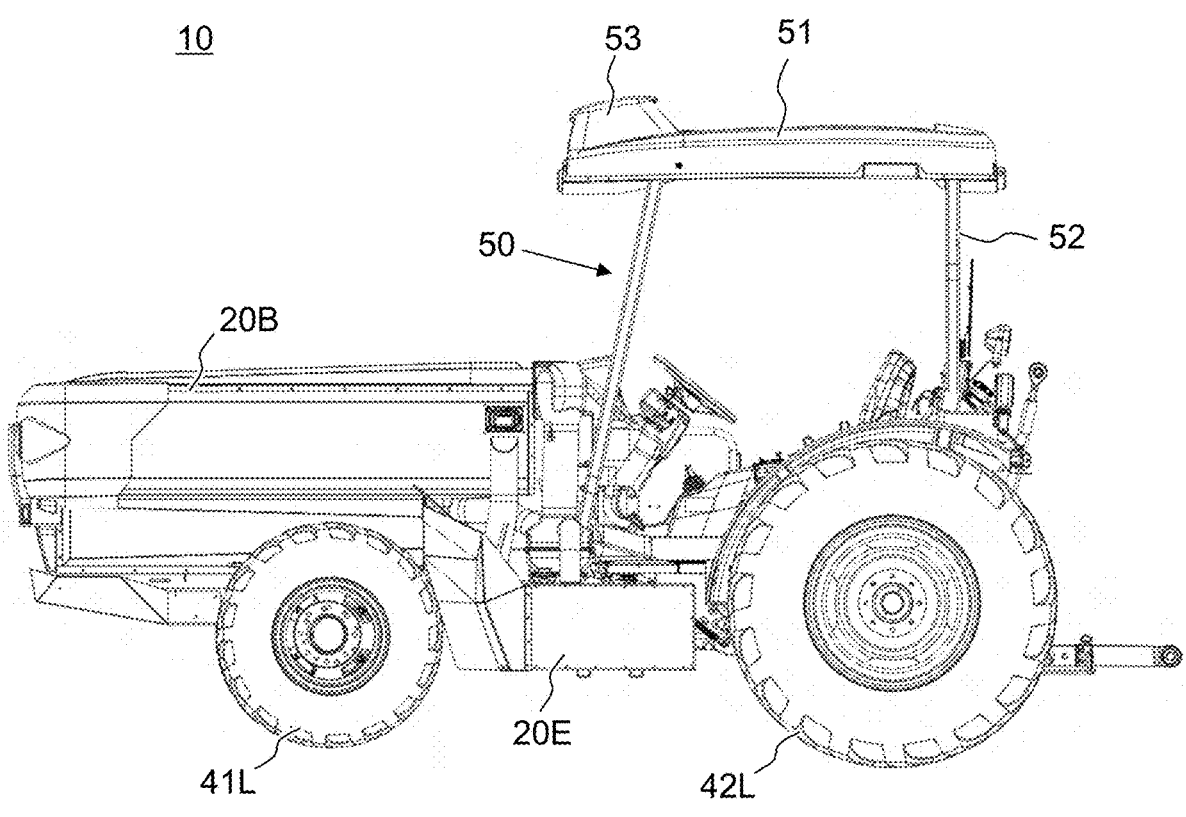
FIG. 1F shows a left side view of an electric vehicle according to a preferred embodiment of the present invention.
Figure 1G:
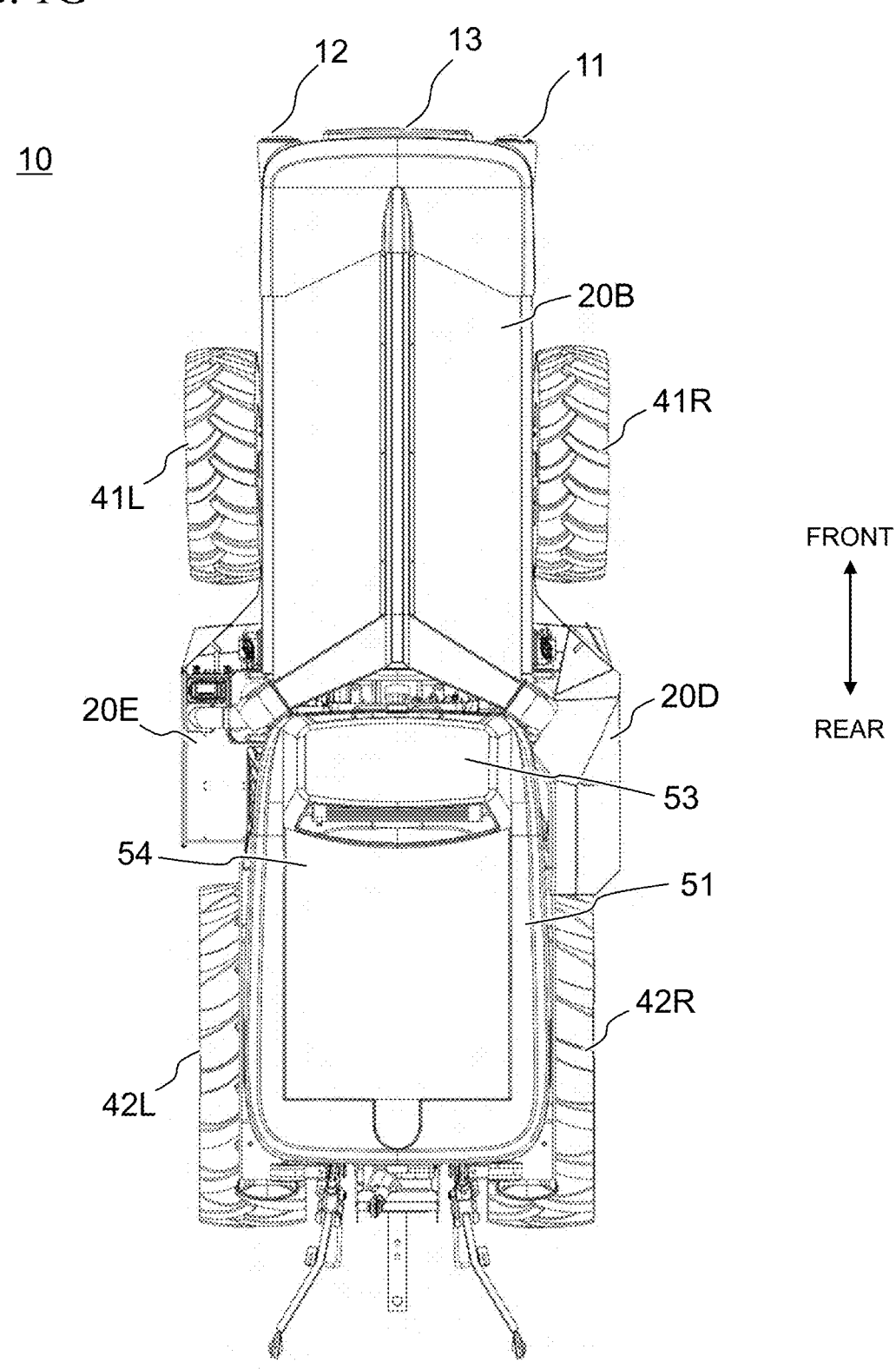
FIG. 1G shows a top view of an electric vehicle according to a preferred embodiment of
the present invention.
Figure 1H:
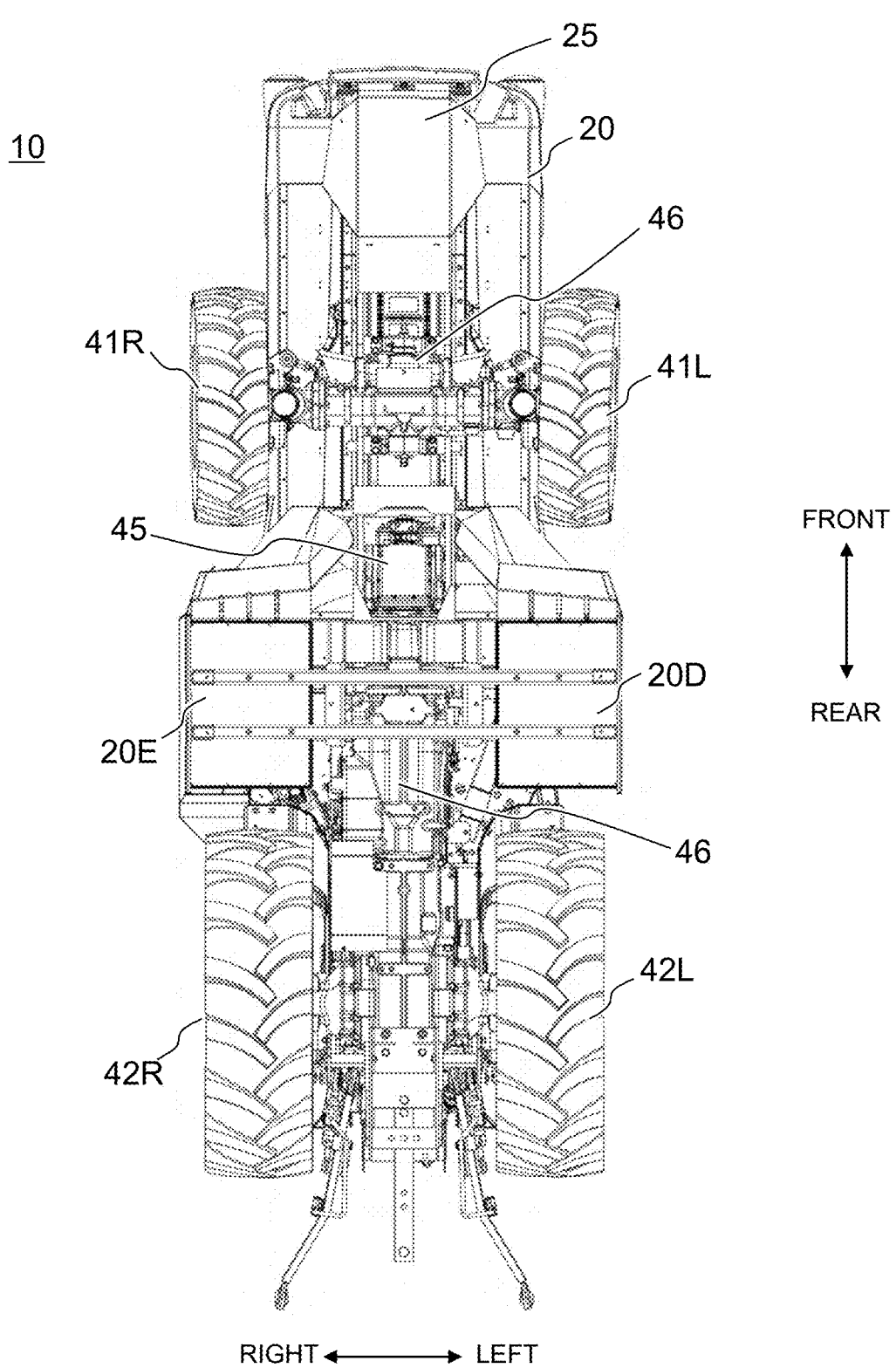
FIG. 1H shows a bottom view of an electric vehicle according to a preferred embodiment of the present invention.
Figure 1I:
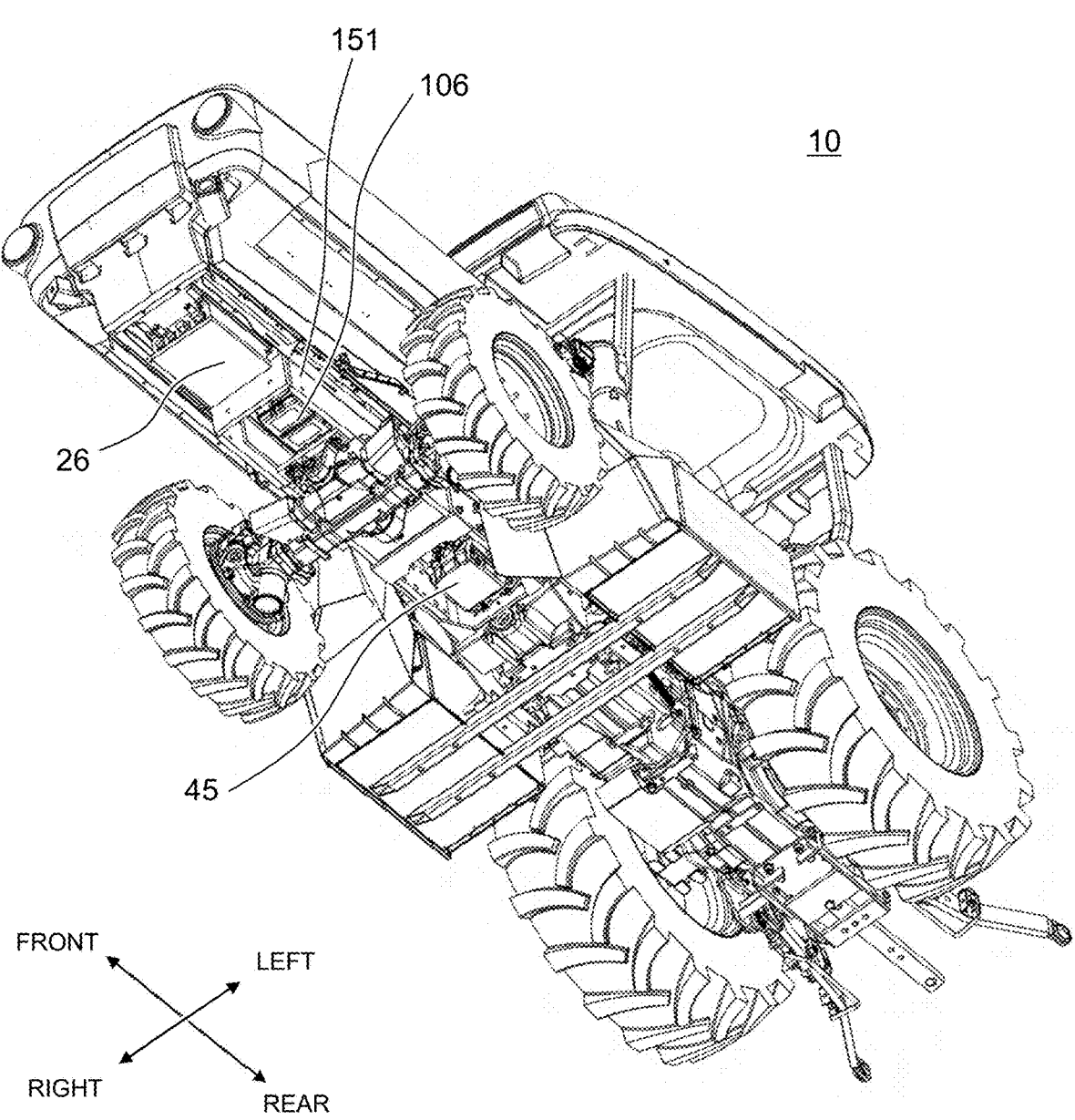
FIG. 1I shows a perspective bottom view of an electric vehicle according to a preferred embodiment of the present invention.

FIGS. 1A to 1I show an electric vehicle 10 according to a preferred embodiment of the present invention. FIGS. 1A and 1B show perspective views from left and right front ends of the vehicle 10, respectively. FIG. 1C shows an isometric view from a left rear end of the vehicle 10. FIG. 1D shows a front view of the vehicle 10. FIGS. 1E and IF are side views of the vehicle 10. FIGS. 1G and 1H are top and bottom views of the vehicle 10, respectively. FIG. 1I shows a perspective view from a bottom side of the vehicle 10.

In a preferred embodiment of the present invention, as shown in, for example, FIGS. 1A and 1D, the vehicle 10 includes a pair of headlights 11 and 12, a fixed cover portion 13A, a movable cover portion 13B, a plurality of DC charge ports (discussed below), and an AC charge port 15, all provided on a front surface of the vehicle 10. As shown in FIG. 1D, the front surface of the vehicle 10 includes an upper surface body portion 24 and a lower surface body portion 16. A front skid plate 25 is provided below the lower surface body portion 16. The lower surface body portion 16 includes a plurality of recesses 16A to accommodate the plurality of DC charge ports. FIG. 1A shows portions of a cable 17 of a charging cable harness that can be inserted into at least one of each of the plurality of DC charge ports. The remaining portions of the cable 17 of the charging cable harness are not shown in FIG. 1A.

As further shown in FIGS. 1A-1H, the vehicle 10 also includes a left front wheel 41L, a right front wheel 41R, a left rear wheel 42L, and a right rear wheel 42R. However, a vehicle according to the preferred embodiments of the present invention is not specifically limited to four wheels, and may include any appropriate number of wheels. For example, a vehicle according to the preferred embodiments may include only three wheels by removing one of the aforementioned four wheels, a fifth wheel (e.g., an additional wheel provided in line with a pair of one of the aforementioned four wheels, a wheel provided at a front or rear of the vehicle, etc.), six total wheels by including a pair of center wheels, and the like. In an alternative preferred embodiment, tracks can be used instead of wheels.

As shown in FIGS. 1B-1H, the electric vehicle 10 includes a first housing 20B and a second housing 20C that enclose portions of a battery pack of the electric vehicle 10. According to preferred embodiments of the present invention, as shown in FIGS. 1B-1H, the vehicle 10 can also include one or more side housings 20E and 20D, and the one or more side housings 20E and 20D can store and enclose further portion(s) of an electrical power supply system for the vehicle 10. As shown in FIGS. 1B-1H, the vehicle 10 can include a left side housing 20E and a right side housing 20D. The left side housing 20E can be located at least partially between the left front wheel 41L and the left rear wheel 42L, and the right side housing 20D can be located at least partially between the right front wheel 41L and the right rear wheel 42R. According to preferred embodiments of the present invention, as shown in FIGS. 1B and 1C, the vehicle 10 can also include an air circulation system with first (left) side ducting 35L that provides air flow path(s) between the left side housing 20E and the main first and second housings 20B, 20C. The vehicle 10 can also include right side ducting 35R that provides air flow path(s) between the right side housing 20D and the main first and second housings 20B, 20C. The air flow path(s) provided by the left side ducting 35L and the right side ducting 35R can be used to provide cooling for portion(s) of the electrical power supply system for the vehicle 10 that are stored in the left side housing 20E or the right side housing 20D.

The electrical power supply system for the vehicle 10 can supply electrical power to an electric motor 45, shown in FIG. 1H. The electrical power can be supplied to the electric motor 45 via an inverter, for example. The electric motor 45 can be located between the left side housing 20E and the right side housing 20D in a right-left direction of the vehicle 10, and the electric motor 45 can be located forward of the left side housing 20E and the right side housing 20D in a front-rear direction of the vehicle 10. The vehicle 10 can include a transmission 46 to drive each of the left front wheel 41L, the right front wheel 41R, the left rear wheel 42L, and the right rear wheel 42R in a four-wheel drive arrangement. However, the electric motor 45 and the transmission 46 can also be implemented in two-wheel drive arrangements.

FIG. 1I shows a perspective view from a bottom side of the vehicle 10 in which the front skid plate 25 is removed (not shown). As shown in FIG. 1I, guarded by the front skid plate 25 is an onboard charge controller (OBC) 26 located at a bottom side of the vehicle 10. As shown in FIG. 1I, the vehicle 10 further includes at a bottom side thereof frame rails 151, an inverter 106, and a motor 45 which will be described further below.

According to preferred embodiments of the present invention, as shown in FIGS. 1B-1G the vehicle 10 can also include a cabin 50 or the like with a roof 51 supported by a frame 52. The cabin 50 or the like can include various components, for example, a seat for an operator of the vehicle 10 and vehicle controls such as a steering wheel. The roof 51 can optionally be provided with a radiator and condenser module 53 and/or a solar panel 54.

Figure 2:
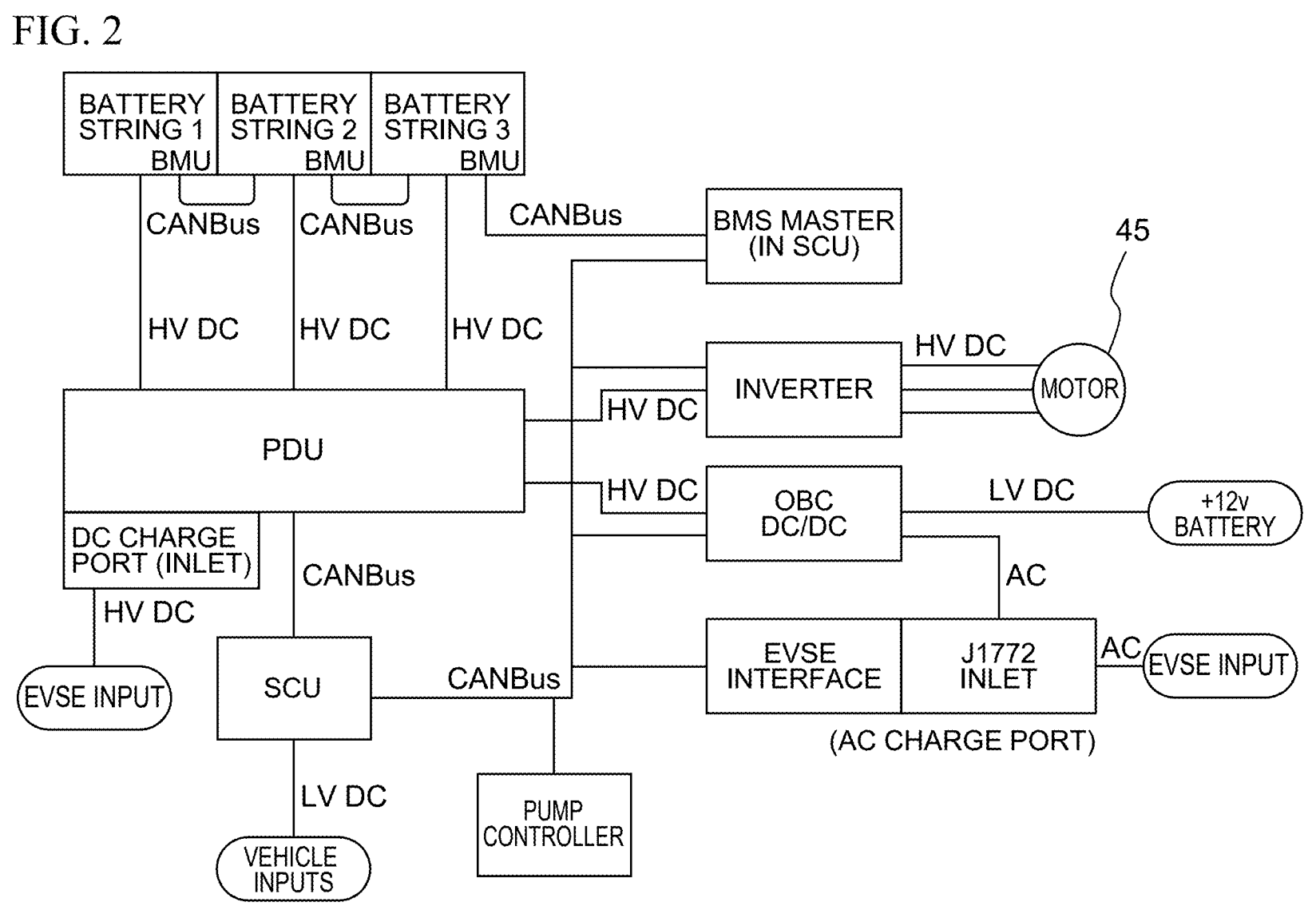

FIG. 2 shows a block diagram of an electrical sub-system of the electric vehicle 10. As shown in FIG. 2, the electrical sub-system includes a power distribution unit (PDU) that connects to three battery strings via high-voltage (HV) DC lines. Each battery string is controlled by a battery management unit (BMU) that communicates with other BMUs and a battery management system (BMS) Master via CANBus lines. A BMS is responsible to aggregate the information from all the battery strings and respond to the appropriate BMU if the situation requires. The function of the BMS may be implemented in a Supervisory Control Unit (SCU). The power distribution unit (PDU) is further connected to an inverter via HV DC lines to drive the motor of the vehicle, and an onboard charge controller (OBC) which may include a DC/DC converter in the present preferred embodiment as shown. The OBC is connected to a 12v battery via low-voltage (LV) DC line, and to the AC Charge port, which may be a J1772 inlet. As shown in FIG. 2, two Electric Vehicle Supply Equipment (EVSE) systems are provided. One is a standard SAE J1772 system for Level 2 charging at 240 VAC via an on-board charger (OBC DC/DC). The second EVSE is a custom implementation for DC fast charging. Both EVSEs supply power to the PDU where it is distributed to charge each battery string. The DC fast Charger connects to the Battery Strings 1-3 of the battery pack through the PDU. A Supervisory Control Unit (SCU) is connected to the PDU via CANBus. The SCU connects to vehicle inputs or sensors via low-voltage (LV) DC lines. A pump controller, which controls a radiator, fan, and/or pump of the electric vehicle, is connected to the SCU via CANBus.

Figure 3:
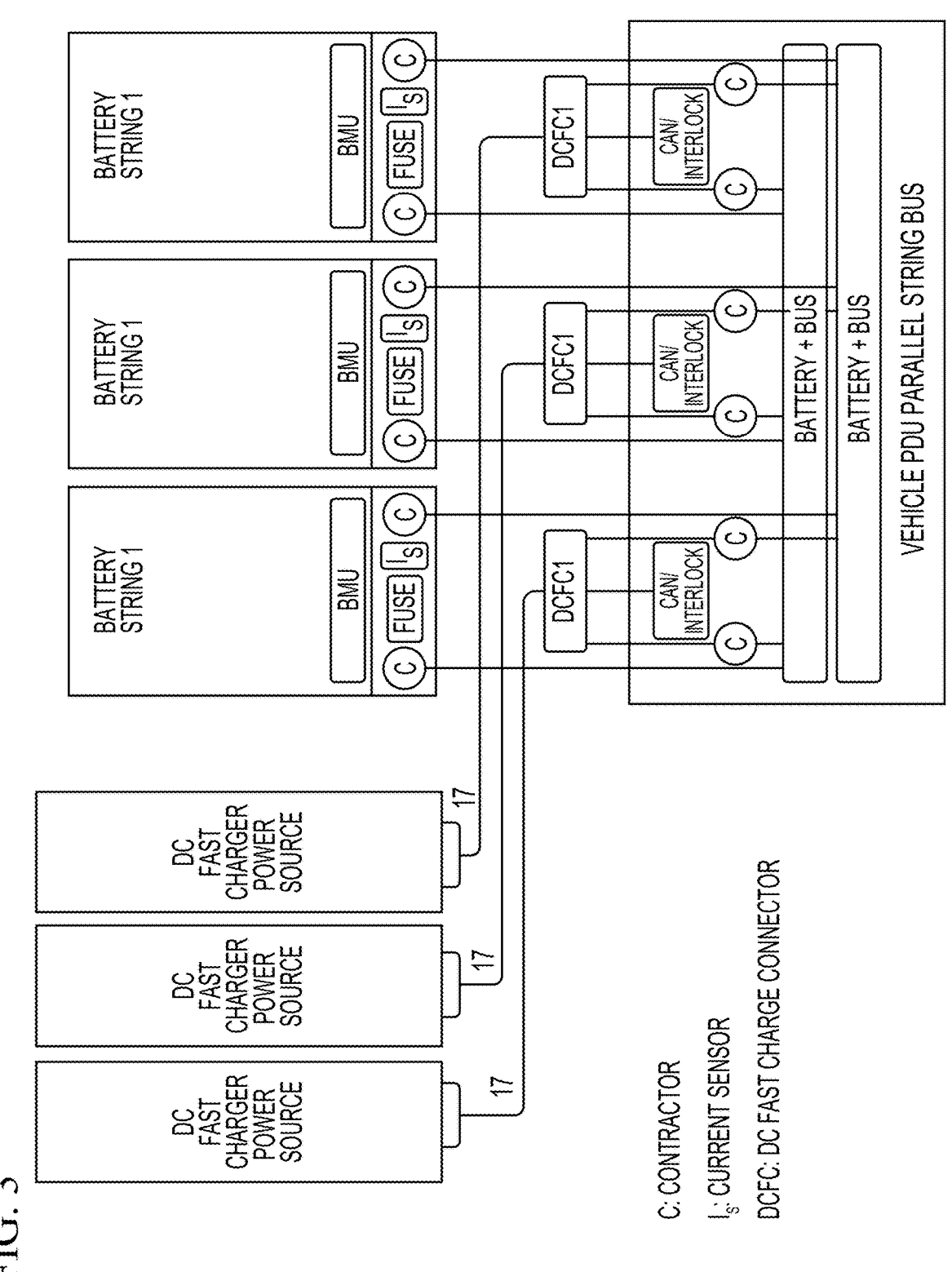
FIG. 3 shows a block diagram of a DC Fast Charging system according to a preferred embodiment of the present invention.

FIG. 3 shows a block diagram of a DC Fast Charging system according to a preferred embodiment of the present invention. As shown in FIG. 3, the DC Fast Charging system includes three DC Fast Charger Power Sources, the vehicle PDU, and the vehicle's battery pack which includes Battery Strings 1, 2, and 3. In a preferred embodiment, the battery pack is arranged in a 24s3p configuration (24 modules per string, 3 strings in parallel). However, the present invention is not limited to any specific series/parallel cell configuration, and may include any combination of battery strings and modules in series/parallel. For example, there may be three (3) external HV cables 17 connected to the PDU via three DC Fast Charge Plugs DCFC1, DCFC2, DCFC3. Each Battery String 1, 2, and 3 includes a BMU, and also includes contactors C, current sensors $I_s$, and fuses. As shown in FIG. 3, the PDU includes contactors C between the positive(+) and negative(−) battery bus lines and the DC Fast Charge Plugs DCFC1, DCFC2, DCFC3. These contactors C are used for emergency shut off of the electric vehicle, as will be described later. The PDU also includes a CAN/Interlock to control each of the DC Fast Charge Plugs DCFC1, DCFC2, DCFC3.

Figure 4:
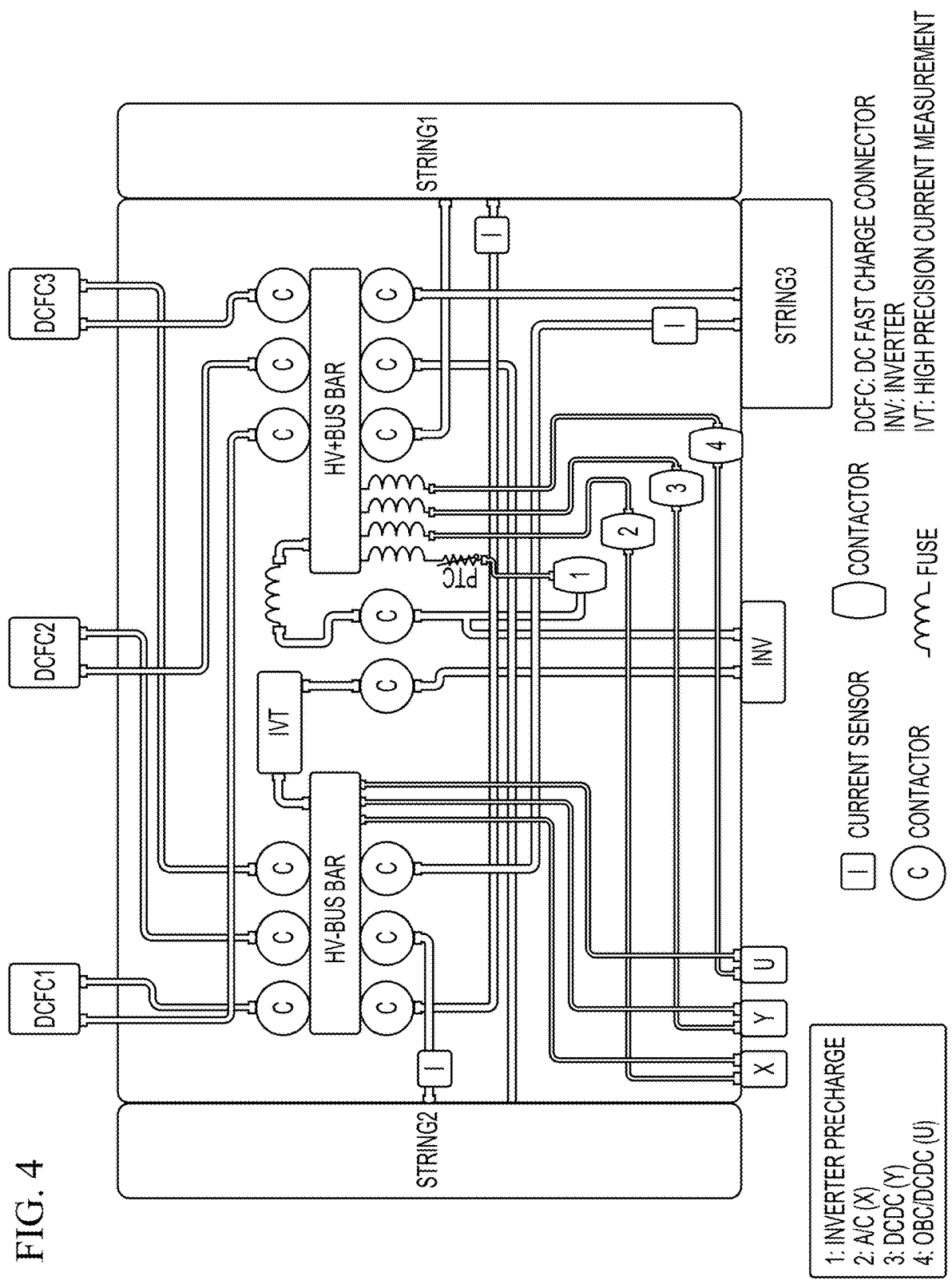
FIG. 4 shows a block diagram of a power distribution unit (PDU) according to a preferred embodiment of the present invention.

FIG. 4 shows a block diagram of the PDU according to a preferred embodiment of the present invention. Solid black lines designate high voltage negative (HV−) potential, and shaded grey lines designate high voltage positive (HV+). The PDU combines the three battery strings in parallel and the full battery pack voltage is provided between the HV− and HV+ bus bars. Loads on the battery pack are drawn from the HV− and HV+ bus bars via contactors to switch the high voltage bus available to each component. In this preferred embodiment, all HV+ wires are fused to protect wires exiting the PDU. The PDU functions as the electrical multiplexer for all high voltage sub-systems of the electric vehicle: Battery Pack, DC Fast Charging, OBC, and Inverter. Both the positive and negative rails are independent busbars. All electrical paths are connected to the positive and negative rails.

Figure 5A:
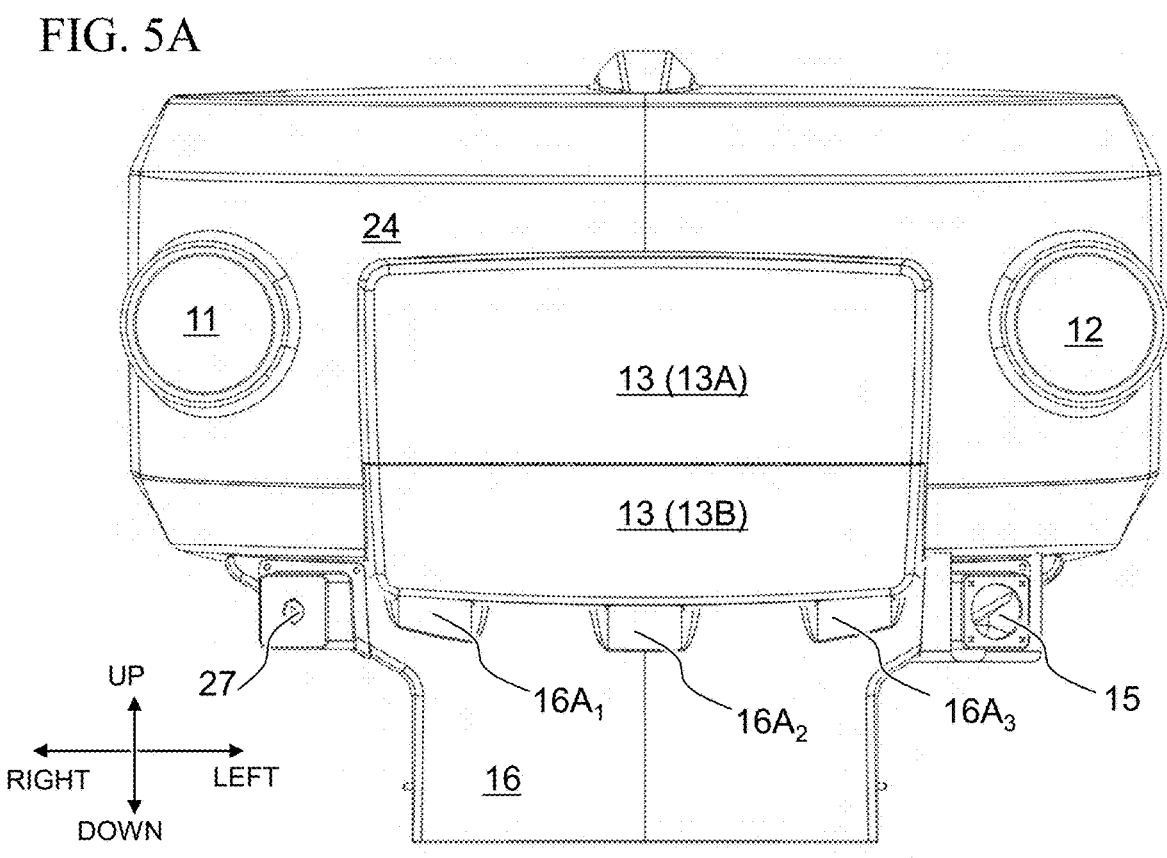
FIG. 5A shows a front surface of an electric vehicle with a charge port cover in a closed position according to a preferred embodiment of the present invention.

FIG. 5A shows a front surface of an electric vehicle with a charge port cover in a closed position according to a preferred embodiment of the present invention. As shown in FIG. 5A, on the front surface of the vehicle, two headlights 11 and 12 are provided in the upper surface body portion 24. The three DC Fast Charge Plugs DCFC1, DCFC2, DCFC3 (not shown in FIG. 5A) are provided behind a cover 13 which includes the fixed cover portion 13A and the movable cover portion 13B. In a preferred embodiment of the present invention, an AC charge port 15 (corresponding to, for example, the J1772 inlet shown in FIG. 2) is provided to connect to an AC voltage source to charge the battery pack. The AC charge port 15 can be provided on the left side at a position offset from the three DC Fast Charge Plugs DCFC1, DCFC2, DCFC3. The lower surface body portion 16 includes a plurality of recesses $16A_1$, $16A_2$, $16A_3$ to accommodate openings of the DC Fast Charge Plugs DCFC1, DCFC2, DCFC3 (plurality of DC charge ports). On the front surface of the vehicle, an auxiliary port 27 can be provided on the right side for an auxiliary function, such as an emergency stop button, for example.

Figure 6A:
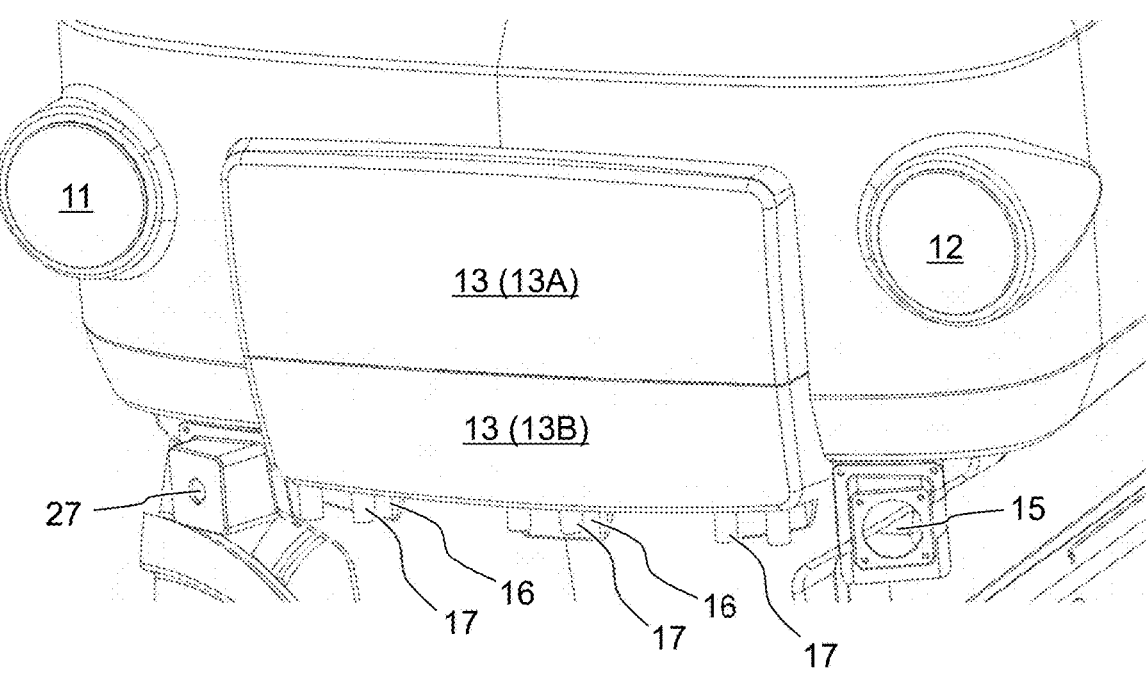
FIG. 6A is a perspective view of a front surface of an electric vehicle showing portions of charging cables connected to DC charge ports with a cover is in a closed position, according to a preferred embodiment of the present invention.
Figure 6B:
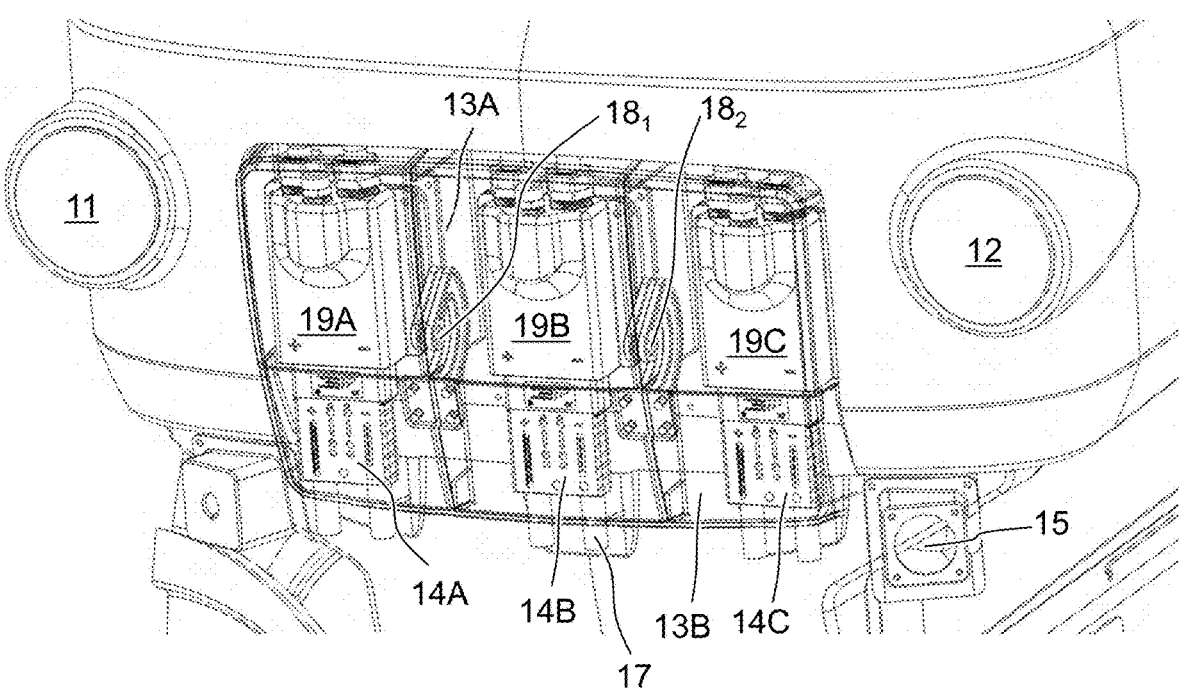
FIG. 6B is a perspective view of a front surface of an electric vehicle showing portions of charging cables connected to DC charge ports with a cover is in a closed position, wherein the cover is drawn in transparency, according to a preferred embodiment of the present invention.

FIG. 6A is a perspective view of a front surface of an electric vehicle showing portions of charging cables connected to DC charge ports with the cover 13 in a closed position, according to a preferred embodiment of the present invention. FIG. 6B is a perspective view of a front surface of an electric vehicle showing portions of charging cables connected to DC charge ports with the cover in a closed position, wherein the cover is drawn in transparency, according to a preferred embodiment of the present invention. As shown in FIGS. 6A and 6B, when the DC Fast Charging system is connected to the electric vehicle 10, three (3) external HV cables including DC cable harnesses 14A (including cables 17), 14B (including cables 17), 14C (including cables 17) are connected to the three DC Fast Charge Plugs DCFC1, DCFC2, DCFC3 (plurality of DC charge ports 19A, 19B, 19C). It should be noted that the present invention is not limited to three DC charge ports. For example, only one or two of the three DC charge ports 19A, 19B, 19C may be provided. In this preferred embodiment of the present invention, increasing the number of DC charge ports increases the current and charging capacity.

As shown in FIG. 6B, the plurality of DC charge ports 19A, 19B, 19C are covered by the fixed cover portion 13A and the movable cover portion 13B. The movable cover portion 13B is supported by a hinge $18_1$, $18_2$ and includes openings at a bottom of the movable cover portion 13B for the cables 17 of the DC cable harnesses 14A-14C to extend through, details of which will be described in further detail below.

Figure 5B:
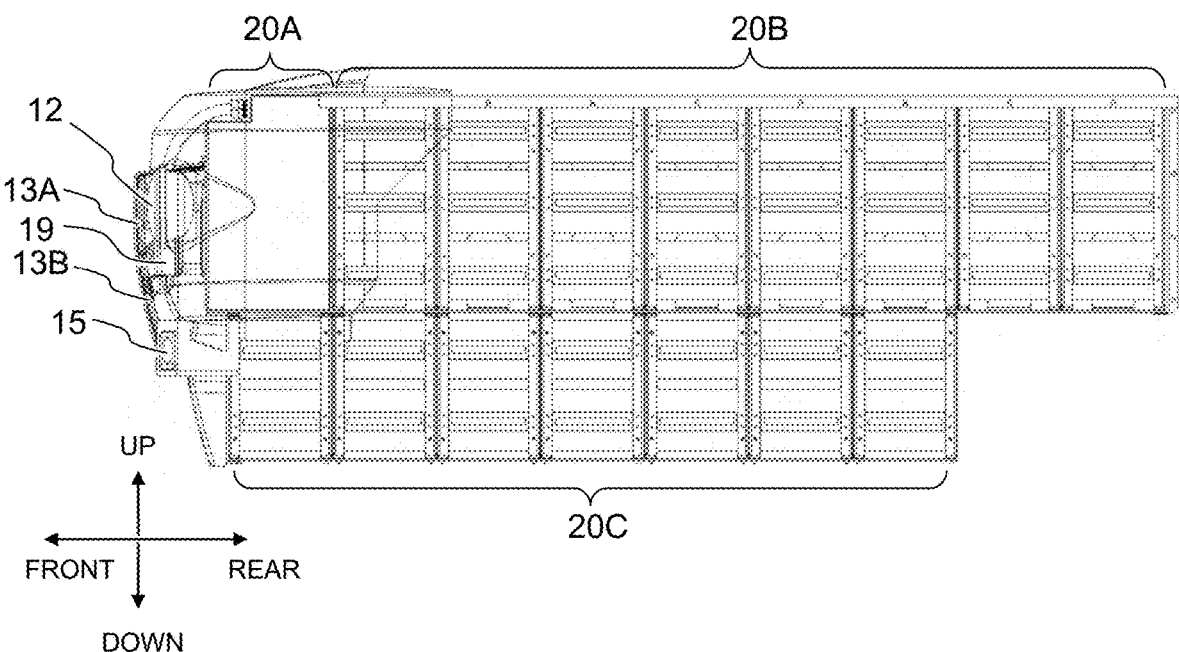
FIG. 5B shows a side view layout of a front surface of an electric vehicle in relation to a PDU housing and battery pack housings according to a preferred embodiment of the present invention.

FIG. 5B shows a side view layout of a front surface of an electric vehicle in relation to a PDU housing and battery pack housings according to a preferred embodiment of the present invention. As shown in FIG. 5B, the electric vehicle 10 includes a PDU housing 20A, a first housing 20B, and a second housing 20C. The PDU housing 20A houses/encloses the PDU. The first housing 20B encloses a first portion of the battery pack and second housing 20C encloses a second portion of the battery pack. As shown in FIG. 5B, the PDU housing 20A is located between the front surface of the vehicle and the first housing 20B in a front-rear direction, and the second housing 20C is below the PDU housing 20A and the first housing 20B in an up-down direction. As shown in FIG. 5B, the plurality of DC charge ports 19 (19A, 19B, 19C) and the at least one head light 11, 12 overlap in a side view of the EV.

Figure 7A:
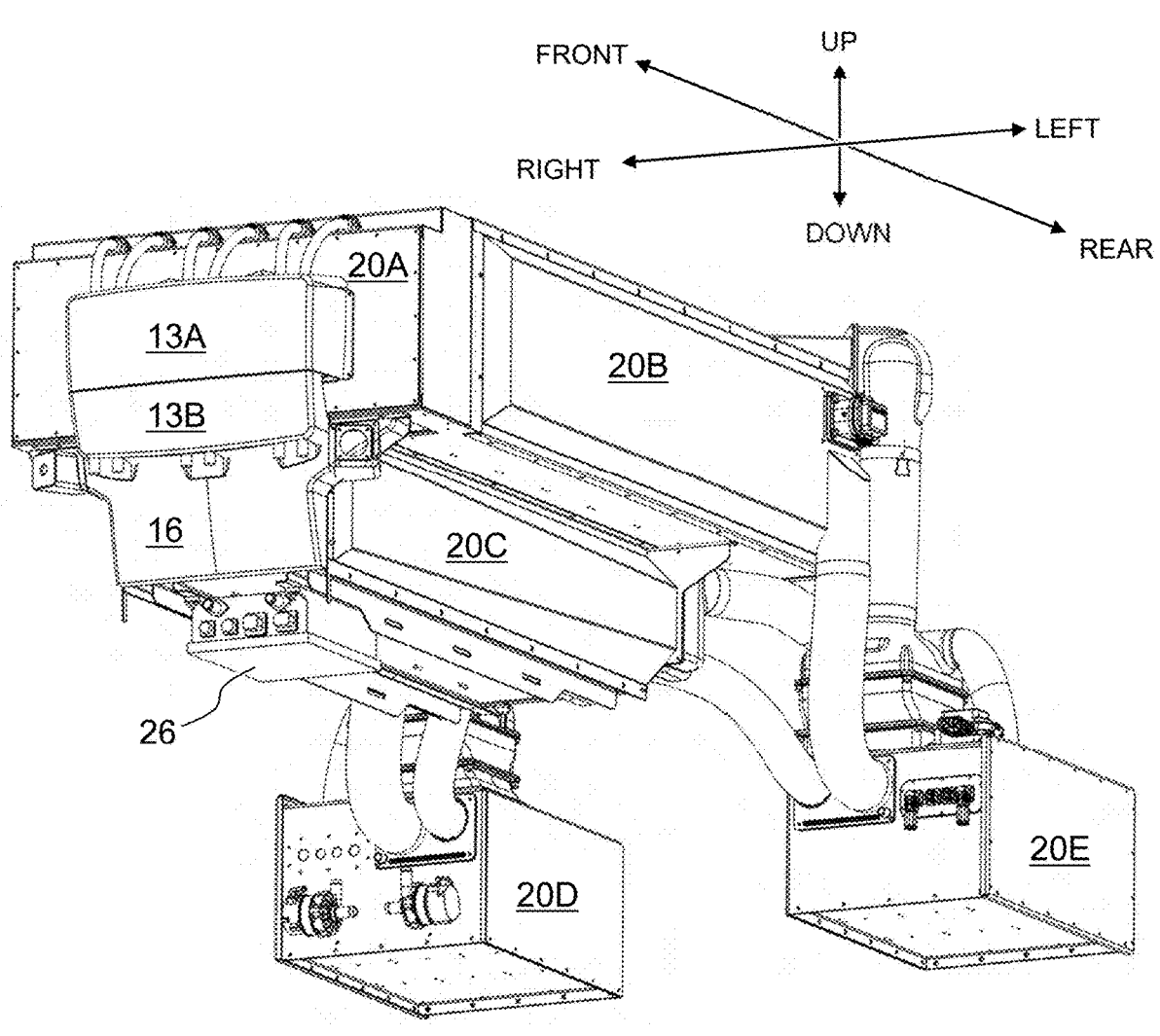
FIG. 7A is a front perspective view of a battery pack housing and charging port cover of an electric vehicle according to a preferred embodiment of the present invention.
Figure 7B:
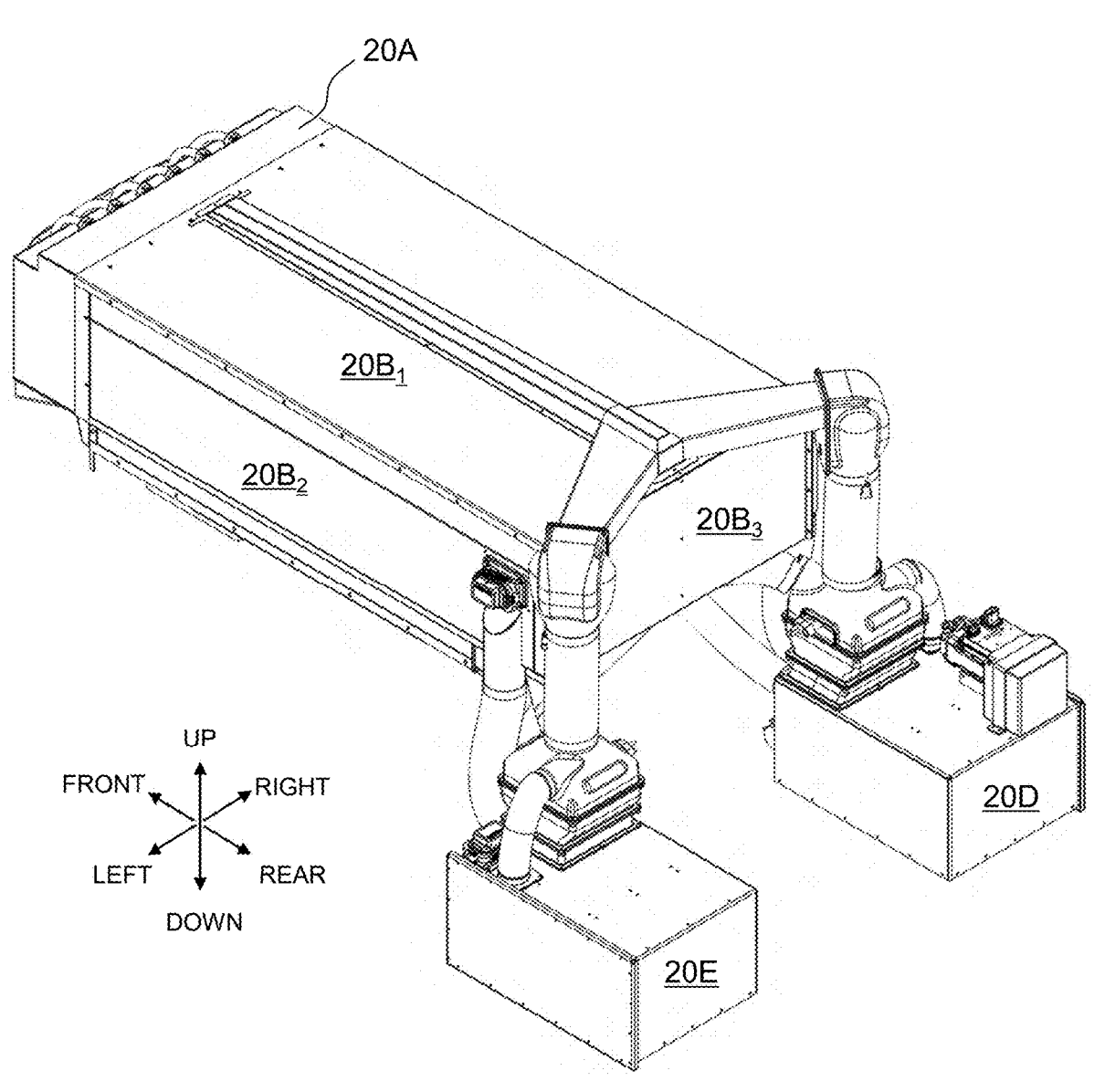
FIG. 7B is a rear perspective view of a battery pack housing and charging port cover of an electric vehicle according to a preferred embodiment of the present invention.
Figure 7C:
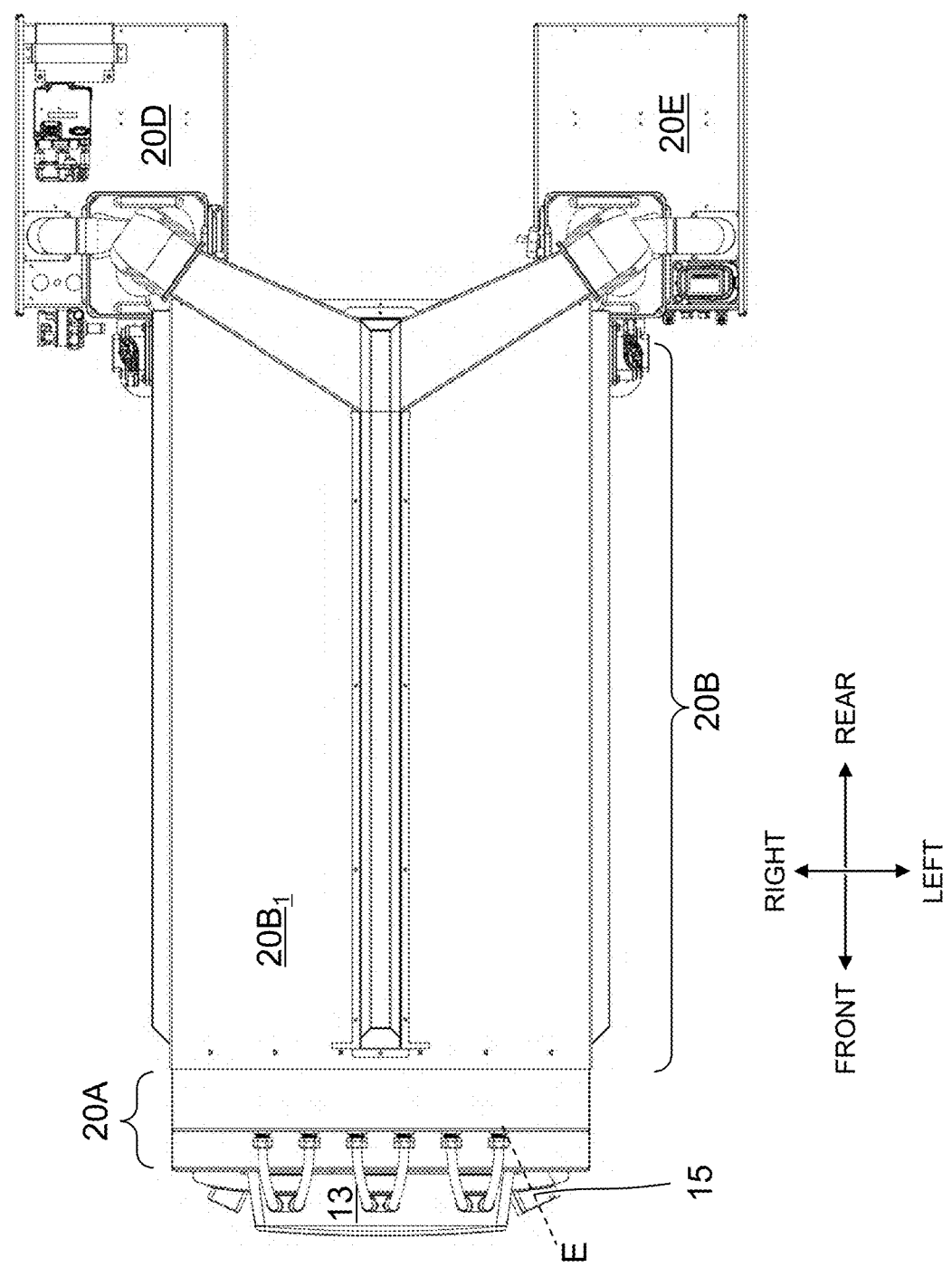
FIG. 7C is a top view of a battery pack housing and charging port cover of an electric vehicle according to a preferred embodiment of the present invention.

FIG. 7A is a front perspective view of a battery back housing and charging port cover of an electric vehicle according to a preferred embodiment of the present invention. FIG. 7B is a rear perspective view of a battery back housing and charging port cover of an electric vehicle according to a preferred embodiment of the present invention. FIG. 7C is a top view of a battery back housing and charging port cover of an electric vehicle according to a preferred embodiment of the present invention. In this preferred embodiment, as shown in FIGS. 7A-7C, the electric vehicle 10 includes the PDU housing 20A, the first housing 20B, the second housing 20C, the right side housing 20D, the left side housing 20E, and an onboard charge controller (OBC) 26. As shown in FIG. 7A, the onboard charge controller (OBC) 26 is located immediately below the second housing 20C in the up-down direction. As shown in FIG. 7B, the first housing 20B includes a top surface $20B_1$, a side surface $20B_2$, and a rear surface $20B_3$. As shown in FIG. 7C, a receptacle of the AC charge port 15 extends in a direction E that is at an angle of less than about 90 degrees with respect to the front-rear direction of the vehicle, for example.

Figure 8A:
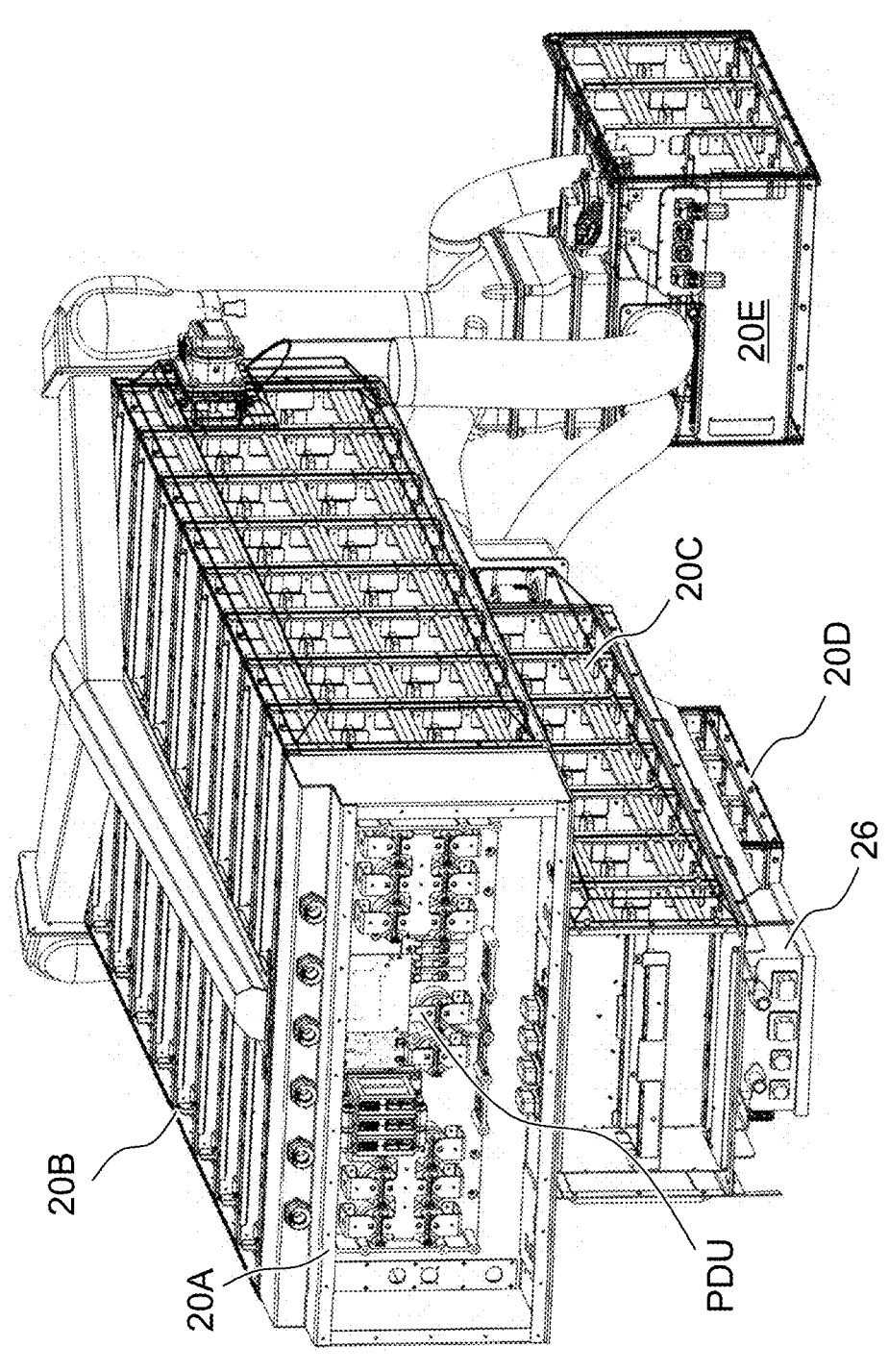
FIG. 8A is a front perspective view of a battery pack housing according to a preferred embodiment of the present invention, where housing portions are shown in transparency.
Figure 8B:
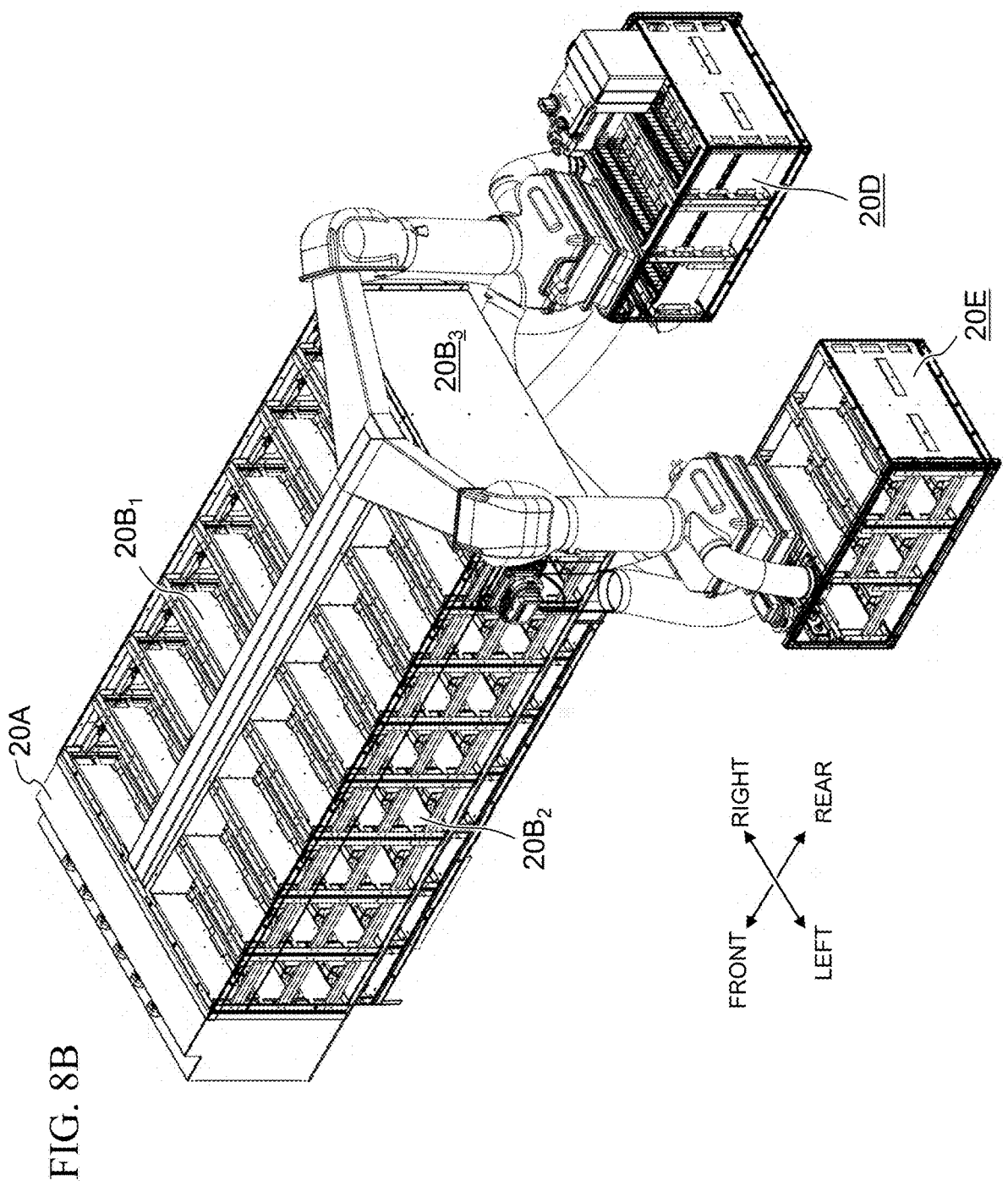
FIG. 8B is a rear perspective view of a battery pack housing according to a preferred embodiment of the present invention, where housing portions are shown in transparency.

FIGS. 8A and 8B are front and rear perspective views of the battery back housing according to the present preferred embodiment of the present invention shown in FIGS. 7A-7C, where housing portions are shown in transparency. As shown in FIG. 8A, the power distribution unit (PDU) is situated inside the PDU housing 20A. As shown in FIGS. 8A and 8B, each of the first housing 20B, the second housing 20C, the right side housing 20D, and the left side housing 20E is divided into separate compartments to house a separate battery module of the battery pack. The first housing 20B encloses at least one first battery module included in the battery pack, and the second housing 20C encloses at least one second battery module included in the battery pack. For example, the first housing 20B may enclose the battery modules of the Battery String 1 and the Battery String 2, and the second housing 20C and the side housings 20D and 20E may enclose the battery modules of the Battery String 3. Alternatively, the first housing 20B may enclose the battery modules of the Battery String 1, the second housing 20C may enclose the battery modules of the Battery String 2, and the side housings 20D and 20E may enclose the battery modules of the Battery String 3.

Figure 9A:
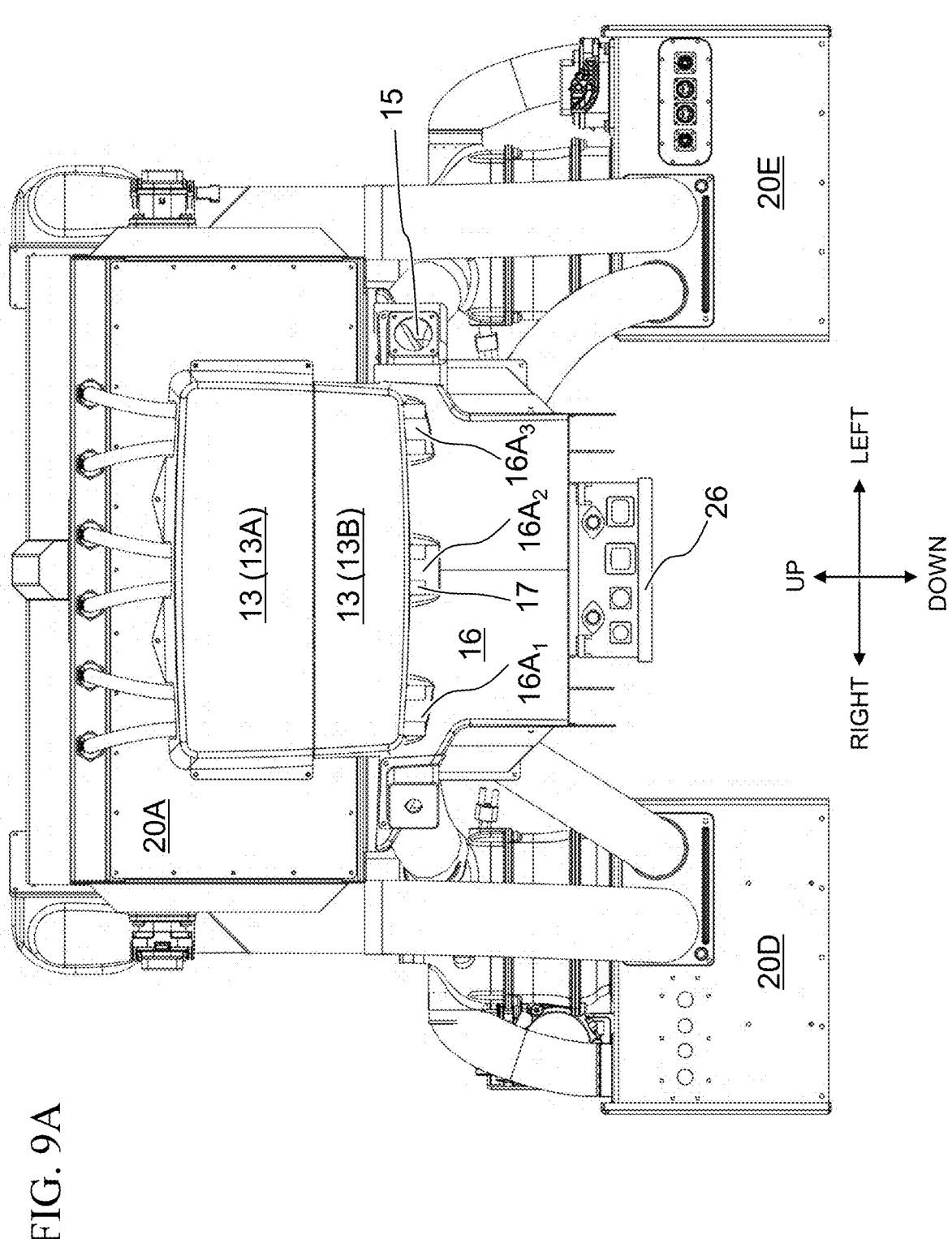
FIG. 9A is a front facing view of a battery pack housing with a charging port cover in a closed position according to a preferred embodiment of the present invention.
Figure 9B:
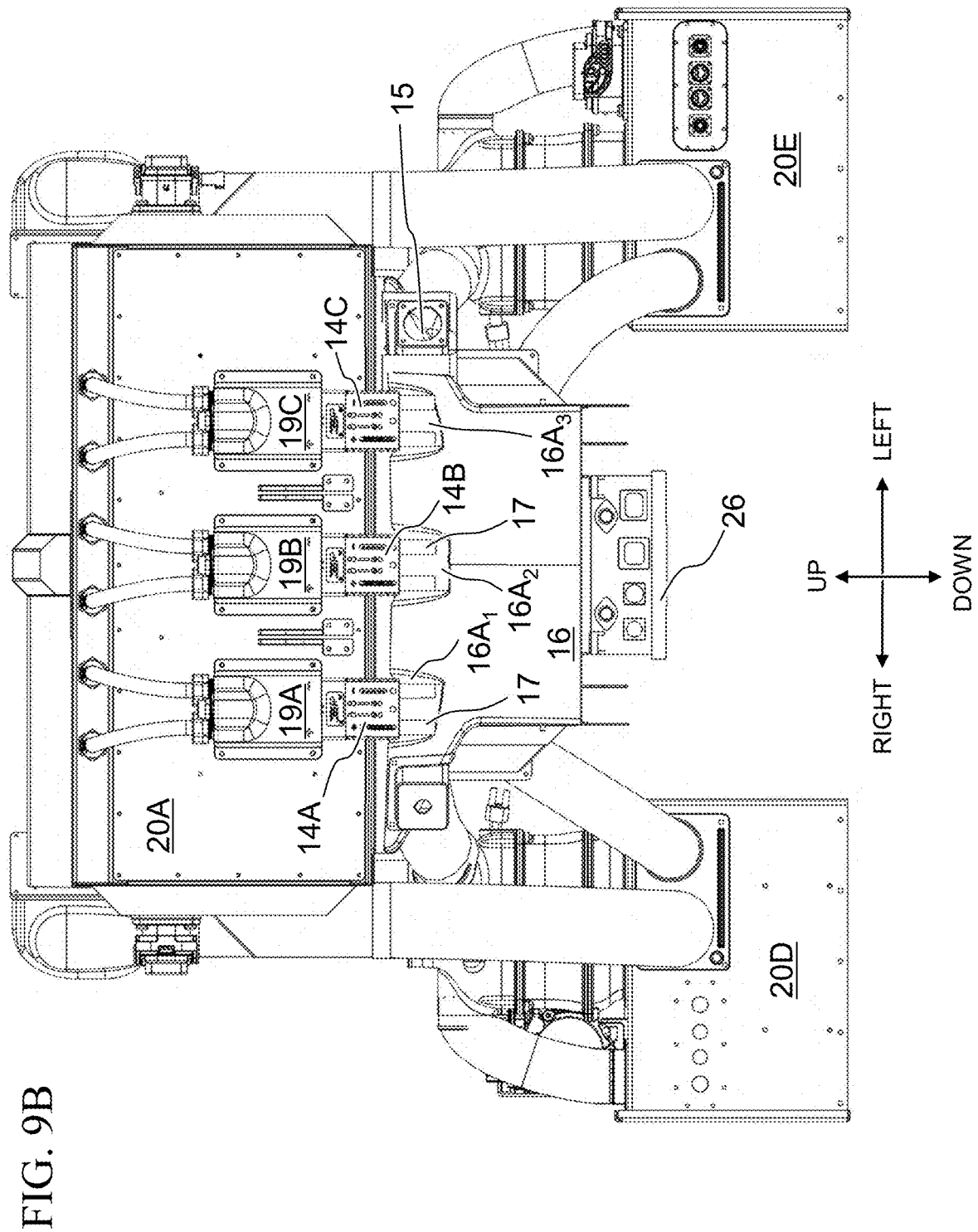
FIG. 9B is a front facing view of a battery pack housing with the charging port cover omitted to show a layout of DC charging ports.
Figure 9C:
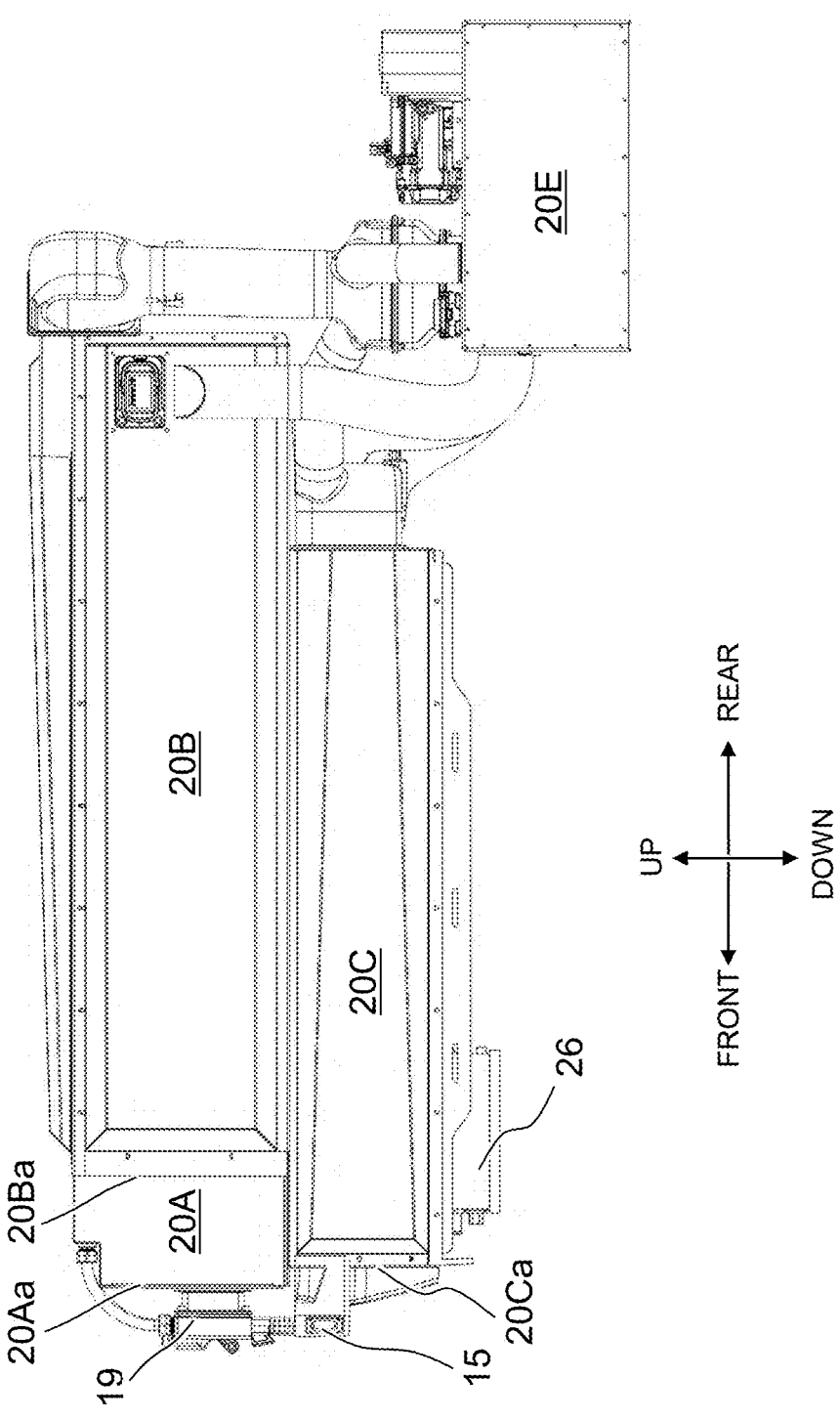
FIG. 9C is a side view of the battery pack housing with the charging port cover omitted.

FIG. 9A is a front facing view of a battery back housing with a charging port cover 13 in a closed position according to a preferred embodiment of the present invention. FIG. 9B is a front facing view of a battery back housing with the charging port cover 13 omitted to show a layout of DC charge ports 19A-19C. FIG. 9C is a side view of the battery back housing with the charging port cover 13 omitted.

As shown in FIG. 9A, the fixed cover portion 13A of the cover 13 is attached to a front surface of the PDU housing 20A. As shown in FIGS. 9A and 9B, the plurality of DC charge ports 19A-19C are covered by the cover 13. As shown in FIGS. 9A and 9B, during DC charging, each of the DC charge ports 19A-19C is connected to a respective DC cable harnesses 14A-14C. The cables 17 of the DC cable harnesses 14A-14C connect to the DC Fast Charger Power Source as shown in FIG. 3. It is noted that in FIGS. 6A, 6B, 7A, 9A, 9B, 10A-10C, 12, 13, and 14A-14C, portions of the cables 17 extending from the DC cable harnesses 14A-14C are omitted (not shown).

As shown in FIG. 9B, the plurality of DC charge ports 19A-19C are located at a same height in the up-down direction. The lower surface body portion 16 includes a plurality of recesses $16A_1$, $16A_2$, $16A_3$ to accommodate the plurality of DC charge ports 19A-19C which have receptacles extending in the vertical direction (up-down direction). The recesses $16A_1$, $16A_2$, $16A_3$ provide spaces to situate the DC cable harnesses 14A-14C including the cables 17. This is further shown in FIG. 15 described below.

As shown in FIG. 9C, the plurality of DC charge ports 19A-19C are located forward of a front surface 20Ba of the first housing 20B and a front surface 20Ca of the second housing 20C. The plurality of DC charge ports 19 (19A-19C) are attached to a front surface 20Aa of the PDU housing 20A. As shown in FIG. 9C, the PDU housing 20A is located between the plurality of DC charge ports 19 (19A-19C) and the first housing 20B in a front-rear direction.

Figure 10A:
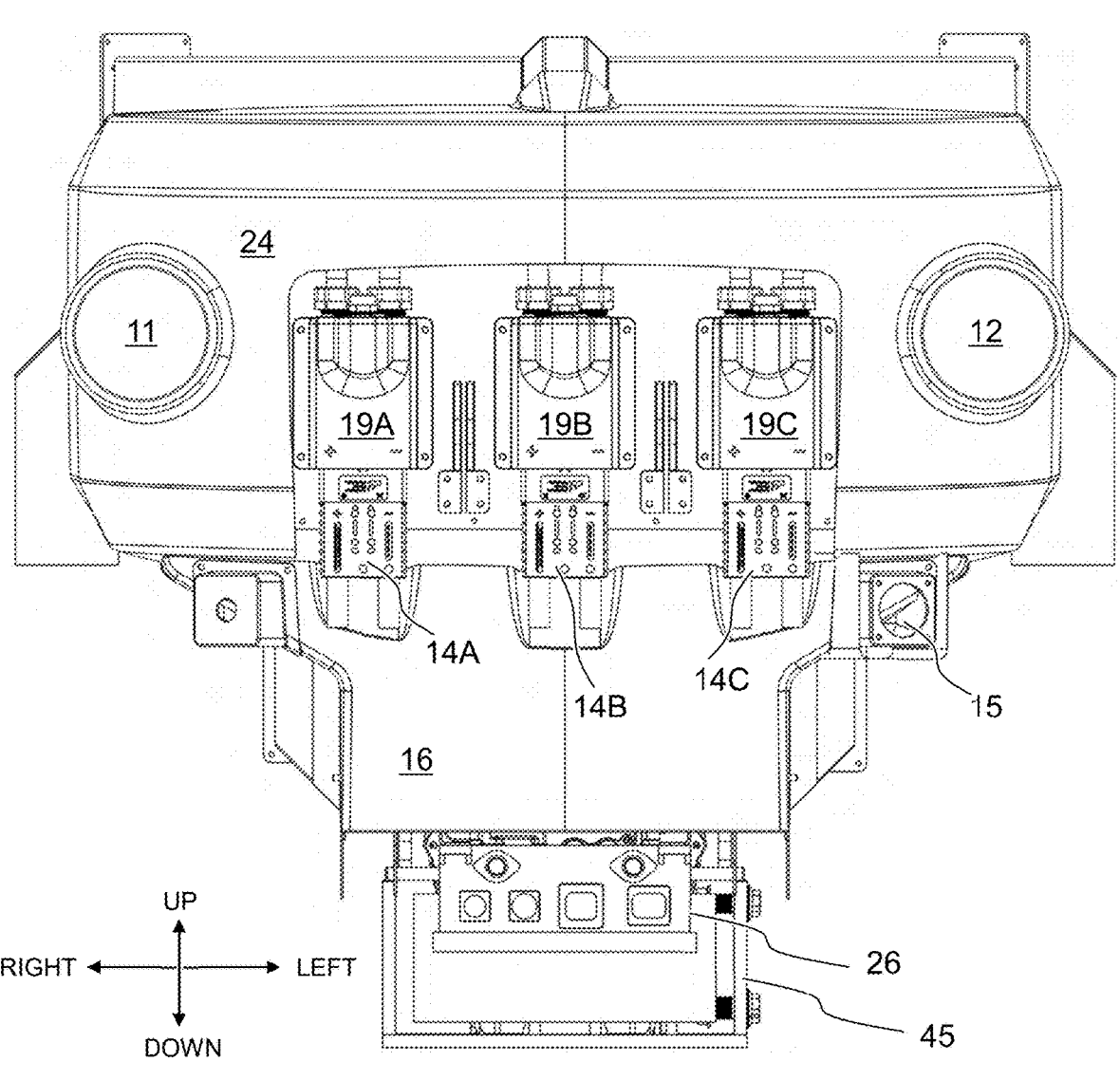
FIG. 10A is a front facing view partially showing an electric vehicle and layout of DC charging ports according to a preferred embodiment of the present invention.

FIG. 10A is a front facing view partially showing an electric vehicle and layout of DC charging ports 19A-19C according to a preferred embodiment of the present invention.

Figure 10B:
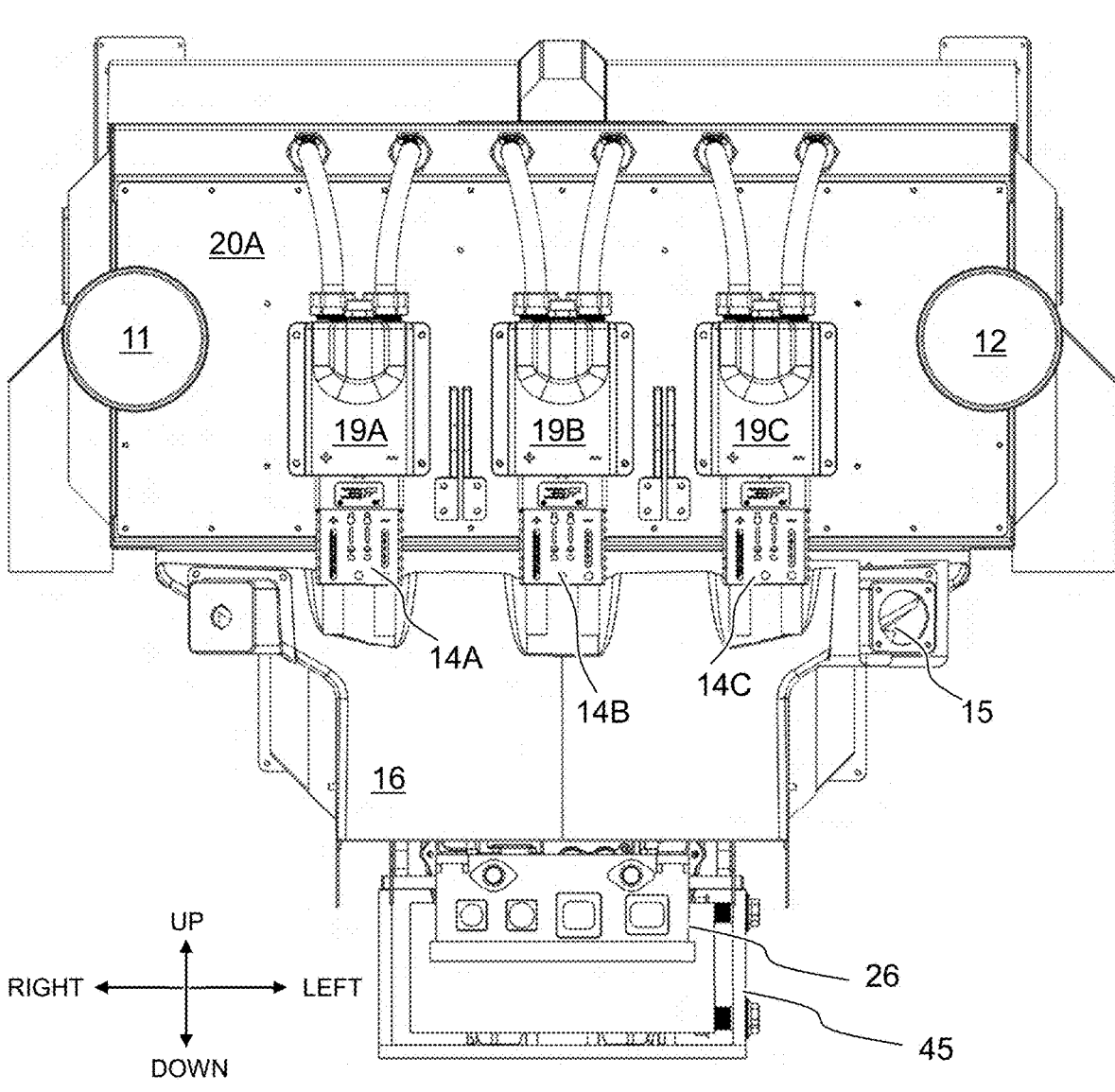
FIG. 10B is a front facing view partially showing an electric vehicle and layout of DC charging ports according to a preferred embodiment of the present invention, with a front surface body portion removed.

FIG. 10B is a front facing view partially showing an electric vehicle and layout of DC charging ports according to FIG. 10A, with the upper front surface body portion 24 removed.

Figure 10C:
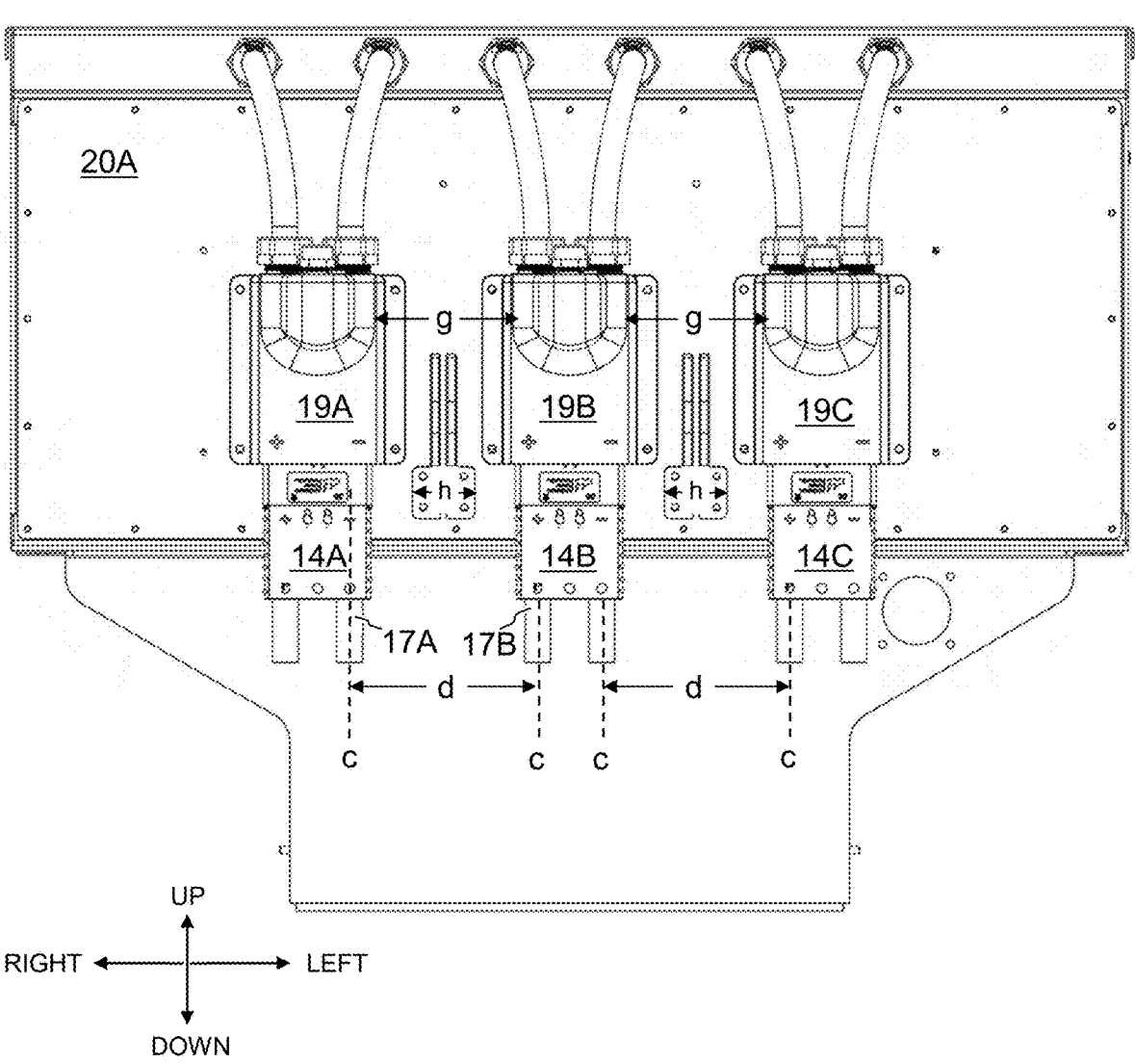
FIG. 10C is a front facing view of a PDU housing and layout of DC charging ports according to a preferred embodiment of the present invention.

FIG. 10C is a front facing view of a PDU housing and layout of DC charging ports according to according to FIGS. 10A and 10B, with the upper front surface body portion 24 and the lower front surface body portion 16 removed. As shown in FIG. 10C, each of the plurality of DC charge ports 19A-19C includes a receptacle that receives a cable or a wire harness (for example, corresponding to the DC cable harnesses 14A-14C including the cables 17). The plurality of DC charge ports include a first DC charge port 19A and a second DC charge port 19B that are adjacent to each other with a gap g therebetween. The gap g is configured or structured such that a distance d between a center c of the cable 17A (or the wire harness) connected to the first DC charge port 19A and a center c of the cable 17B (or the wire harness) connected to the second DC charge port 19B is equal to or greater than about 14.92 cm. The inventor(s) of preferred embodiments of the present invention have determined the distance d to be at least about 14.92 cm, for example, in order to reduce or prevent magnetic interference during charging. The distance of at least about 14.92 is an example gap distance to reduce or prevent the wire harness (charging cables) through which the current flow from affecting magnetic interference, which may hinder charging performance. It should be noted that the distance d can be defined to be either the distance between the centers of the harnesses or between the outside surface of the harnesses. In an alternative preferred embodiment, the distance d is about 7.46×D, for example, where D is a diameter (gauge) of a conductor of the charging cable.

Figure 11A:
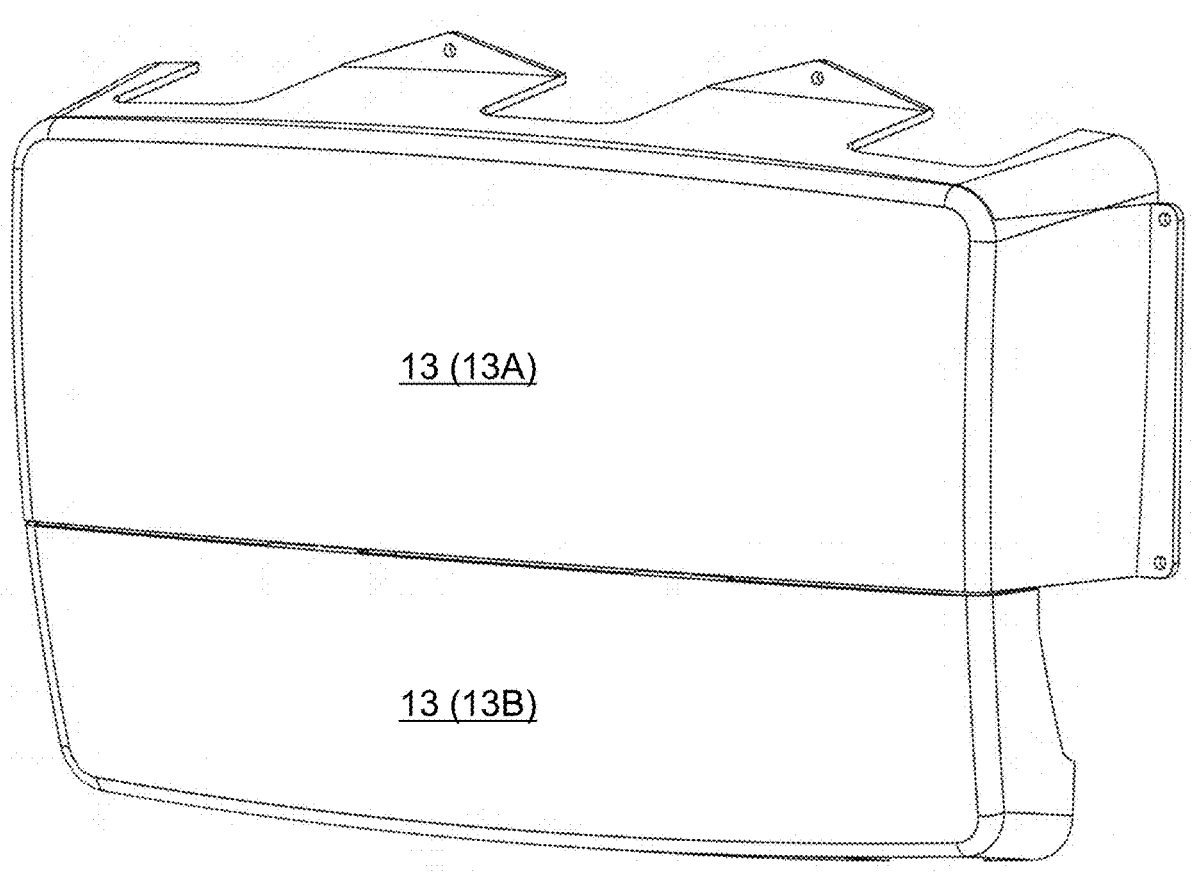
FIG. 11A is an external solid view of a charge port cover according to a preferred embodiment of the present invention.
Figure 11B:
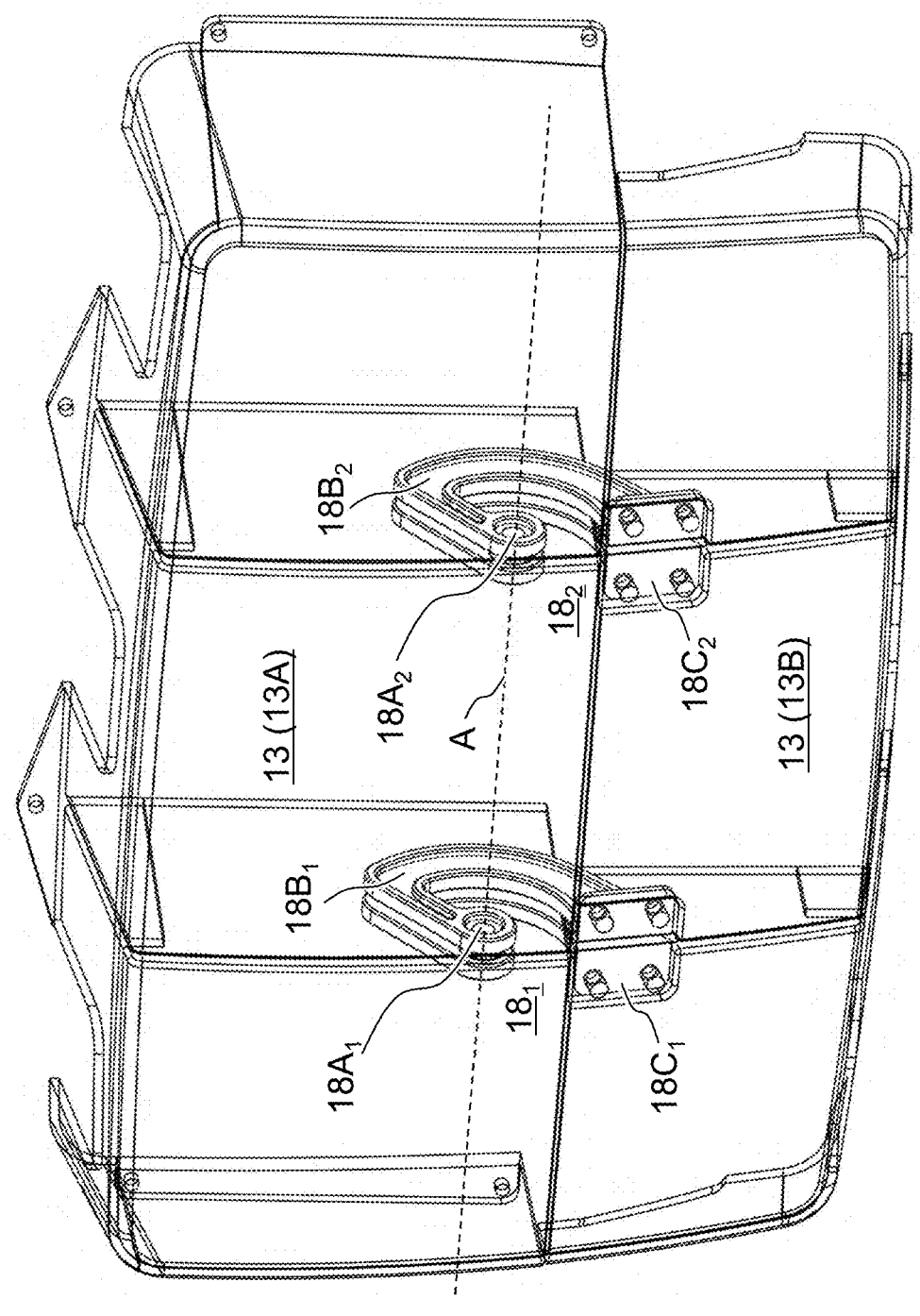
FIG. 11B is an external transparent view of a charge port cover according to a preferred embodiment of the present invention.
Figure 11C:
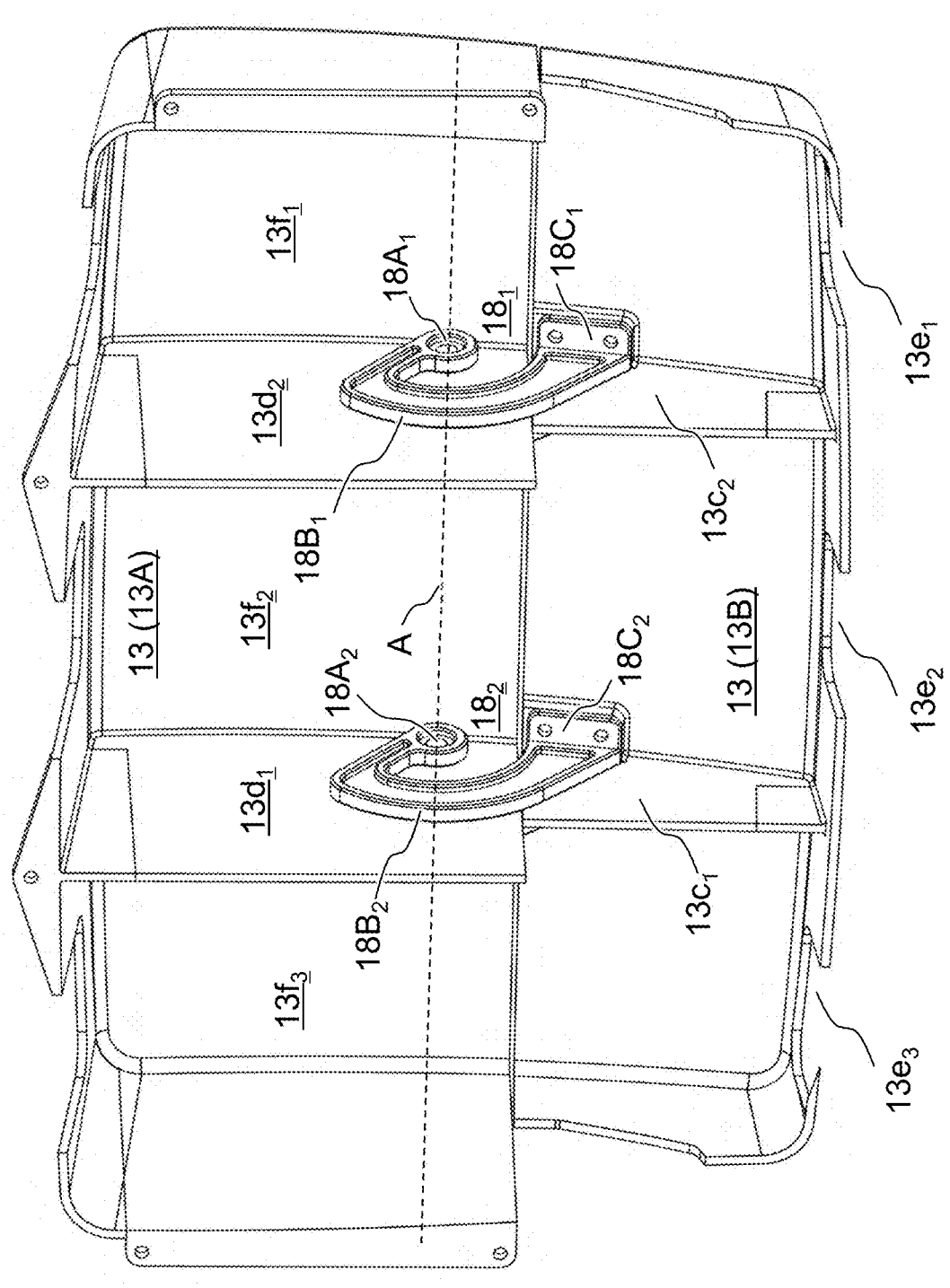
FIG. 11C is an internal solid view of a charge port cover according to a preferred embodiment of the present invention.
Figure 11D:
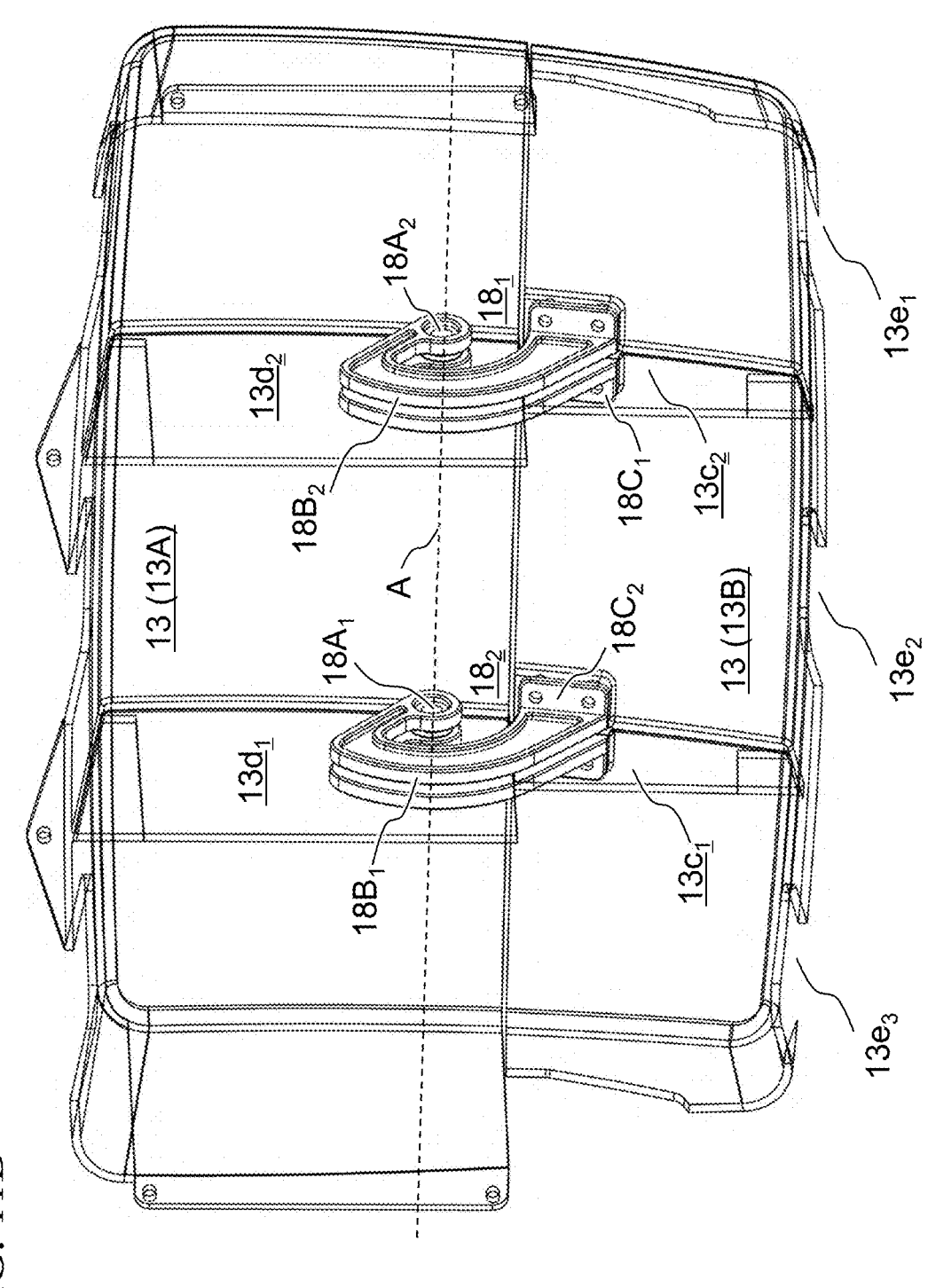
FIG. 11D is an internal transparent view of a charge port cover according to a preferred embodiment of the present invention.

FIG. 11A is an external solid view of the charge port cover 13 (13A, 13B) according to a preferred embodiment of the present invention. FIG. 11B is an external transparent view of a charge port cover 13 (13A, 13B) according to a preferred embodiment of the present invention. FIG. 11C is an internal solid view of a charge port cover according to a preferred embodiment of the present invention. FIG. 11D is an internal transparent view of a charge port cover according to a preferred embodiment of the present invention. As shown in FIGS. 11A-11D, the cover 13 includes a fixed portion 13A and a movable portion 13B that moves about an axis A. The fixed portion 13A of the cover 13 and the movable portion 13B of the cover 13 are connected by a hinge 18. At least a portion ($18A_1$, $18A_2$) of the hinge 18 is located between two of the DC charge ports 19A-19C.

Figure 12A:
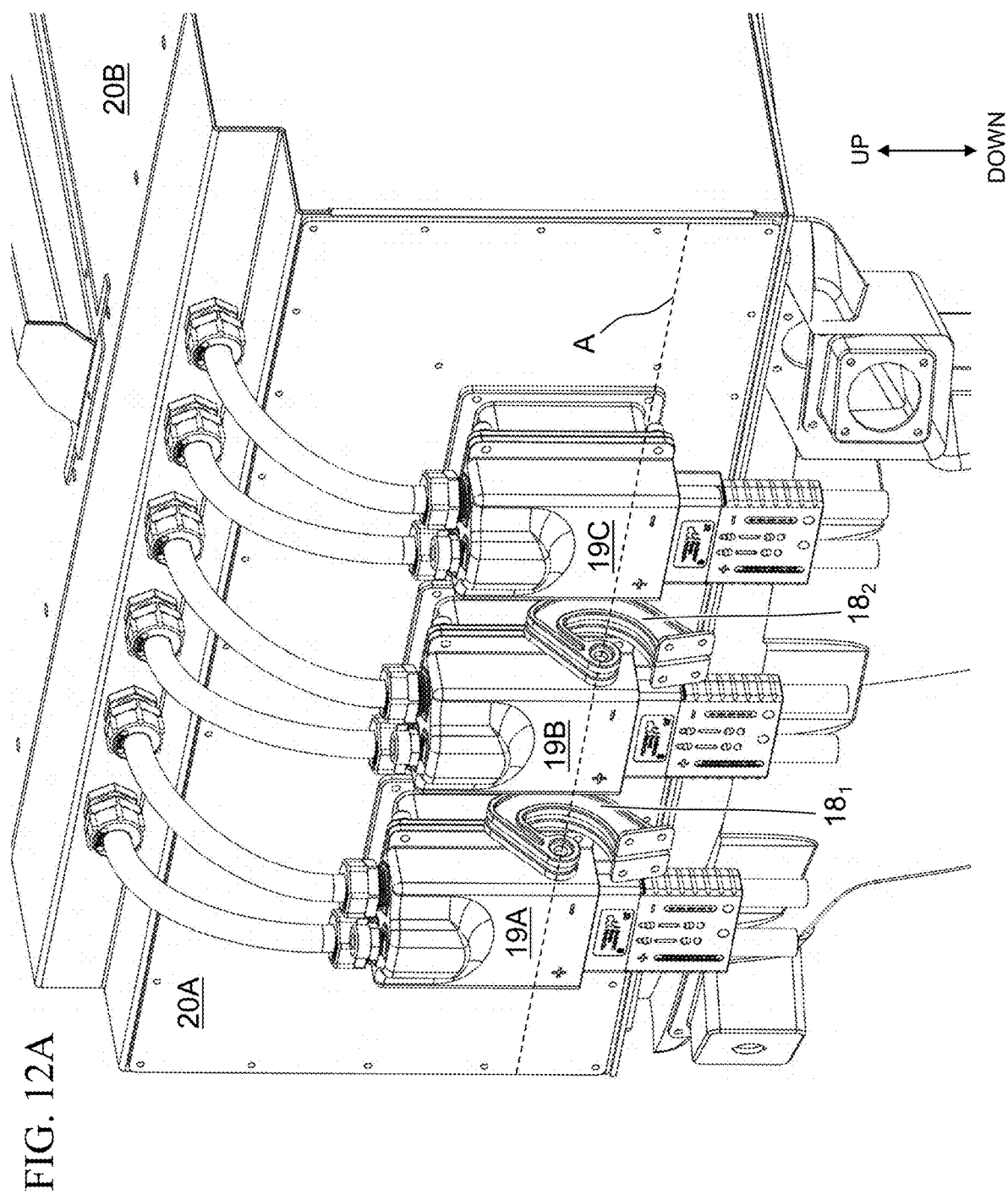
FIG. 12A is a perspective view of a PDU housing and layout of DC charging ports according to a preferred embodiment of the present invention.

FIG. 12A is a perspective view of a PDU housing 20A and layout of the DC charging ports 19A-19C according to a preferred embodiment of the present invention. In FIG. 12A, the charge port cover 13 is omitted (not shown). As shown in FIG. 12A, the receptacle of each of the DC charge ports 19A-19C extends below the movable axis A in the vertical direction (up-down direction). A first portion $18_1$ of the hinge 18 is located between the DC charge ports 19A and 19B. A second portion $18_2$ of the hinge 18 is located between the DC charge ports 19B and 19C.

Figure 12B:
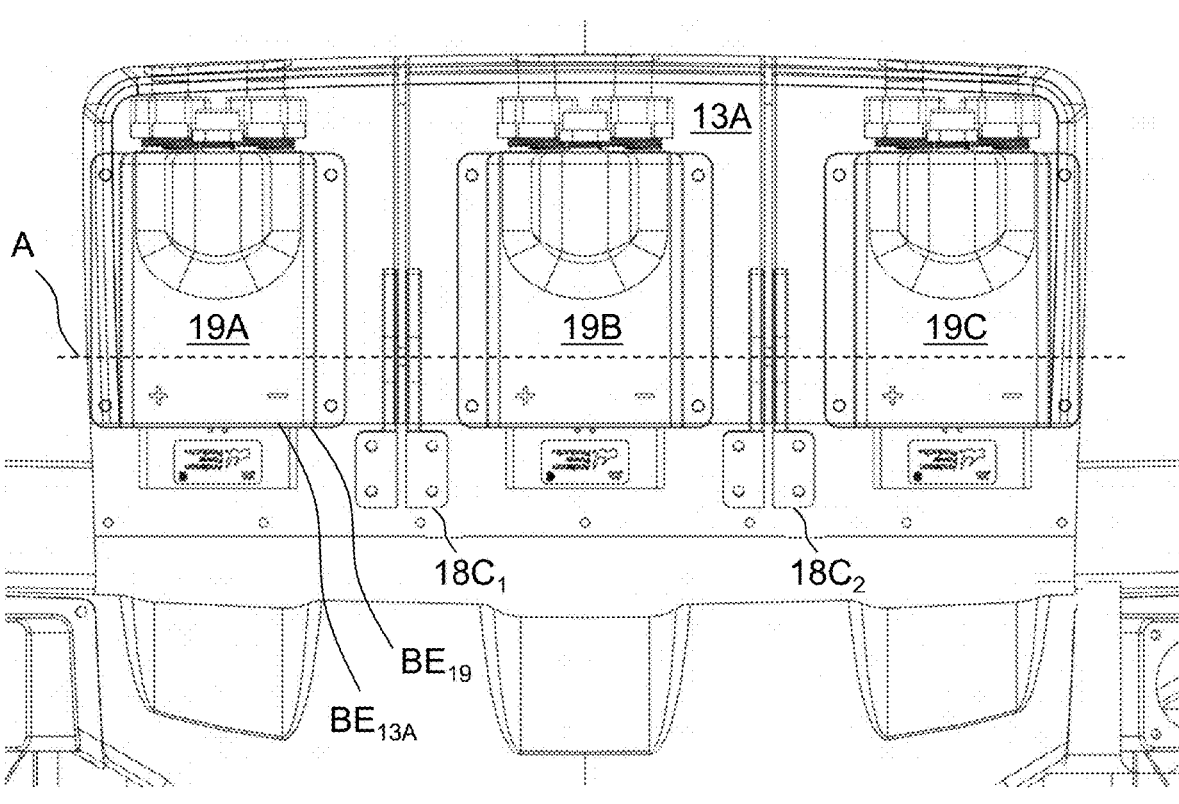
FIG. 12B is a front facing view of a layout of DC charging ports according to a preferred embodiment of the present invention.
Figure 12B:
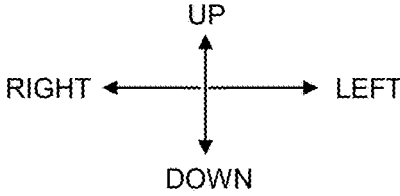

FIG. 12B is a front facing view of a layout of the DC charging ports 19A-19C according to a preferred embodiment of the present invention. In FIG. 12B, the fixed portion 13A of the charge port cover 13 is transparent, and the movable portion 13B of the cover 13 is omitted (not shown). As shown in FIG. 12B, a bottom edge $BE_{19}$ of each of the DC charge ports 19A-19C is positioned below a bottom edge $BE_{13A}$ of the fixed portion 13A of the charge port cover 13. Since the bottom edge $BE_{19}$ of the DC charge ports 19 is located below the fixed portion 13A of the cover 13, the DC charge ports 19 are visible when the movable portion 13B over the cover 13 is opened.

Referring to FIGS. 11B-11D, the first hinge portion 181 includes a hinge bearing $18A_1$, a hinge arm $18B_1$, and a connection portion $18C_1$. Likewise, the second hinge portion $18_2$ includes a hinge bearing $18A_2$, a hinge arm $18B_2$, and a connection portion $18C_2$. The movable axis A extends through the hinge bearings $18A_1$ and $18A_2$. Each of the hinge arms $18B_1$, $18B_2$ has a curved shaped and connects the hinge bearing $18A_1$, $18A_2$ to the connection portion $18C_1$, $18C_2$, respectively. The connection portion $18C_1$, $18C_2$ is attached to the movable portion 13B of the cover 13. Thus, the fixed portion 13A of the cover 13 and the movable portion 13B of the cover 13 are connected by the hinge portions $18_1$ and $18_2$.

As shown in FIG. 12B, at least a connection portion $18C_1$ of the first hinge portion $18_1$ is located between the first DC charge port 19A and the second DC charge port 19B. Likewise, as shown in FIG. 12B, at least a connection portion $18C_2$ of the second hinge portion $18_2$ is located between the second DC charge port 19B and the third DC charge port 19C.

As shown in FIGS. 11C and 11D, the fixed portion 13A of the cover 13 defines a plurality of compartments $13f(13f_1, 13f_2, 13f_3)$ that are each separated by a wall $(13d_1, 13d_2)$, and the wall $(13d_1, 13d_2)$ supports the hinge $(18_1$ and $18_2)$ that is connected to the movable portion 13B of the cover 13. The movable portion 13B of the cover 13 includes wall portions $13c_1$ and $13c_2$ that are aligned with the wall portions $13d_1$, $13d_2$ of the fixed portion 13A. As shown in FIGS. 11C and 11D, each of the hinge arms $18B_1$, $18B_2$ includes a double-arm structure in which the wall portions $13c_1$, $13c_2$ and wall portions $13d_1$, $13d_2$ extend therebetween, respectively.

Figure 13:
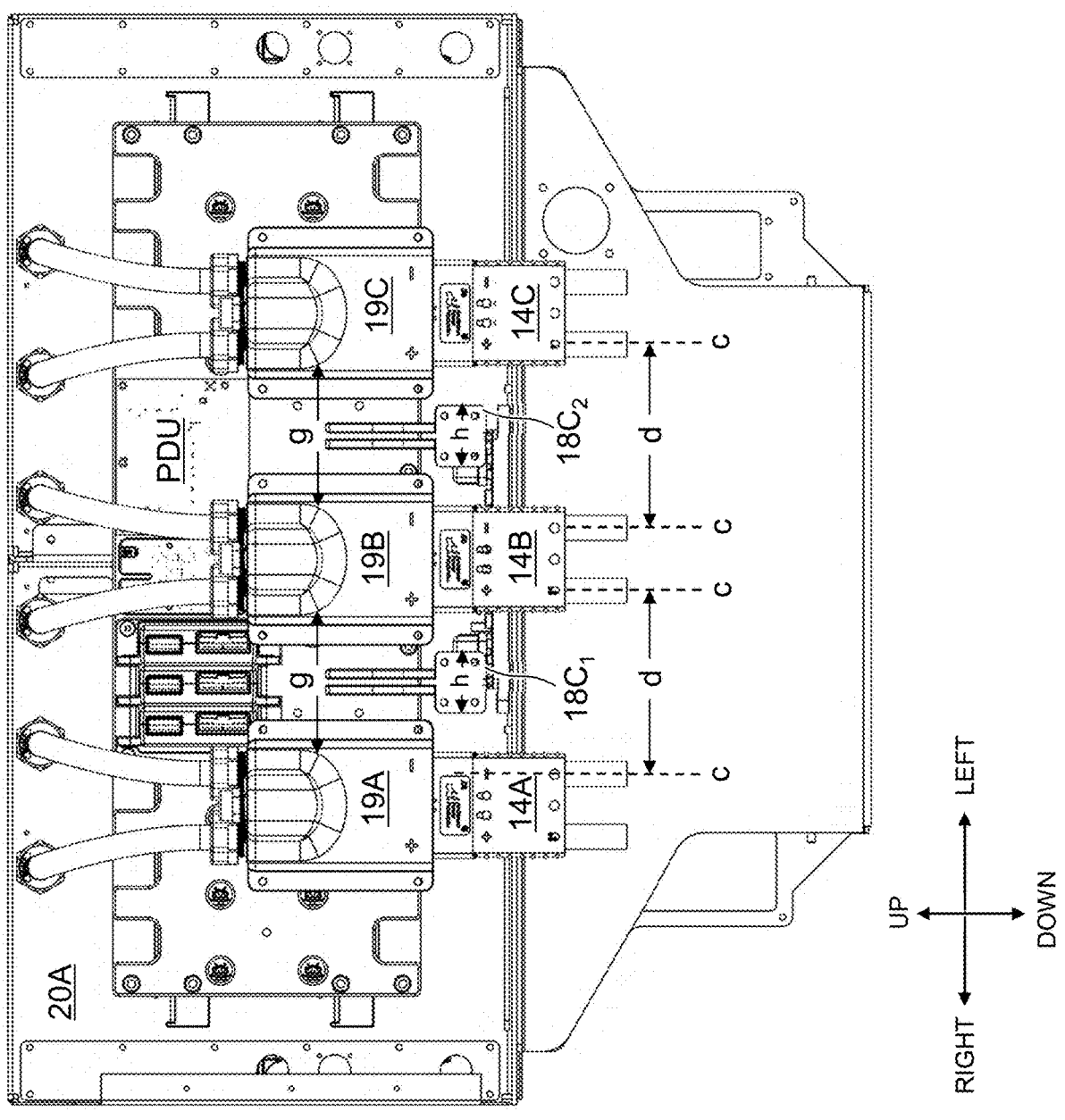
FIG. 13 is a front facing view of a PDU housing and layout of DC charging ports according to a preferred embodiment of the present invention.

FIG. 13 is a front facing view of the PDU housing 20A and layout of the DC charging ports 19A-19C according to a preferred embodiment of the present invention. In FIG. 13, the portions of the PDU 20A are omitted to show the PDU which is situated behind the DC charging ports 19A-19C. As shown in FIG. 13, at least a connection portion $18C_1$ of the hinge is located between the first DC charge port 19A and the second DC charge port 19B, and at least a connection portion $18C_2$ of the hinge is located between the second DC charge port 19B and the third DC charge port 19C. A distance d between a center of the cable or the wire harness 14A connected to the first DC charge port 19A and a center of the cable or the wire harness 14B connected to the second DC charge port 19B is greater than a width h of the connection portion $18C_1$ of the hinge that is located between the first DC charge port 19A and the second DC charge port 19B. Likewise, a distance d between a center of the cable or the wire harness 14B connected to the second DC charge port 19B and a center of the cable or the wire harness 14C connected to the third DC charge port 19C is greater than a width h of the connection portion $18C_2$ of the hinge that is located between the second DC charge port 19B and the third DC charge port 14C.

Figure 14A:
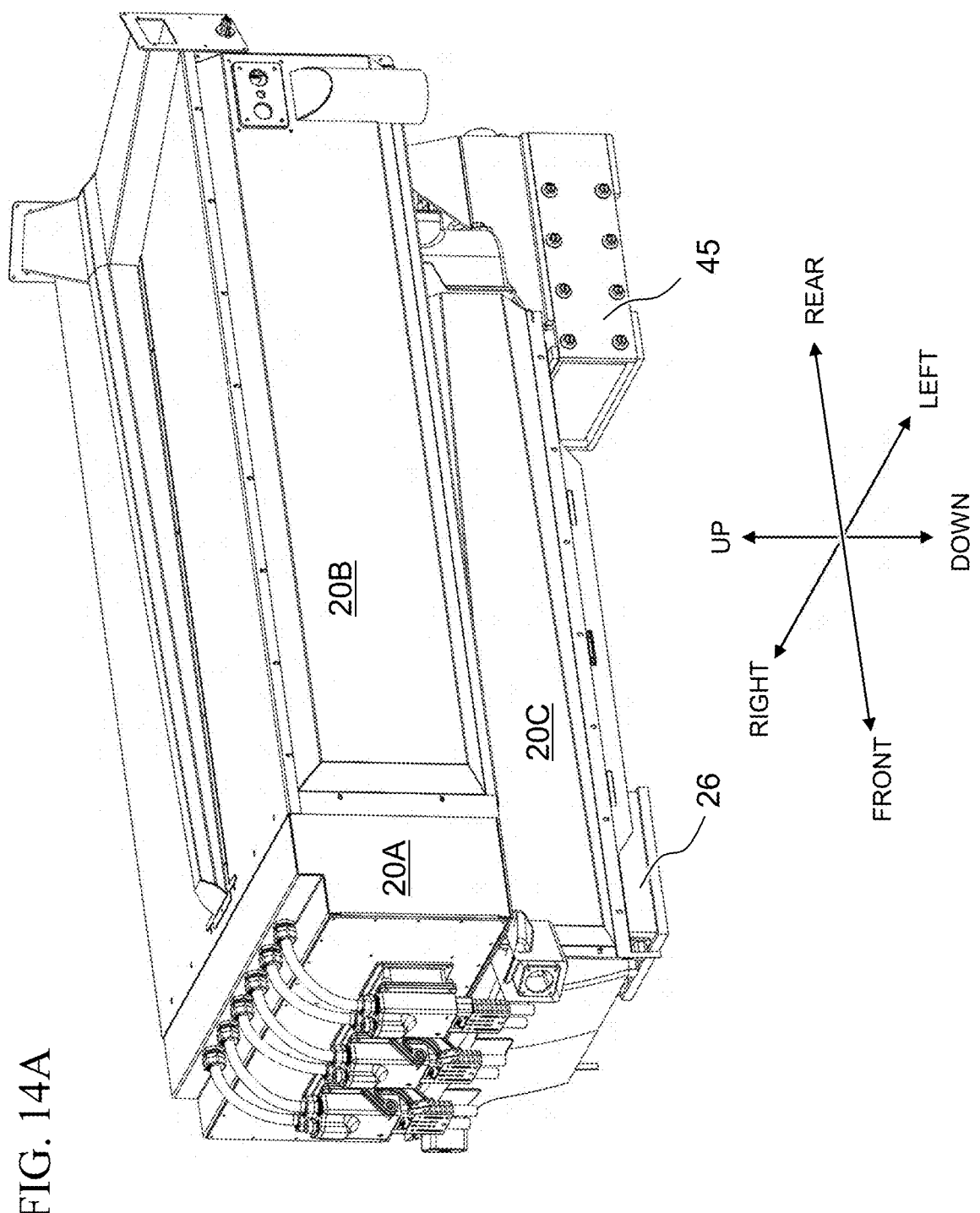
FIG. 14A is a perspective view of a battery pack according to a preferred embodiment of the present invention.

FIG. 14A is a perspective view of the battery pack according to a preferred embodiment of the present invention. As shown in FIG. 14A, the motor 45 is mounted rearwards of the second housing 20C and beneath the first housing 20B.

Figure 14B:
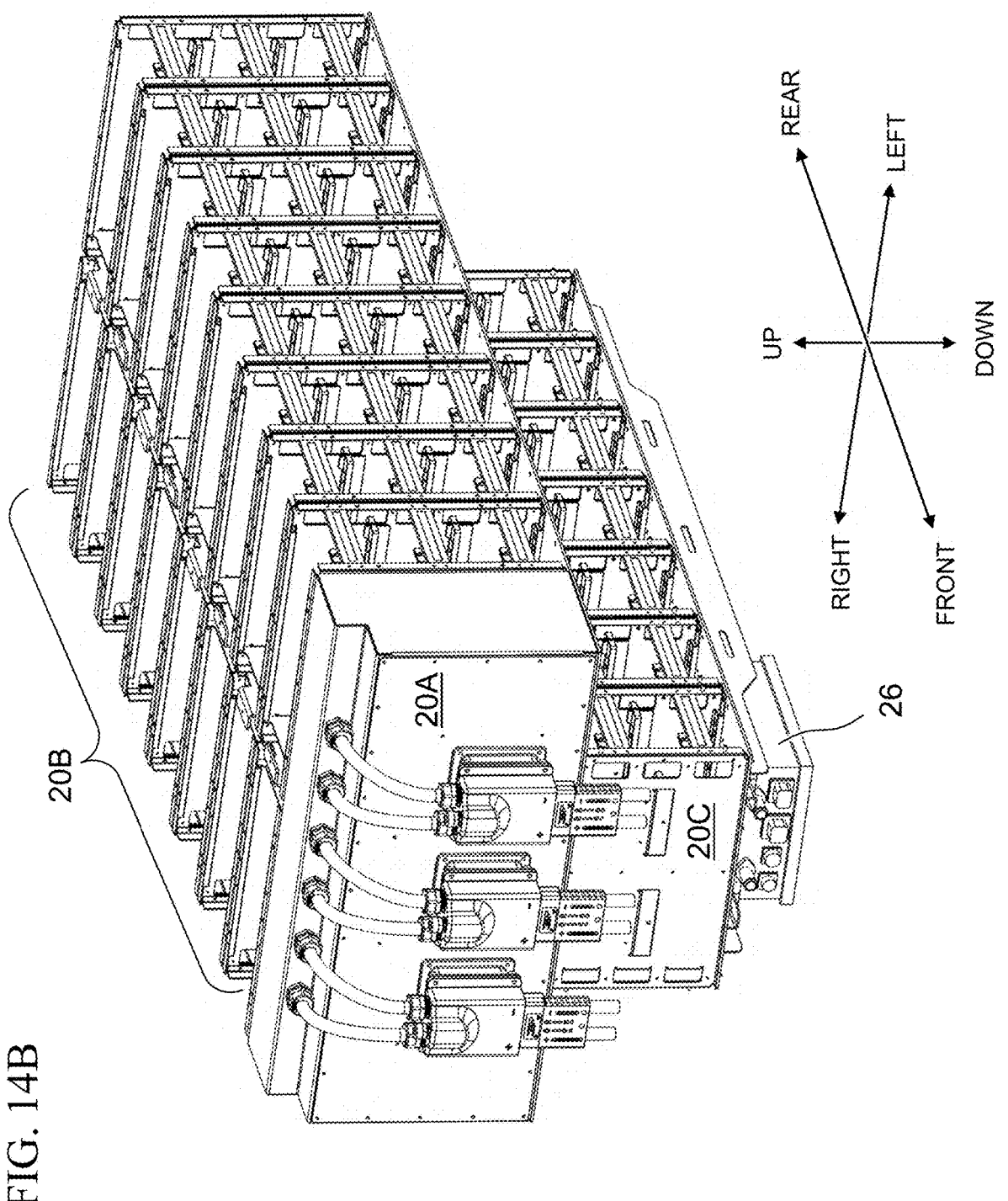
FIG. 14B is a perspective view of a battery pack according to a preferred embodiment of the present invention, with battery housing portions shown in transparency.

FIG. 14B is a perspective view of a battery back according to a preferred embodiment of the present invention, with battery housing portions shown in transparency.

Figure 14C:
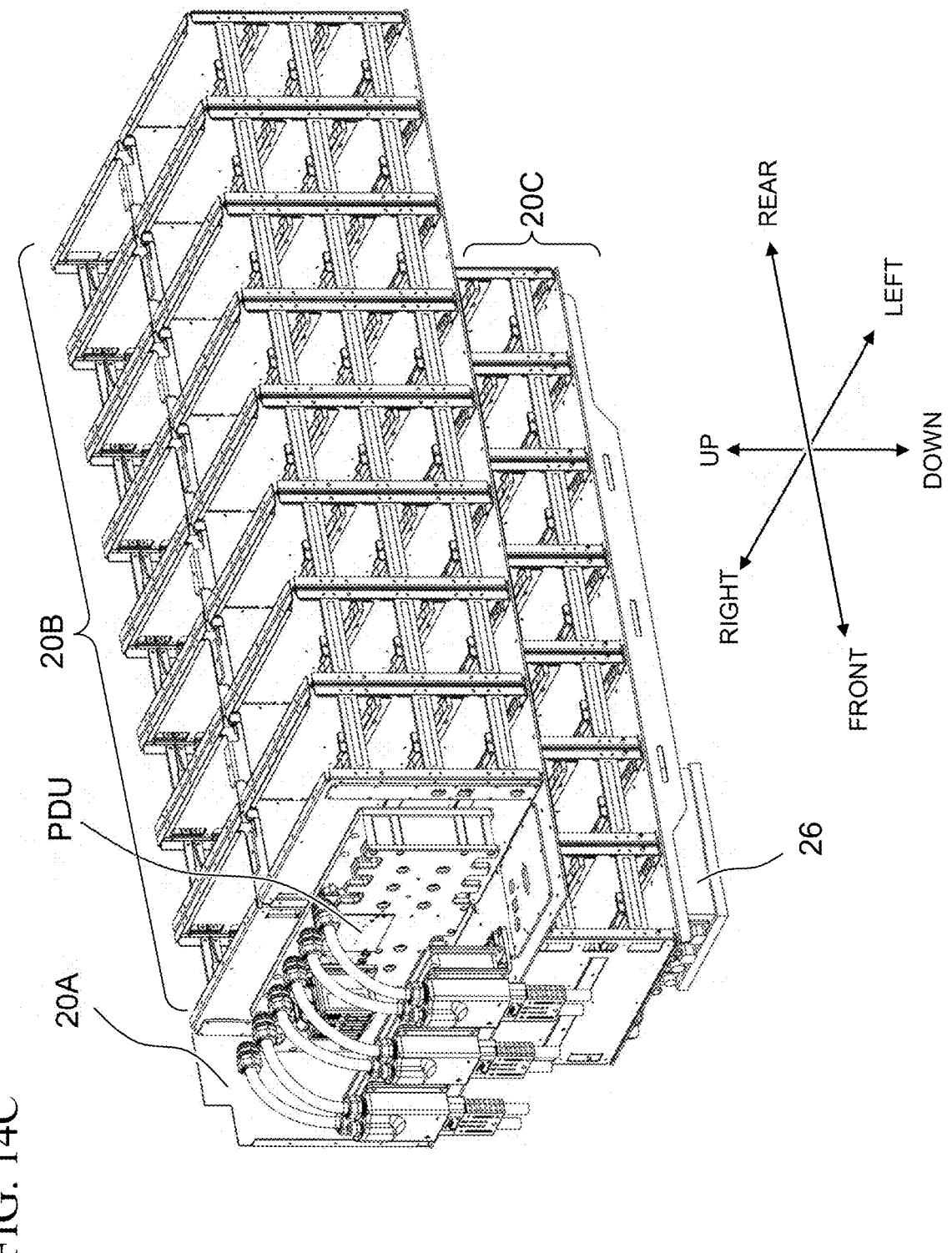
FIG. 14C is a perspective view of a battery pack according to a preferred embodiment of the present invention, with battery housing portions and a PDU housing portions removed.

FIG. 14C is another perspective view of a battery back according to a preferred embodiment of the present invention, with battery housing portions and a PDU housing portions removed. As shown in FIG. 14C, for example, the PDU housing 20A and the first housing 20B overlap in the front-rear direction. The PDU housing 20A is located above the second housing 20C in the up-down direction. The first housing 20B is located above the second housing 20C in the up-down direction.

Figure 15:
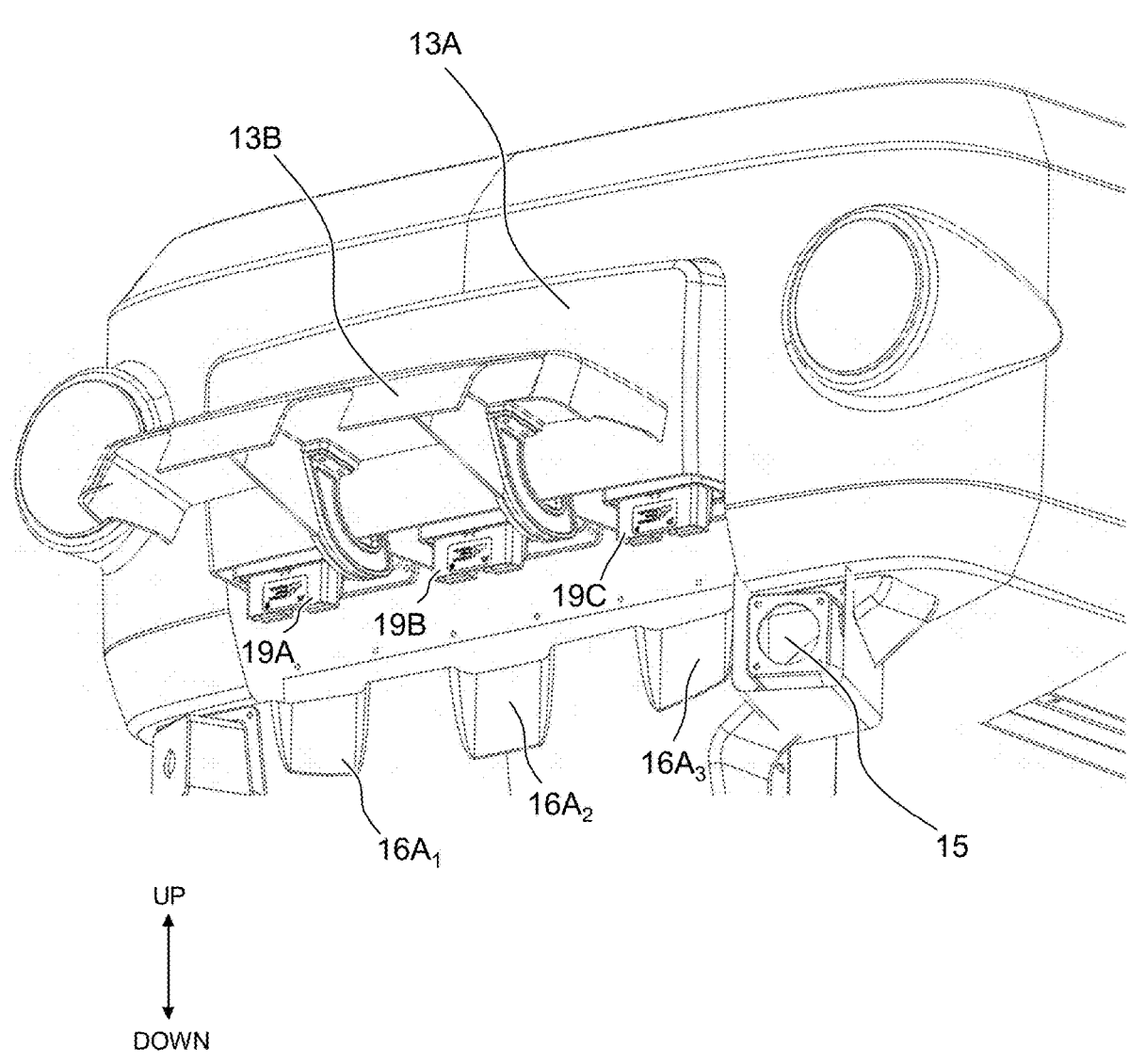
FIG. 15 shows a charge port cover in an open position according to a preferred embodiment of the present invention.
Figure 16A:
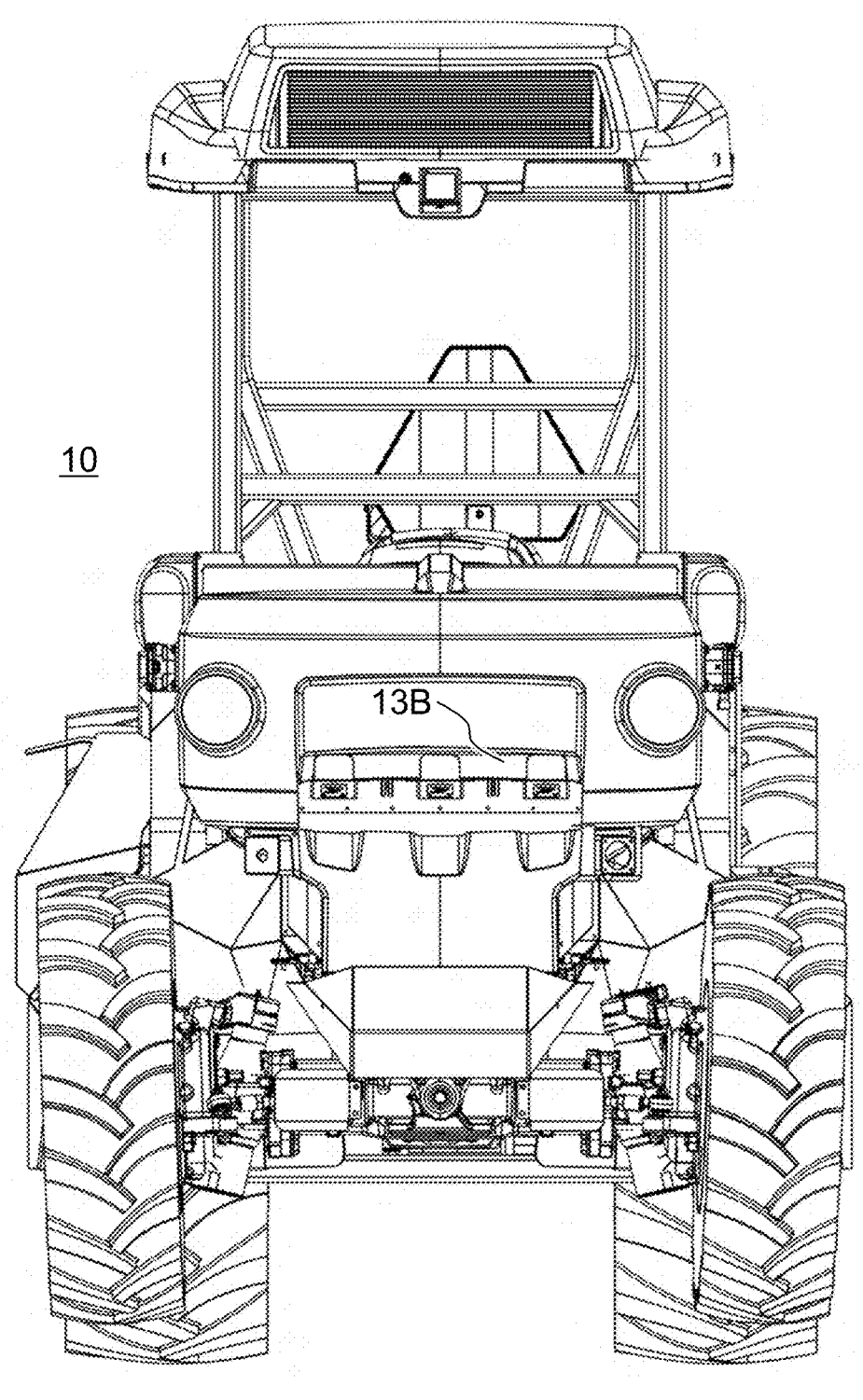
FIG. 16A shows a front facing view of an EV with a charge port cover in an open position according to a preferred embodiment of the present invention.
Figure 16B:
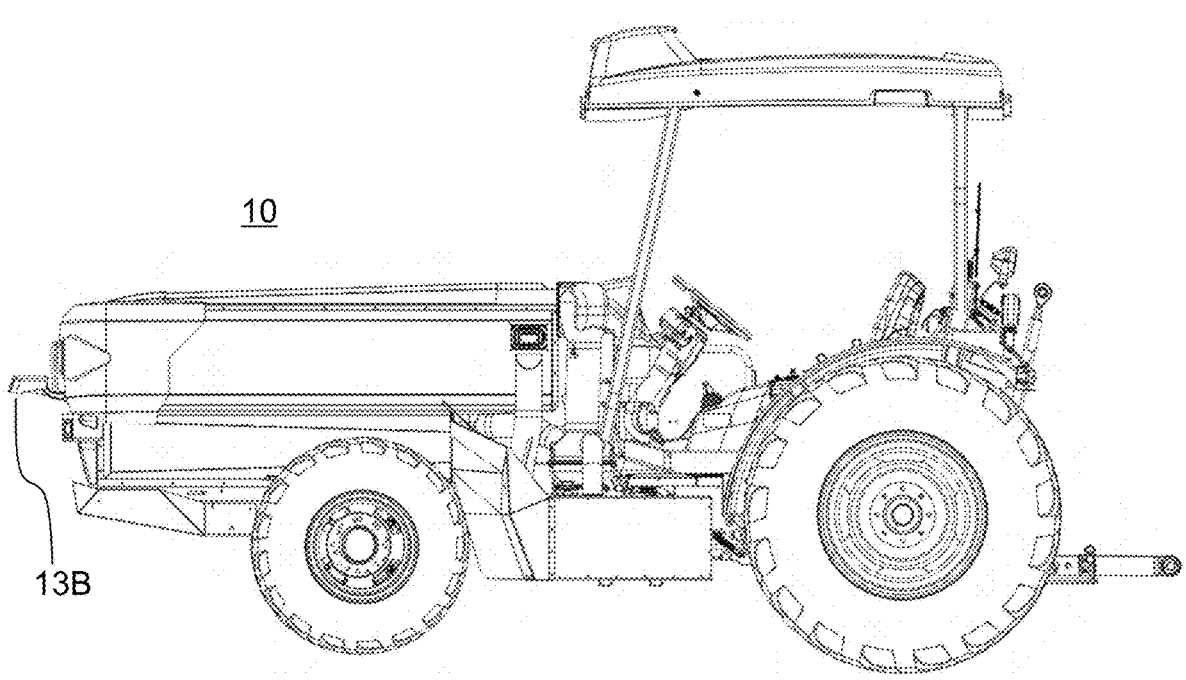
FIG. 16B shows a side view of an EV with a charge port cover in an open position according to a preferred embodiment of the present invention.

FIG. 15 shows the charge port cover 13 (13A, 13B) in an open position according to a preferred embodiment of the present invention. In FIG. 15, the movable portion 13B, that is movable about the movable axis A shown in FIGS. 11B-11D and FIG. 12, is at an open position to expose the DC charge ports 19A-19C. Each of the charge ports 19A-19C includes receptacles that extend in the vertical direction (up-down direction). FIG. 16A shows a front facing view of the electric vehicle (EV) 10 with the movable portion 13B of the charge port cover in the open position. FIG. 16B shows a side view of the EV 10 with the movable portion 13B of the charge port cover in the open position. As shown in FIG. 15, the receptacles of each of the DC charge ports 19A-19C is configured to receive a cable or a wire harness, such as the three (3) external HV cables including DC cable harnesses 14A (including cables 17), 14B (including cables 17), 14C (including cables 17) shown in FIG. 6B.

As shown in FIGS. 6B, 11C, 11D, and 15, the movable portion 13B of the charge port cover 13 includes openings $13e_1$, $13e_2$, $13e_3$ that are vertically aligned with the DC charge ports 19A, 19B, 19C, respectively. This structure allows the movable portion 13B to be in the closed position while the DC Fast Charging system is connected to the electric vehicle 10, as shown in FIG. 6B. Thus, the connections between the three DC Fast Charge Plugs DCFC1, DCFC2, DCFC3 (DC charge ports 19A, 19B, 19C) and the DC cable harnesses 14A, 14B, 14C can be covered and protected while charging, which mitigates the risk of accidental disconnection or high voltage electric shock.

With the configuration of the EV 10 including the DC charge ports 19A-19C, AC charge port 15, and charge port cover 13 described above, preferred embodiments of the present invention provide an electric vehicle that is capable of being charged via a DC Fast Charging system, or alternatively, by AC grid power (mains electricity).

The following preferred embodiments shown in FIGS. 17-19 will now be described with respect to emergency-stop (E-stop) switches of the electric vehicle a drive-by-wire (DBW) system of the electric vehicle.

According to preferred embodiments of the present invention, there are two types of E-Stops switches. A first type includes E-stop switches for the EV system which are located on the two front supporting beams to the cabin, one in the front of the tractor, and at least one on the top of the a rear fender of vehicle. The second type is a drive-by-wire (DBW) E-stop switches for the drive-by-wire (DBW) system that is on a dashboard (DAB) of the vehicle. The E-stop switches may be provided as any type of switch, such as a large button or key to be pressed, lever, or a toggle switch.

Figure 17A:
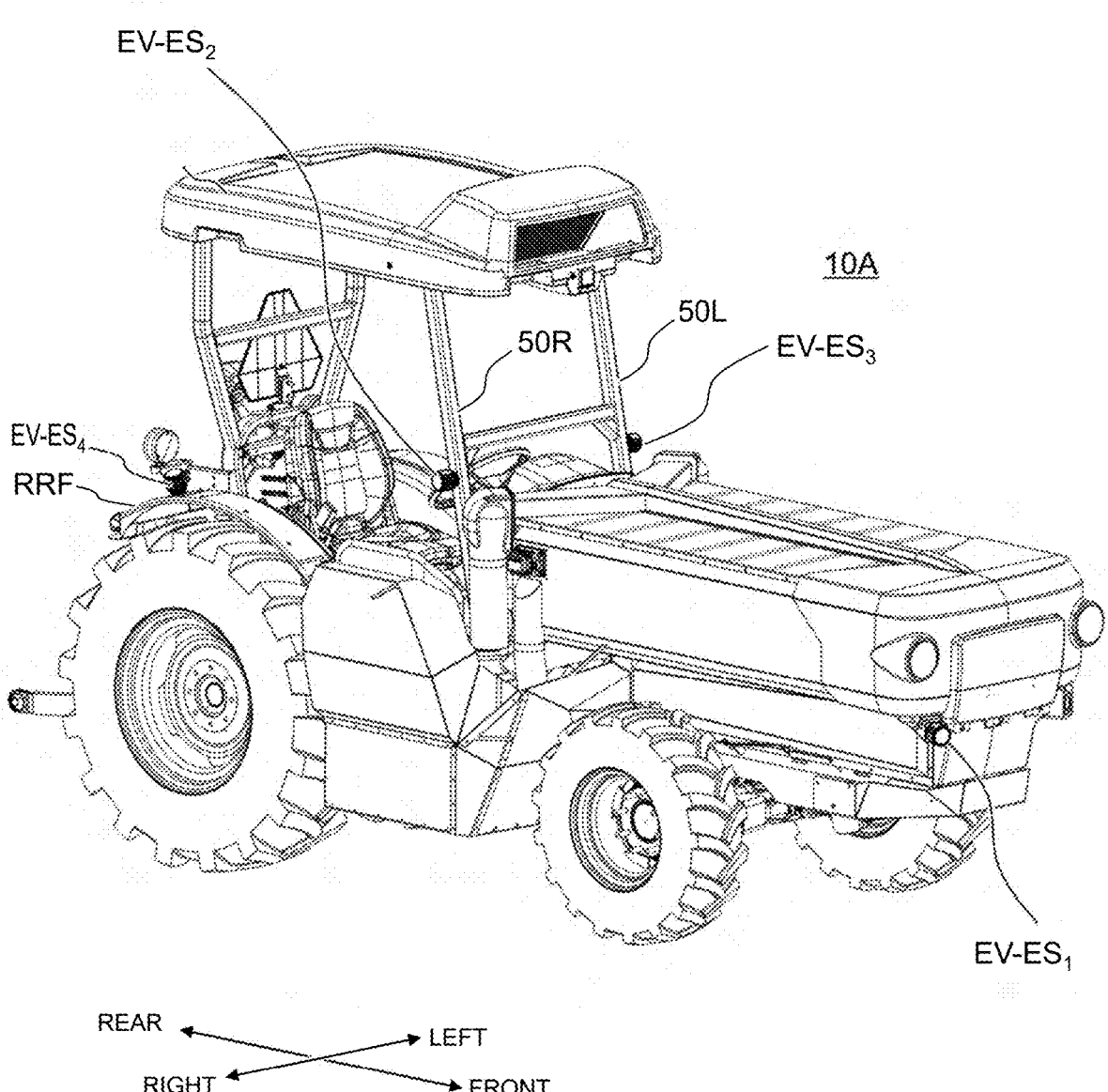
FIG. 17A is a perspective right-front view of an electric vehicle including emergency-stop switches according to a preferred embodiment of the present invention.

FIG. 17A shows is a perspective right-front view of an electric vehicle 10A according to a preferred embodiment of the present invention including electric vehicle emergency-stop switches $EV\text{-}ES_1$, $EV\text{-}ES_2$, $EV\text{-}ES_3$, and $EV\text{-}ES_4$. A first E-stop switch $EV\text{-}ES_1$ is located at a front surface of the EV 10A, preferably at a side corner portion of the EV 10A, as shown in FIG. 17A. In this preferred embodiment, the first E-stop switch $EV\text{-}ES_1$ extends at an angle that is offset from the rear-front direction of the vehicle. Preferably, the first E-stop switch $EV\text{-}ES_1$ extends at an angle of less than about 90 degrees and greater than about 45 degrees with respect to the front-rear direction of the EV 10A. Such configuration allows a person to easily access and press (trigger) the E-stop switch $EV\text{-}ES_1$ without having to stand directly in front of the vehicle, for example, while the vehicle as moving. The EV emergency stop switch $EV\text{-}ES_1$ is configured to disconnect the battery pack from the power distribution unit (PDU) when any one of these EV emergency stop switches is activated (triggered or pressed by a person). By providing the first E-stop switch $EV\text{-}ES_2$ at a side corner portion of the EV 10A and extending at an angle that is offset from the rear-front direction of the electric vehicle as shown in FIG. 17A, in a scenario when the moving vehicle is unmanned and autonomously driven, and the vehicle needs to be shutdown immediately in case of an emergency, a person can press or trigger the E-stop switch $EV\text{-}ES_1$ to power down and disable the vehicle without having to stand directly in front of the moving vehicle.

As shown in FIG. 17A, additional E-stop switches $EV\text{-}ES_2$, $EV\text{-}ES_3$, and $EV\text{-}ES_4$ (second, third, and fourth EV emergency stop switches) may be provided on the vehicle 10A. The EV E-stop switch $EV\text{-}ES_2$ is located at a right-side surface of the EV 10A, and the EV E-stop switch $EV\text{-}ES_3$ is located at a left-side surface of the EV 10A. In this preferred embodiment, the EV E-stop switch EV-ES$_2$ is located on a right cabin frame beam 50R of the EV 10A, and the EV E-stop switch EV-ES$_3$ is located on a left cabin frame beam 50L of the EV 10A. The EV E-stop switch EV-ES$_4$ is located at a rear surface of the EV 10A. In this preferred embodiment, the EV E-stop switch EV-ES$_4$ is located on a right rear fender RRF of the EV 10A. Each of the EV emergency stop switches EV-ES$_1$, EV-ES$_2$, EV-ES$_3$, and EV-ES$_4$ is configured to disconnect the battery pack from the power distribution unit (PDU) when any one of these EV emergency stop switches is activated (triggered or pressed by a person). By providing an E-stop switch at each of the front, left, right, and rear sides of the vehicle, an emergency stop switch can be access and triggered by a person from any side of the vehicle.

Figure 17B:
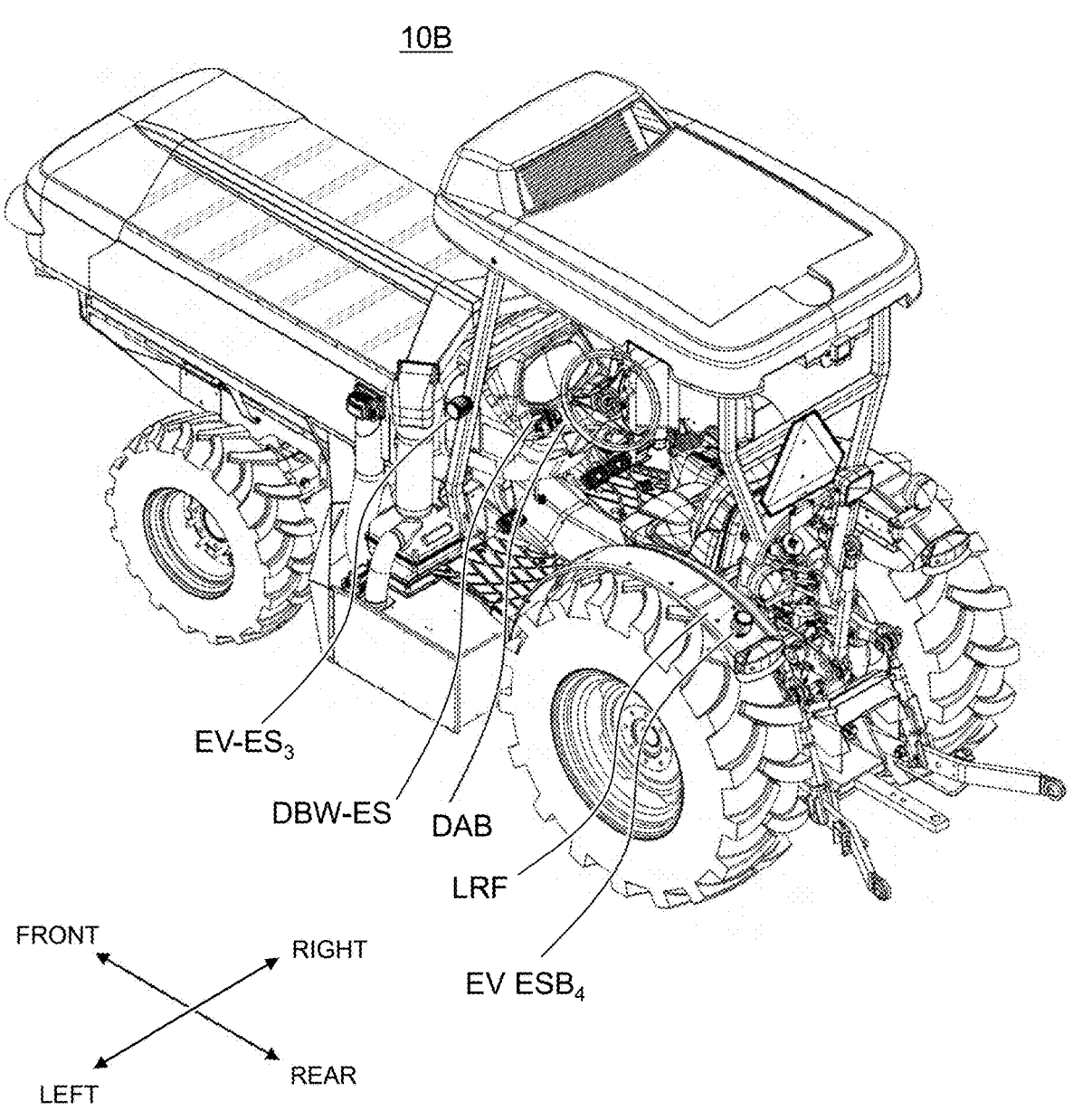
FIG. 17B is a perspective right-rear view of an electric vehicle including emergency-stop switches according to a preferred embodiment of the present invention.

FIG. 17B shows is a perspective right-rear view of an electric vehicle 10B according to a preferred embodiment of the present invention including electric vehicle emergency-stop switches EV-ES$_3$ and EV-ES$_4$ and a drive-by-wire emergency stop switch DBW-ES located on a dashboard (DAB) of the electric vehicle 10B. In this embodiment shown in FIG. 17B, the emergency stop switch EV-ES$_4$ is located on a left rear fender LRF, instead of the right rear fender RRF as shown in FIG. 17A. The details and function of the drive-by-wire emergency stop switch DBW-ES will be described further below.

Figure 17C:
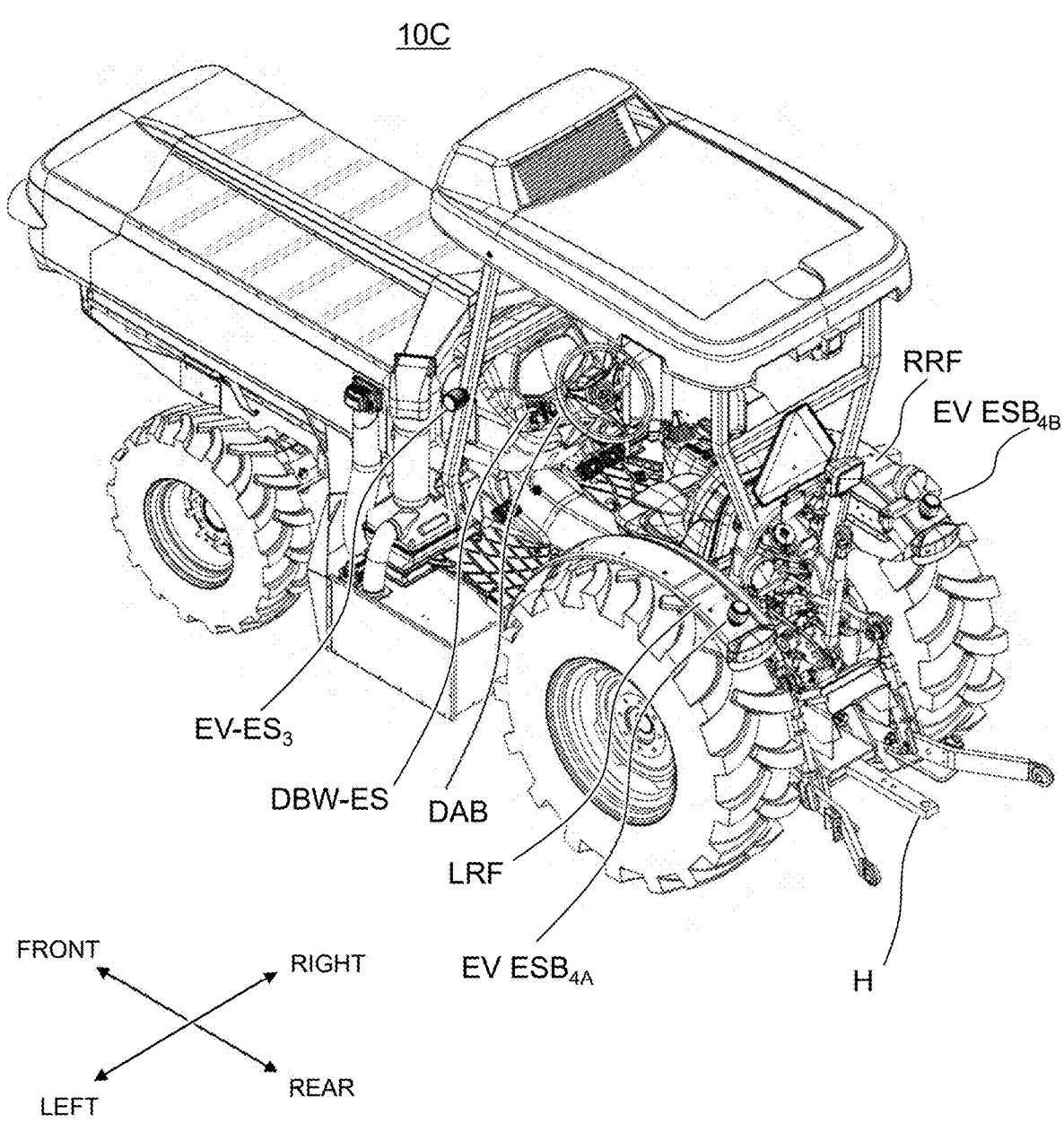
FIG. 17C is a perspective right-rear view of an electric vehicle including emergency-stop switches according to another preferred embodiment of the present invention.

FIG. 17C shows is a perspective right-rear view of an electric vehicle 10C according to a preferred embodiment of the present invention including electric vehicle emergency-stop switches EV-ESB$_{4A}$ and EV-ESB$_{4B}$. In this embodiment shown in FIG. 17C, two emergency-stop switches EV-ESB$_{4A}$ and EV-ESB$_{4B}$ are provided at the rear of the vehicle, one on each of the left rear side and the right rear side. The E-stop switch EV-ESB$_{4A}$ is located on a left rear fender LRF, and the E-stop switch EV-ESB$_{4B}$ is located on the right rear fender RRF. Such configuration of having the two emergency-stop switches EV-ESB$_{4A}$ and EV-ESB$_{4B}$ provided at each of the left rear side and the right rear side is particularly advantageous when a vehicle implement, such as a trailer, plow, or a tiller, is attached to hitch H at the rear of tractor (vehicle) 10C which would prevent a person from standing or positioning themselves directly behind the rear center of the tractor 10C.

Figure 18A:
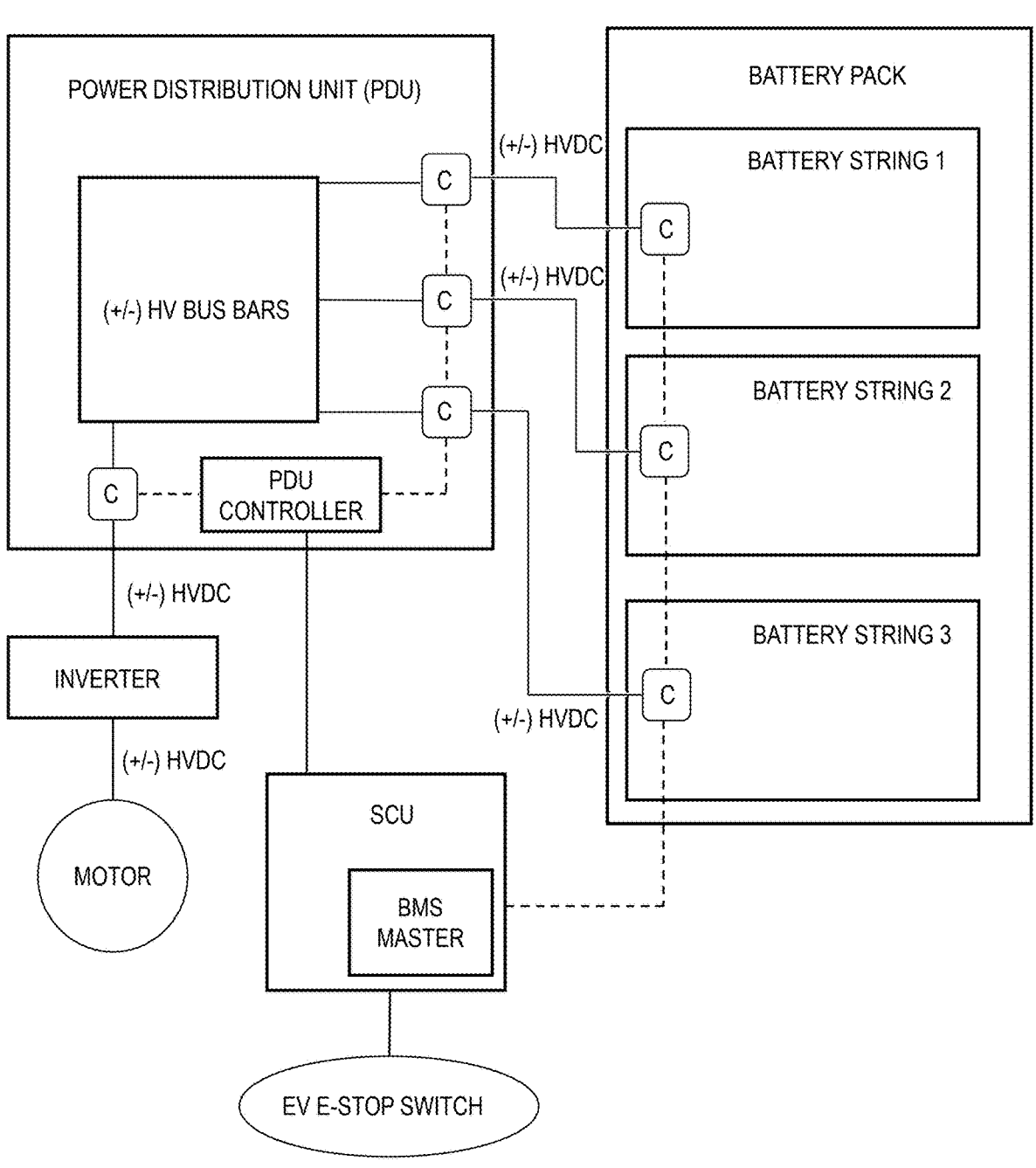
FIG. 18A is a block diagram of an electric vehicle (EV) emergency-stop (E-stop) switch circuit according to a preferred embodiment of the present invention.

FIG. 18A is a block diagram of an electric vehicle (EV) emergency-stop (E-stop) switch circuit according to a preferred embodiment of the present invention. If the EV E-stop switch is triggered, it will break the power for the contactors in the PDU as well as the power for the contactors in the battery pack. This can be triggered by control signals sent by the SCU and the BMS MASTER to the PDU Controller and battery back, as shown in FIG. 18A. In turn, this will preferably force all contactors to open. Thus, all HV power are disconnected in the electric vehicle. In other words, the EV E-stops will open battery contactors and PDU contactors shown in FIG. 3 such that the battery pack is disconnected from the rest of the vehicle. This means that the inverter and/or motor are deenergized. Referring to FIG. 2, both of the inverter and the OBC DC/DC also become deenergized when an EV E-stop switch is triggered so the 12V power bus will only be energized to the exhaustion of the 12V battery. Once the 12V battery is exhausted, all systems will be powered down. The two types of E-Stops are independent but since the EV E-stops do not directly affect the DBW system, once the 12V battery is exhausted, the DBW will also be powered down. In a preferred embodiment, detection of high voltage interlock loops (HVILs) may be implemented by a PDU controller and communicated to the SCU which will then open the contactors, as shown in FIG. 18A.

Figure 18B:
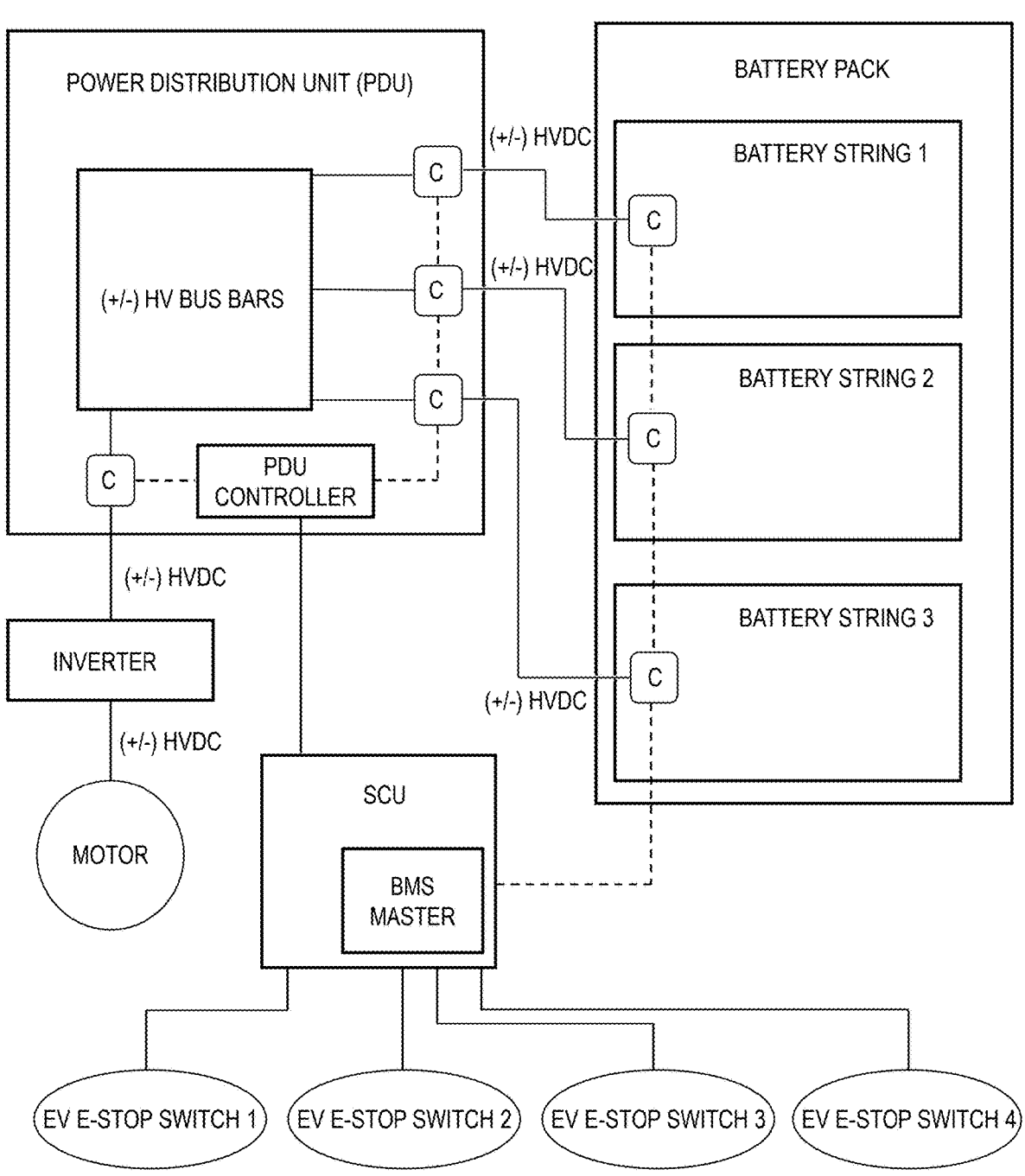
FIG. 18B is a block diagram of an electric vehicle (EV) emergency-stop (E-stop) switch circuit according to another preferred embodiment of the present invention.

FIG. 18B is a block diagram of an electric vehicle (EV) emergency-stop (E-stop) switch circuit according to another preferred embodiment of the present invention which includes four EV E-stop switches 1-4 instead of one. These four EV E-Stop switches 1-4 in FIG. 18B may correspond to, for example, the four EV emergency stop switches EV-ES$_1$, EV-ES$_2$, EV-ES$_3$, and EV-ES$_4$ shown in FIG. 17A.

Figure 19:
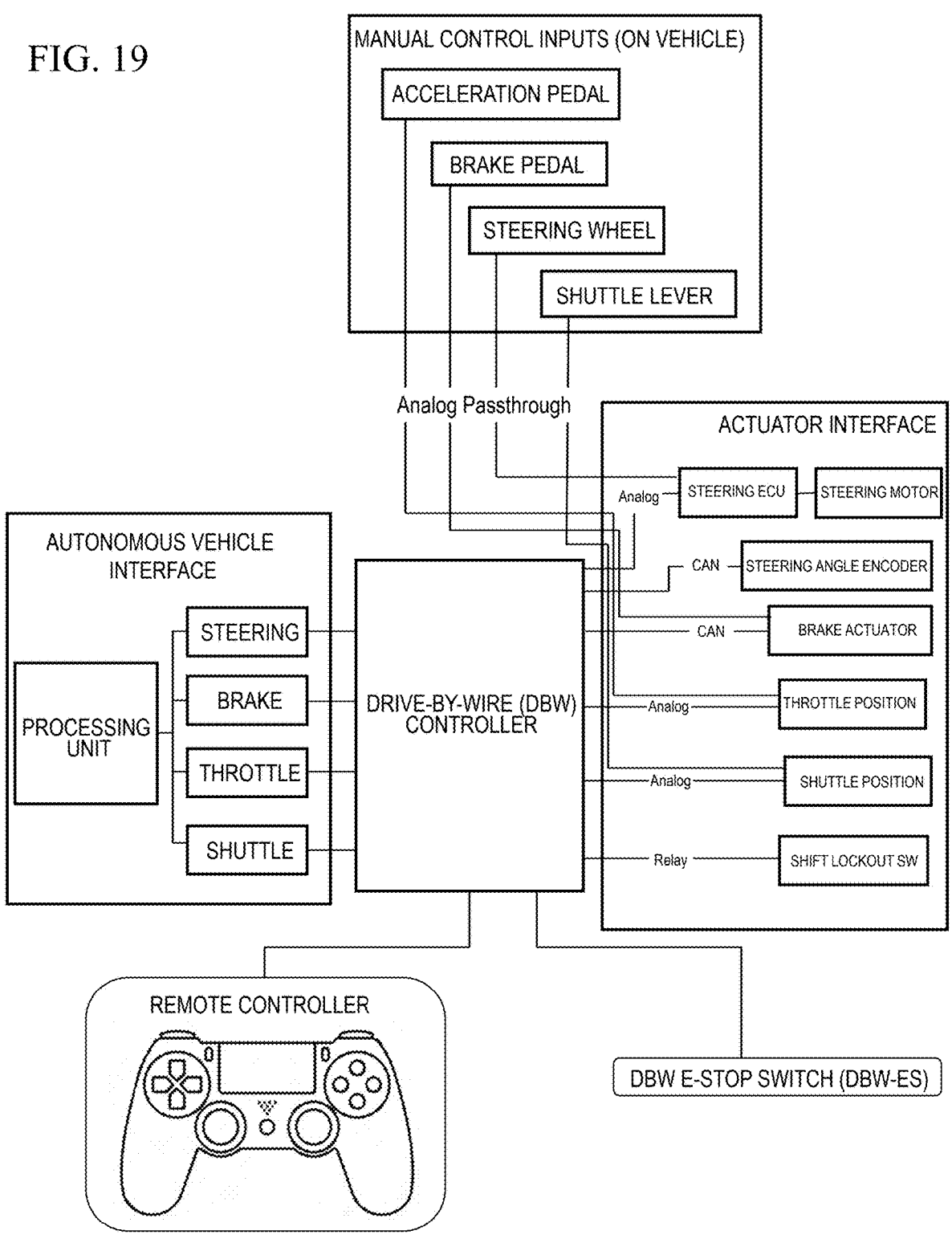
FIG. 19 is a block diagram of a drive-by-wire (DBW) system according to a preferred embodiment of the present invention.

FIG. 19 is a block diagram of a drive-by-wire (DBW) system according to a preferred embodiment of the present invention. The drive-by-wire (DBW) system is an electronic control system which generates analog signals that behave identically to vehicle sensors used to detect human input, such as pushing the brake pedal, throttle pedal, or moving the steering wheel. As shown in FIG. 19, a processing unit is primarily responsible for setting up the CAN connection for the DBW system to send commands to the steering ECU, steering angle encode, brake actuator, and various other actuators of the tractor. The processing unit may receive autonomous navigation commands and send appropriate encoded CAN messages for steering, acceleration, and brake to the DBW controller. When the DBW E-stop switch DBW-ES is activated (i.e., when the DBW E-stop button DBW-ES is pushed by a user or operator of the vehicle), a DBW controller switches the DBW function from an active state to an inactive state. As a result, all DBW functions are shutdown and the tractor can only be driven with manual control. In a preferred embodiment, the DBW controller can receive control signals from an autonomous vehicle interface or a by a remote controller, as shown in FIG. 19. When the DBW E-stop switch DBW-ES is activated, the functionality of the autonomous vehicle interface and/or the manual operation of DBW (remote controller) is disabled. More specifically, the DBW E-stop triggers a failsafe mode in which the DBW controller will terminate the injection of any new commands to the actuator interface and force analog passthrough in all aspects: steering, braking, and acceleration. "Analog passthrough" means that only manual input operations (pressing the accelerator pedal, pressing the brake pedal, turning the steering wheel, switching the shuttle lever position) are enabled.

In a preferred embodiment, the tractor, when started, is in manual mode by default. In order for the tractor to navigate autonomously, the tractor is controlled by the DBW system. The DBW system may include a gamepad controller, as shown in FIG. 19, to enable and disable control of the tractor. To enable DBW control, the user presses a pre-assigned specific button or command. Since the tractor can be electronically controlled by the DBW system, the joysticks of the controller can also be used to provide commands to the DBW system. The user can teleoperate (teleop) the tractor via the joysticks as shown on in FIG. 19. Another pre-assigned specific button can be used to correspond to or act as a dead man's switch i.e., the DBW will only accept commands from the autonomous vehicle interface only if the user presses the other pre-assigned specific button. The controller commands can be configured such that if the user releases the button, the tractor will come to a halt.

As shown in FIGS. 17B and 17C, the DBW E-stop switch DBW-ES is preferably located on a dashboard (DAB) of the vehicle 10B (10C). Referring to FIG. 19, the drive-by-wire (DBW) system includes a first mode of operation and a second mode of operation, and the DBW E-stop switch DBW-ES is configured to switch the drive-by-wire (DBW) system from the first mode of operation to the second mode of operation when the DBW emergency stop switch is activated (i.e., triggered or pressed by an operator of the vehicle). In the first mode of operation, the drive-by-wire (DBW) system controls functions of steering, braking, and acceleration of the EV via the DBW controller. This first mode of operation may include receiving control signals from the autonomous vehicle interface or the remote controller, as described above. In the second mode of operation, drive-by-wire (DBW) functions of steering, braking, and acceleration of the EV are disabled such that only "analog passthrough" of manual control inputs (pressing the accelerator pedal, pressing the brake pedal, turning the steering wheel, or switching the shuttle lever position) are enabled.

Preferred embodiments of the present invention provide structures and arrangements which can be used to support an electric motor on a vehicle. The vehicle may preferably be an electric tractor with wheels, electric heavy machinery with tracks, an electric car, etc. The electric motor is able to be affixed to the vehicle in a manner that permits easy and efficient connection between the electric motor and electrical and mechanical components of the vehicle while still providing protection of the electric motor. Preferred embodiments of structures and arrangements which can be used to support an electric motor on a vehicle will now be described below.

Figure 20:
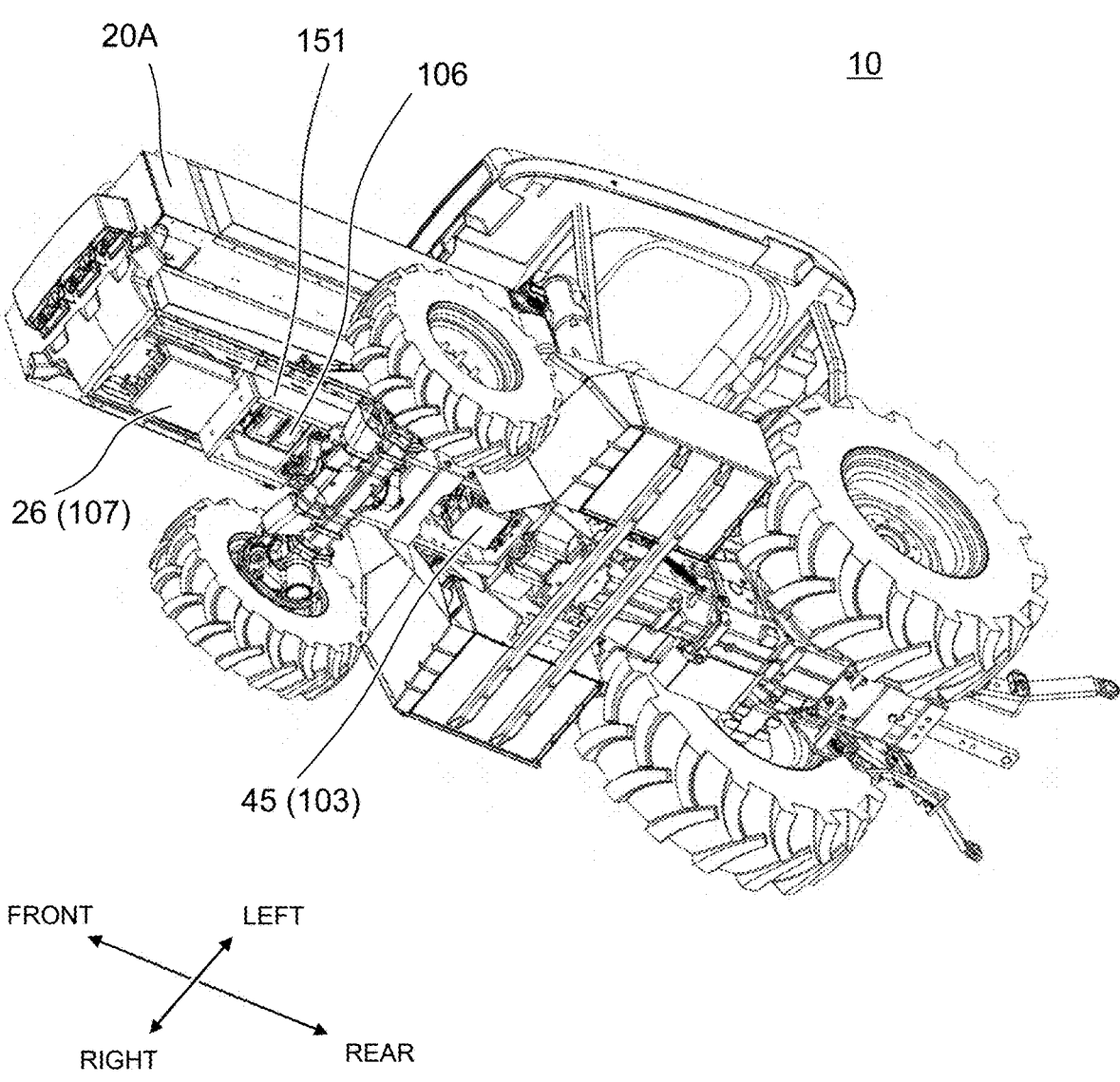
FIG. 20 shows a perspective bottom view of an electric vehicle according to a preferred embodiment of the present invention, with a front surface body portion removed.

FIG. 20 shows a perspective bottom view of an electric vehicle according to a preferred embodiment of the present invention, with a front surface body portion removed to expose and show the PDU housing 20A.

Figure 21A:
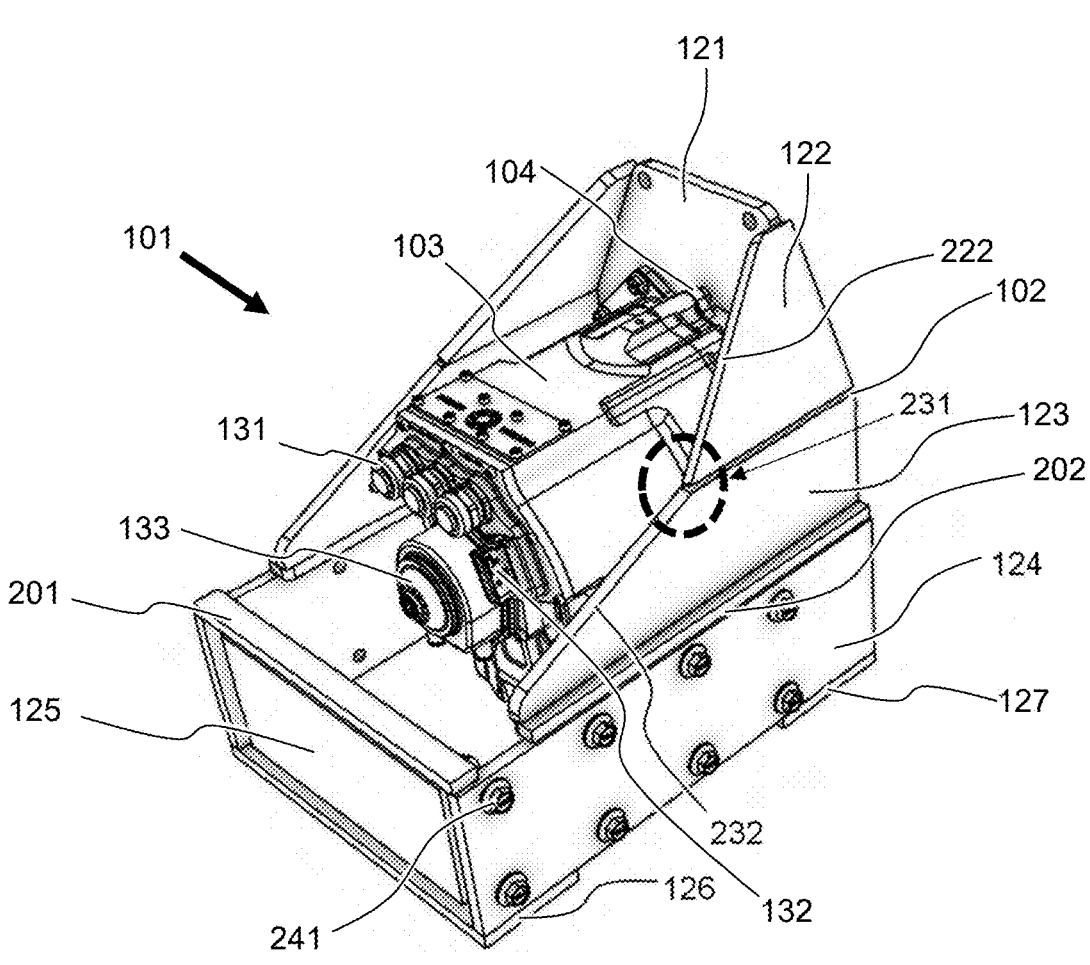
FIG. 21A shows a perspective view of an example of a motor assembly according to a preferred embodiment of the present invention.
Figure 21B:
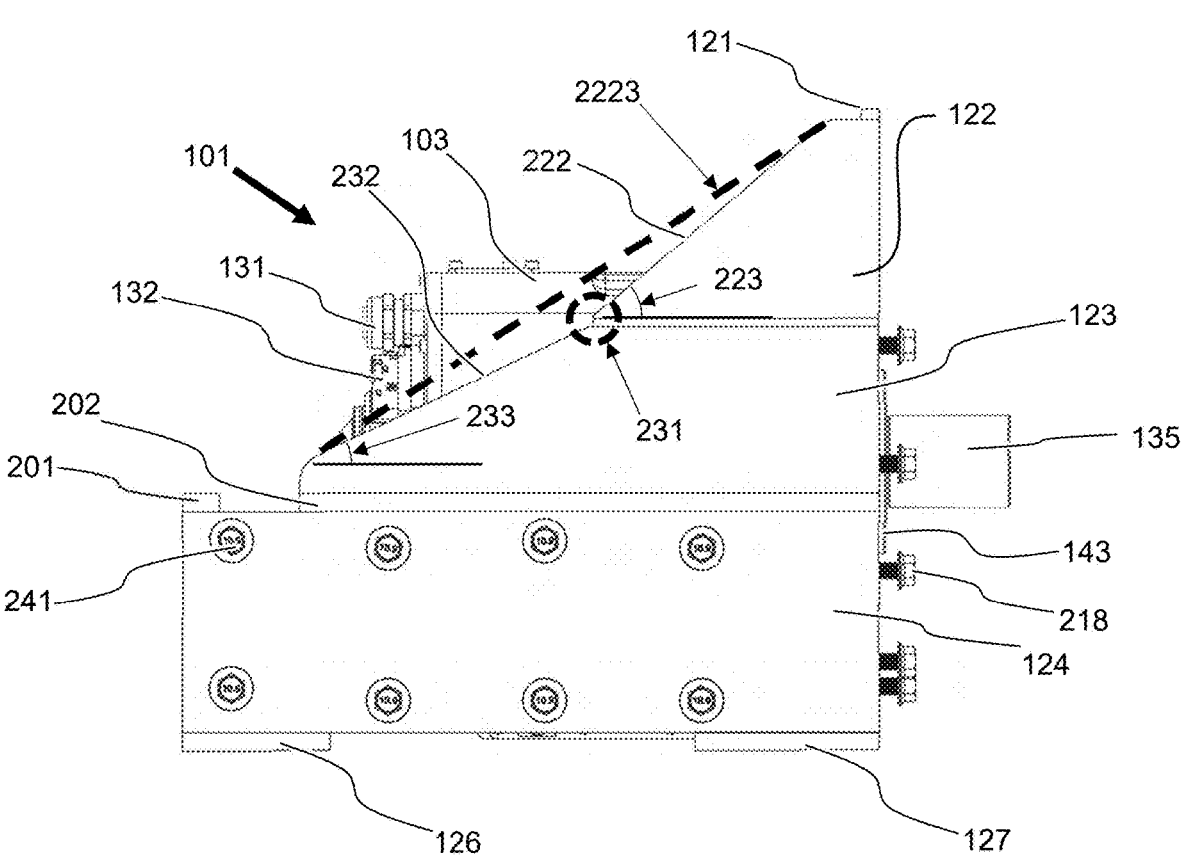
FIG. 21B shows a side view of an example of a motor assembly according to a preferred embodiment of the present invention.
Figure 21C:
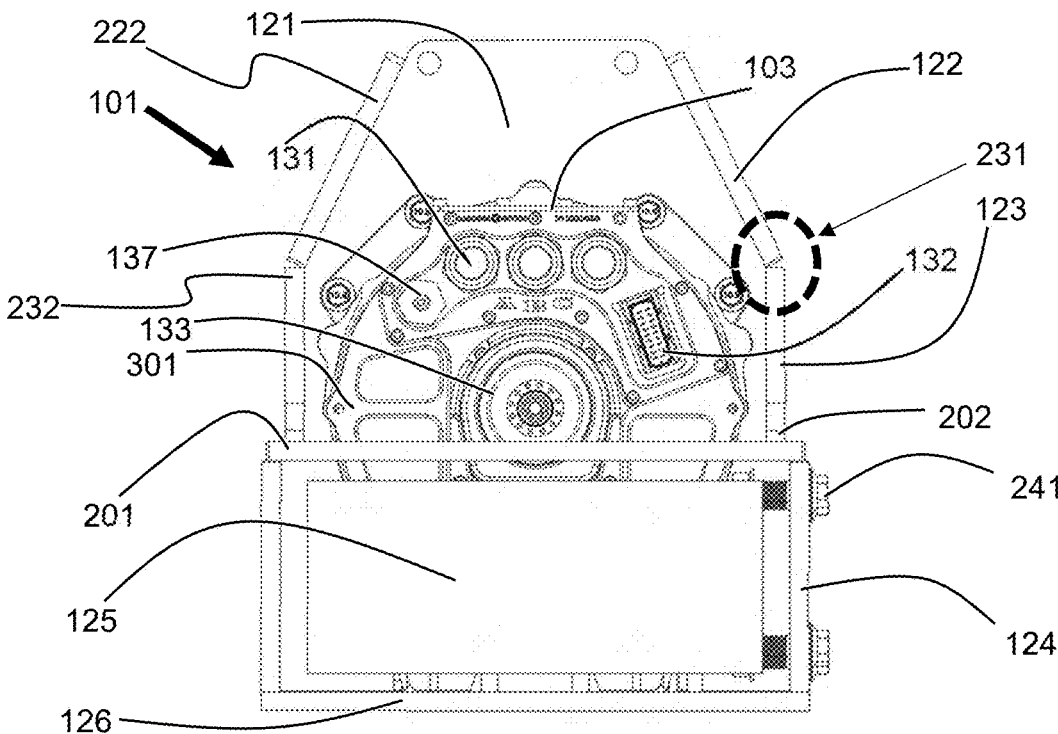
FIG. 21C shows a rear view of an example of a motor assembly according to a preferred embodiment of the present invention.
Figure 22:
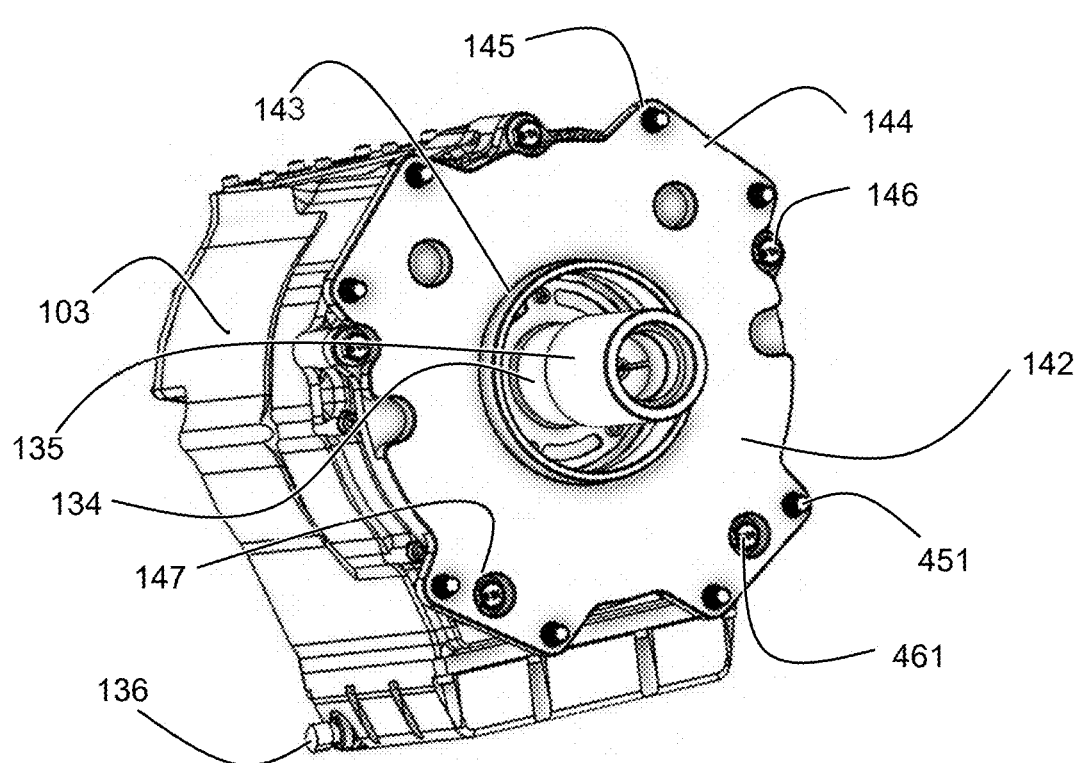
FIG. 22 shows a perspective view of an example of a front of a motor with an attached bracket according to a preferred embodiment of the present invention.
Figure 32:
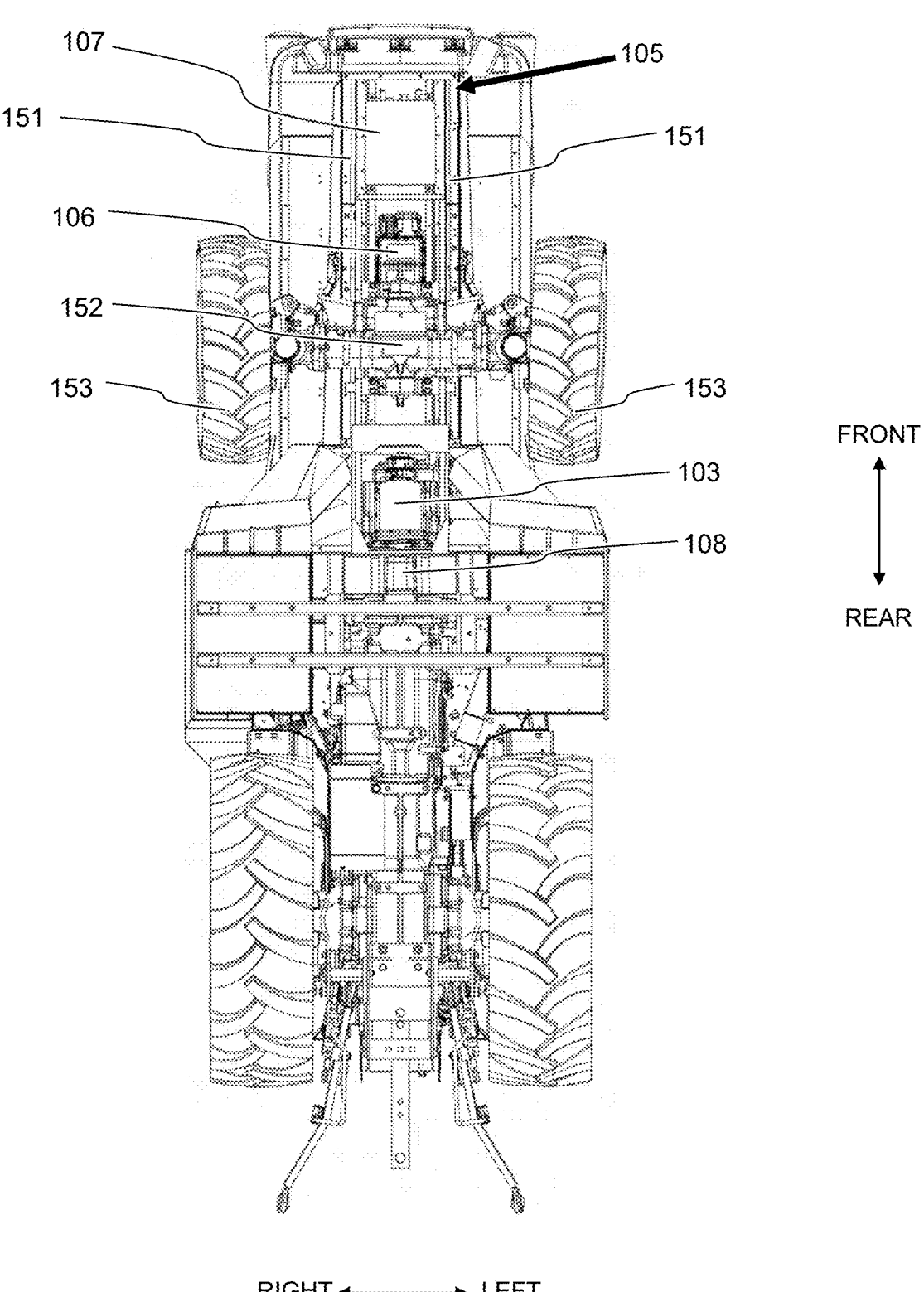
FIG. 32 shows a lower view of a vehicle according to a preferred embodiment of the present invention.

FIGS. 21A-21C show an example of a motor assembly 101 according to a preferred embodiment of the present invention. The motor assembly 101 preferably includes a frame housing 102 and a motor 103. The frame housing 102 is structured so as to protect and support the motor 103 while also allowing the motor 103 to be electrically connected to an inverter 106 and other electrical components, as well as mechanically connected to motive powertrain components of a vehicle such as a transmission 108, as shown in FIG. 32. As shown in FIGS. 21A-23, the motor 103 is preferably affixed to the frame housing 102 through a motor bracket 104. However, it would also be possible to encase the motor assembly 101 in a front axle or rear axle case of a vehicle. In such an arrangement, the motor 103 is preferably held by an inside of the axle case. In preferred embodiments of the present invention, a front of the motor 103 is preferably arranged to face a rear of the vehicle in which the motor 103 is mounted. In a preferred embodiment, the front of the motor 103 includes a shaft 134. This is shown, for example, in FIGS. 32 and 33. However, it would also be possible to locate the motor 103 such that a front of the motor faces a front of the vehicle, if so desired.

Figure 24:
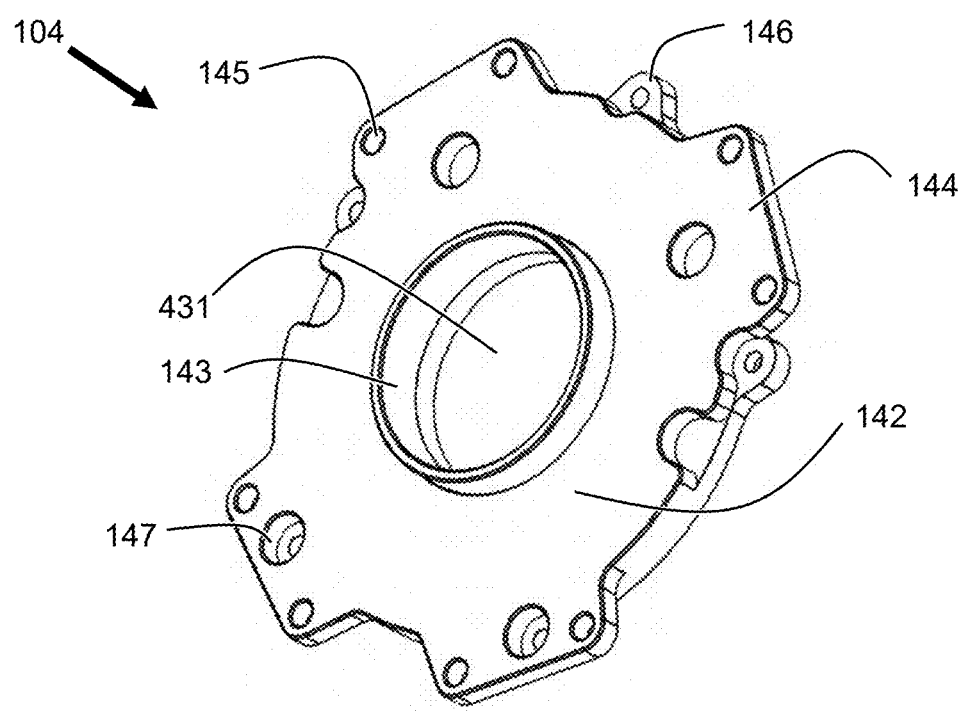
FIG. 24 shows a perspective view of an example of a front of a bracket according to a preferred embodiment of the present invention.
Figure 25:
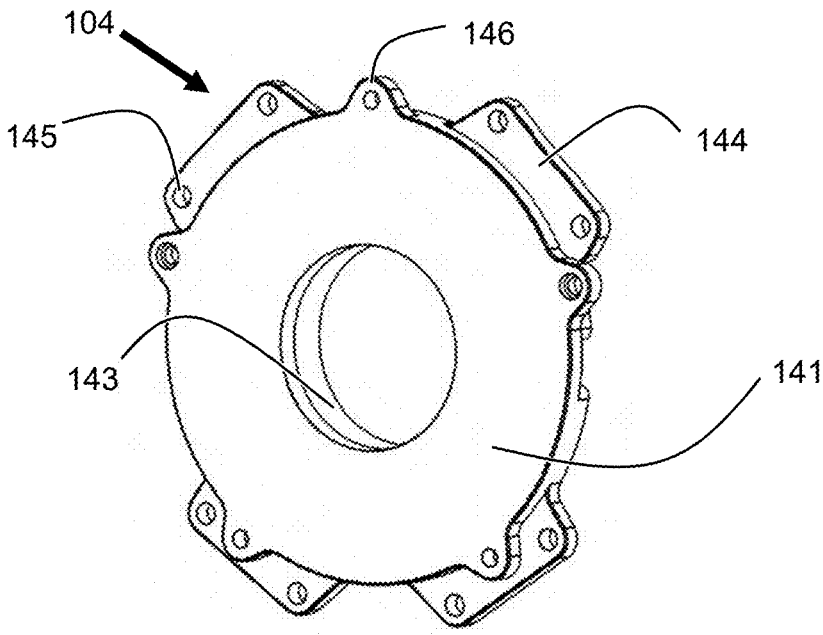
FIG. 25 shows a perspective view of an example of a rear of a bracket according to a preferred embodiment of the present invention.
Figure 26:
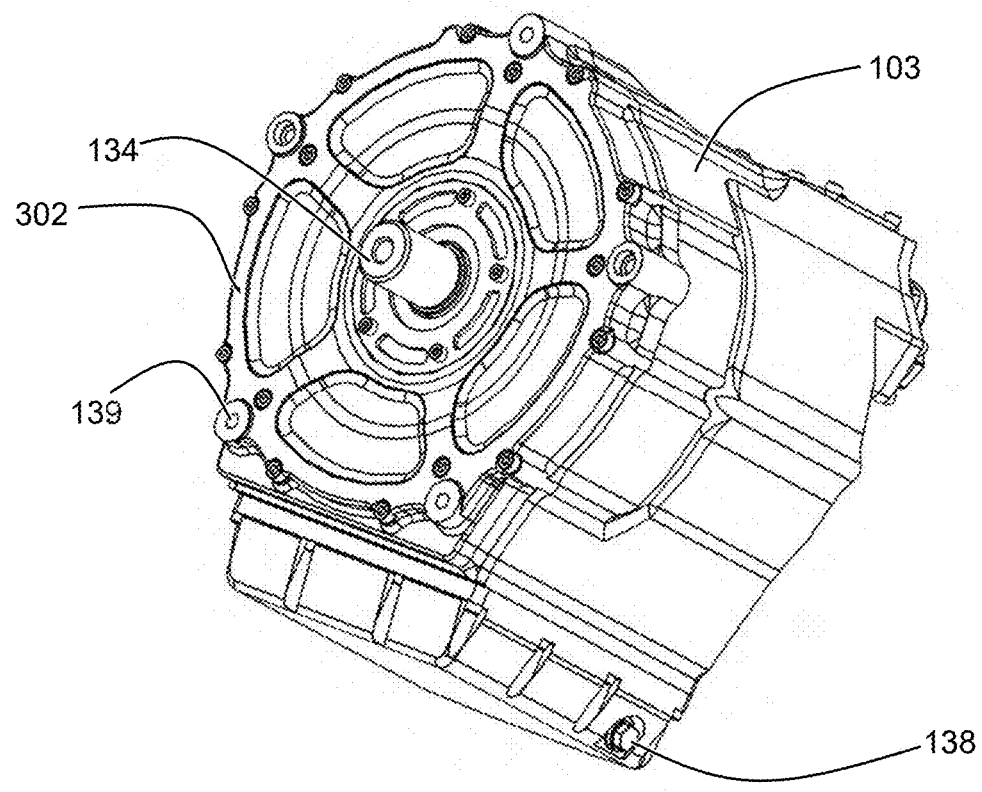
FIG. 26 shows a perspective view of an example of an exposed front of a motor according to a preferred embodiment of the present invention.
Figure 27:
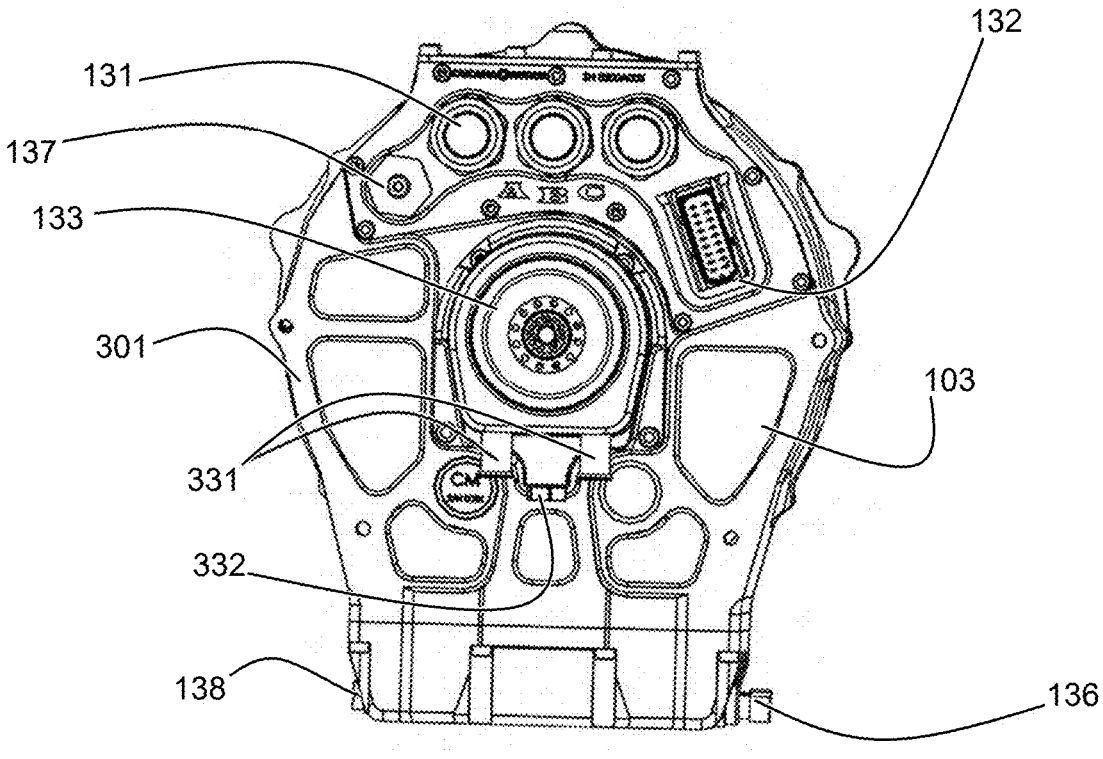
FIG. 27 shows a perspective view of an example of an exposed rear of a motor according to a preferred embodiment of the present invention.

As shown in FIGS. 24 and 25, the motor bracket 104 preferably includes an inner surface 141, and outer surface 142, a central collar 143, peripheral cars 144, through holes 145, fixing lugs 146, and recesses 147. The inner surface 141 is structured to contact a front surface 302 of the motor 103, as shown in FIG. 26. The outer surface 142 is structured to contact a front plate 121 of the frame housing 102. The central collar 143 is preferably defined by a curved ridged lip which extends out from the outer surface 142 of the motor bracket 104. A shaft 134 of the motor 103 passes through a central hole 431 of the motor bracket 104 which is surrounded by the central collar 143, as shown in FIGS. 25 and 26.

Figure 28:
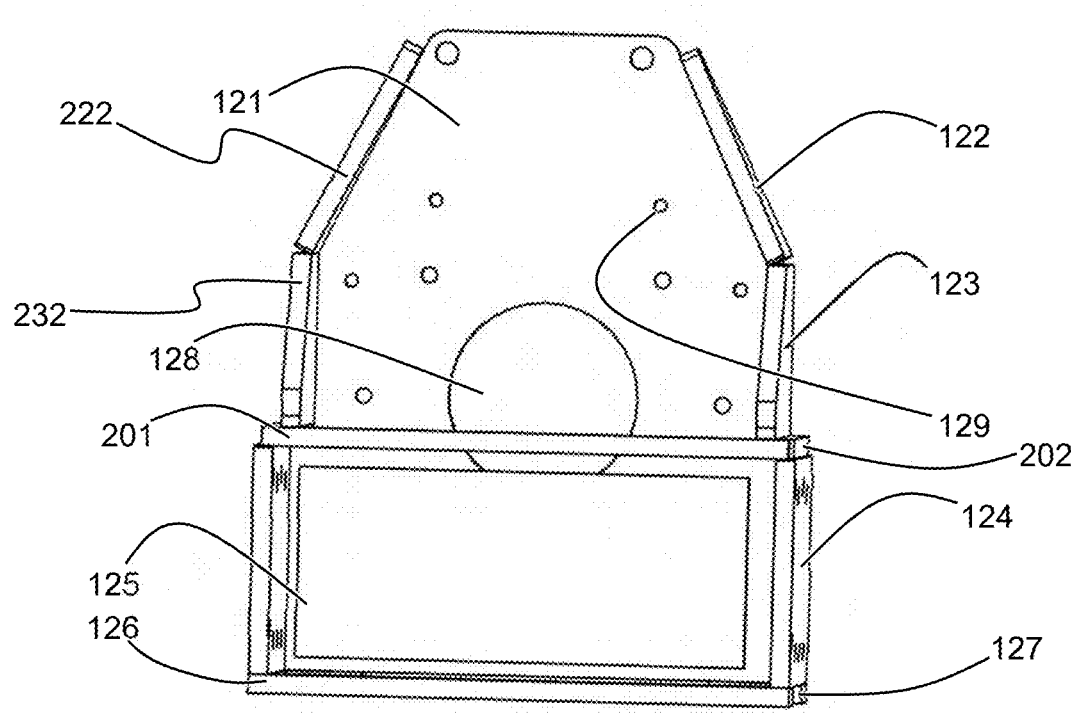
FIG. 28 shows an example of a rear view of a frame housing according to a preferred embodiment of the present invention.

The peripheral cars 144 include the through holes 145 that extend through the peripheral cars 144. Frame fixing bolts 451 are threaded through the through holes 145 of the peripheral cars 144 and into through holes 129 of the frame housing 102, which are shown in FIG. 28, for example. The frame fixing bolts 451 are used to firmly connect the motor bracket 104 to the frame housing 102. The fixing lugs 146 preferably include central holes which permit motor fixing bolts 461 to be threaded into bolt receiving holes 139 which are located on a front surface of the motor 103. Accordingly, the motor bracket 104 is structured to be fixedly connected to both the motor 103 and the frame housing 102.

As shown in FIGS. 21A-23, 26, and 27, the motor 103 preferably includes a rear surface 301, electrical contacts 131, a data connector 132, an oil pump 133, a shaft 134, a transmission shaft coupler 135, a temperature sensor 136, a ground connection 137, an oil drain plug 138, bolt receiving holes 139, and a front surface 302. The bolt receiving holes 139 are defined in the front surface 302 of the motor 103 and are structured to receive the motor fixing bolts 461.

The electrical contacts 131, the data connector 132, the oil pump 133, and the ground connection 137 are all preferably arranged on the rear surface 301 of the motor 103. The motor 103 is preferably, for example, a three-phase motor which includes three electric contacts 131 that are connected to individual power supply phases of the inverter 106. Specifically, the electric contacts 131 are preferably connected to electrical leads which extend between the electric motor 103 and the inverter 106. The data connector 132 is preferably connected to internal measurement and control electronics in the motor 103 including, for example, rotational position sensors, torque sensors, temperature sensors, voltage sensors, current sensors, speed sensors, etc. The ground 137 is preferably provided adjacent to the electric contacts 131 and the data connector 132 such that cables connected to the ground 137, the electric contacts 131, and the data connector 132 can be routed along a similar path.

Figure 23:
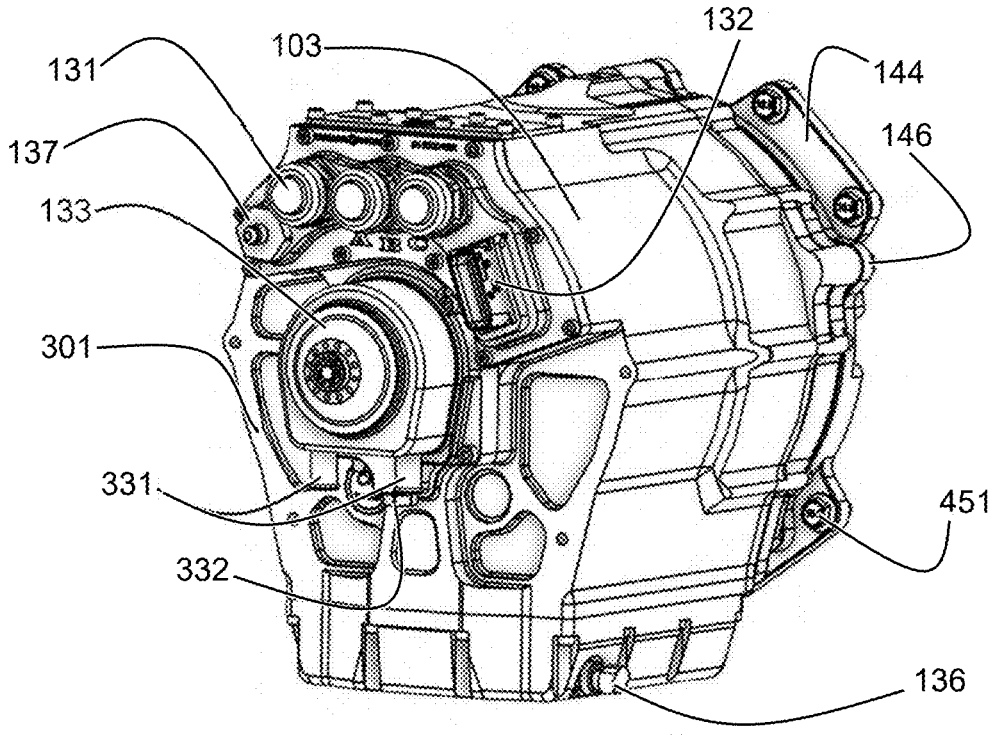
FIG. 23 shows a perspective view of an example of a rear of a motor with an attached bracket according to a preferred embodiment of the present invention.

The oil pump 133 is preferably structured to pump oil through the motor 103, for example through oil inlet/outlets 331, as shown in FIG. 23, for example. The oil pump 133 preferably further includes an oil drain plug 332 which is usable to drain oil stored in the oil pump 133. The temperature sensor 136 of the motor 103 is preferably connected to the oil inlet/outlets 331. The oil drain plug 138 is able to be removed to drain out oil from a sump of the motor 103.

The shaft 134 projects out from the front surface 302 of the motor 103 and engages with driven components of an elective vehicle. A transmission shaft coupler 135 is preferably affixed to the shaft 134 so that the shaft 134 can be rotatably connected to an input of the transmission 108. The transmission 108 is preferably a variable speed transmission or a hydrostatic transmission (HST), but could also be any other desirable type of vehicle transmission.

As shown in FIGS. 21A-21C, 28-31, and 33, the frame housing 102 preferably includes a front plate 121, pairs of upper side plates including a first upper side plate 122 and a second upper side plate 123, lower side plates 124, a rear plate 125, a rear bottom plate 126, bottom corner plates 127, a rear top plate 201, and side middle support plates 202. The frame housing 102 is structured to surround and support the motor 103 in a manner which protects sensitive portions of the motor 103 from being damaged by outside environmental elements while also allowing easy access to connectors of the motor 103, including, for example, the electrical contacts 131, the data connector 132, the oil pump 133, and the ground connection 137.

The front plate 121 preferably includes a central bore 128 which is structured to receive the central collar 143 of the motor bracket 104 when the frame fixing bolts 451 are threaded through the through holes 145 of the motor bracket 104 and the through holes 129 of the frame housing 102.

Figure 29:
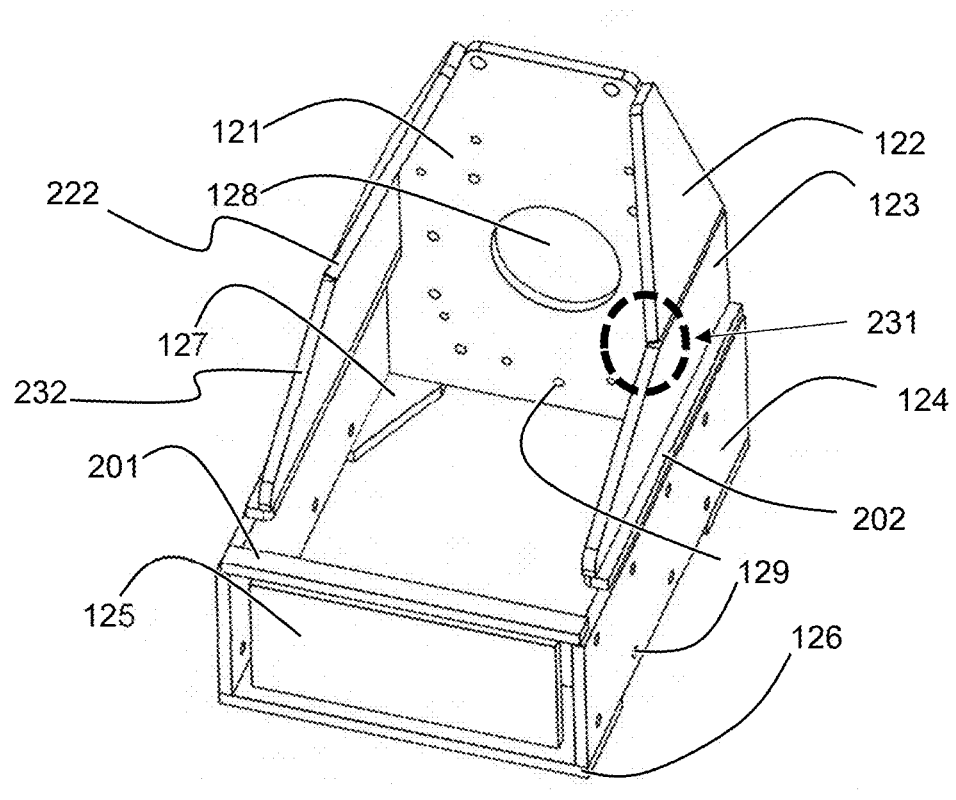
FIG. 29 shows an example of an upper perspective view of a frame housing according to a preferred embodiment of the present invention.
Figure 30:
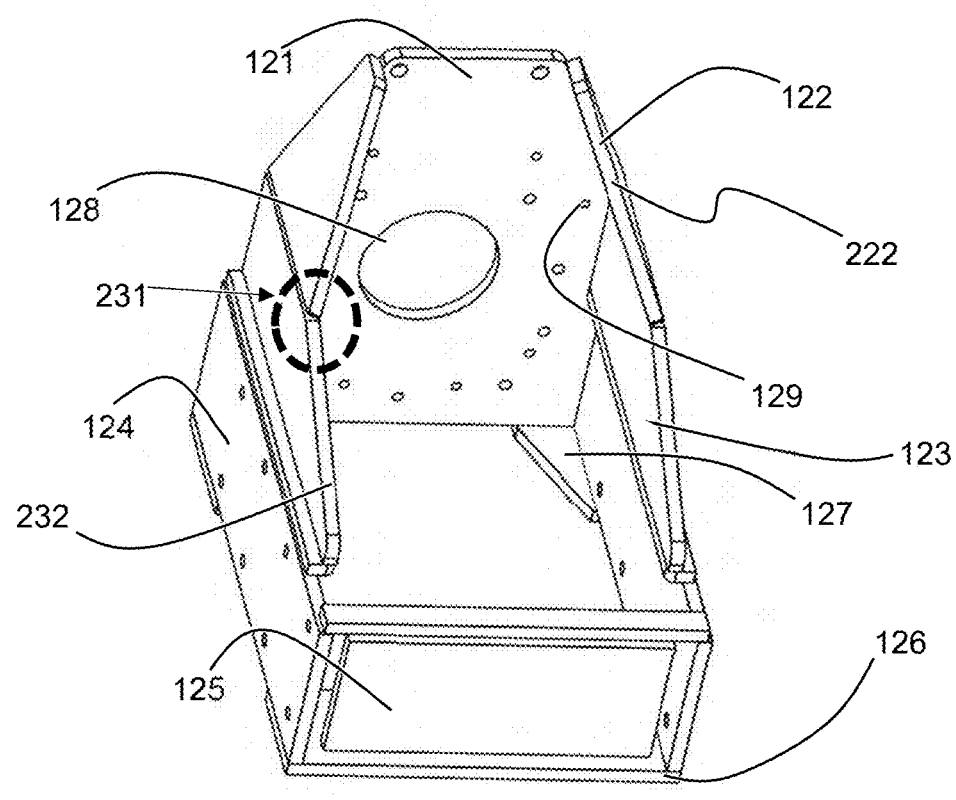
FIG. 30 shows an example of another upper perspective view of a frame housing according to a preferred embodiment of the present invention.
Figure 31:
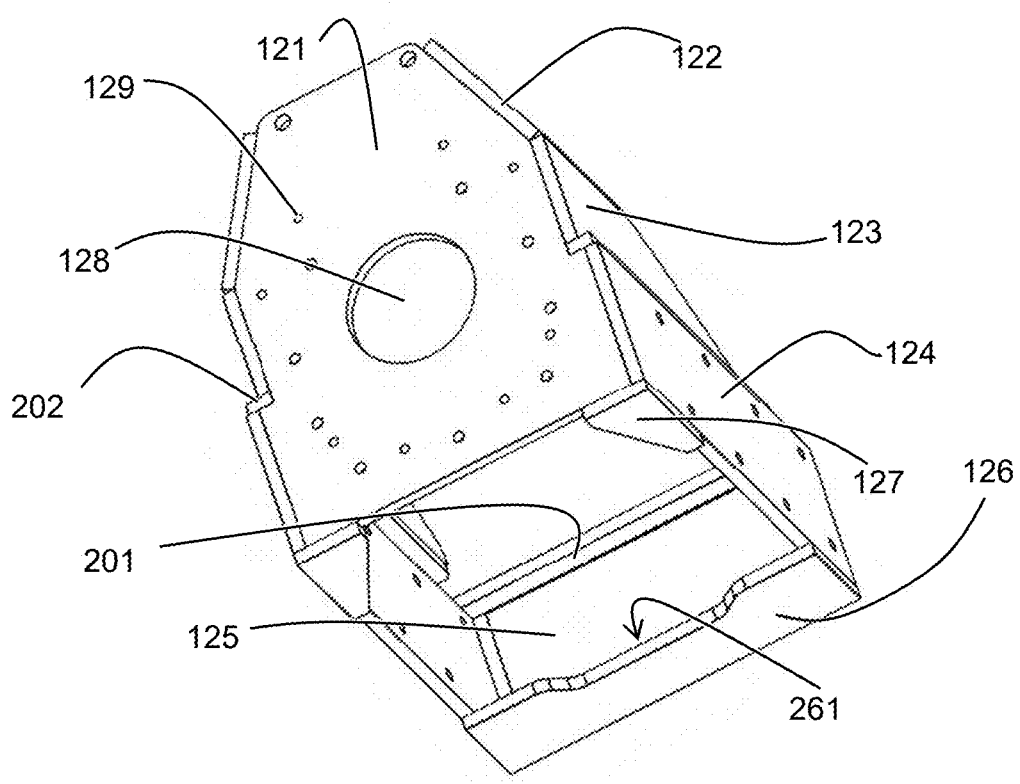
FIG. 31 shows an example of a lower perspective view of a frame housing according to a preferred embodiment of the present invention.

Further, transmission attachment bolts 218 are preferably threaded through the transmission 108 and into the front plate 121 to affix the motor assembly 101 to the transmission 108. As shown in FIGS. 29 and 30, the upper side surfaces of the front plate 121 are connected to the first upper side plates 122 and the second upper side plates 123. The first upper side plate 122 and the second upper side plate 123 are preferably, for example, welded to the front plate 121. The side middle support plates 202 are provided between the second upper side plates 123 and the lower side plates 124. The side middle support plates 202 are preferably, for example, welded to both the second upper side plates 123 and the lower side plates 124. Further, the lower side plates 124 are preferably affixed to portions of the chassis 105 through chassis attachment bolts 241, as shown in FIG. 23, for example.

A lower box portion of the frame housing 102 includes the lower side plates 124, the rear top plate 201, the rear plate 125, the bottom plate 126, and the bottom corner plates 127. The bottom corner plates 127 are preferably triangular in shape and are connected between the lower side plates 124 and the front plate 121. The rear top plate 201, the rear plate 125, and the bottom plate 126 are all preferably connected to rear portions of the lower side plates 124. All of the lower side plates 124, the rear top plate 201, the bottom plate 126, and the bottom corner plates 127 are preferably, for example, welded to one another. Further, the rear plate 125, is preferably welded to a portion of the chassis 105. As shown in FIG. 21, the bottom plate 126 preferably includes a recess 261. The recess 261 is structured to permit access to the bottom of the motor 103.

A notch 231 is preferably defined between directly adjacent rear portions of the first upper side plate 122 and the second upper side plate 123. More specifically, the first upper side plate 122 includes a first tapered portion 222 which is increasingly closer to the rear of the motor assembly 101 as the first upper side plate 122 extends downward, and the second upper side plate 123 includes a second tapered portion 232 which is increasingly closer to the rear of the motor assembly 101 as the second upper side plate 123 extends downward. The notch 231 is preferably defined by the lowermost portion of the first tapered portion 222 and the uppermost portion of the second tapered portion 232. At least a portion of the notch 231 is preferably located at a vertical position that is lower than a vertical position of the electric contacts 131 such that at least a portion of the connector 131 is above the notch 231, as shown in FIGS. 21A-21C. Further, at least a portion of the electric contacts 131 is above the second tapered portion 232. However, it is also possible for the notch 231 to be at a same overlapping vertical position of the contacts 131.

As shown in FIG. 21B, the notch 231 is located under an imaginary line 2223 which extends from an uppermost point of the first tapered portion 222 to a lowermost point of the second tapered portion 232. A first taper angle 223 is defined between a horizontal direction and the first tapered portion 222, and a second taper angle 233 is defined between a horizontal direction and the second tapered portion 232. The first taper angle 223 is preferably greater than the second taper angle 233. Further, as shown in FIG. 21C, the first upper side plates 122 are preferably angled inward towards a center point of the rear surface 301 of the motor 103 such that the first tapered portions 222 become closer to the center point of the rear surface 301 of the motor 103 as the first upper side plates 122 extend upwards.

FIG. 32 shows a bottom view of a portion of a vehicle according to a preferred embodiment of the present invention. The vehicle is preferably a tractor. As shown in FIG. 32, the vehicle preferably includes a chassis 105 with opposing frame rails 151, a front wheel support frame 152 connected between the opposing frame rails 151, and front wheels 153 connected to the lateral ends of the front wheel support frame 152. The motor assembly 101 is affixed to straddle the opposing frame rails 151 at a position rearward of the front wheel support frame 152 in a front-rear direction of the vehicle. The inverter 106 is located forward of the motor assembly 101 and rearward of an On Board Battery Charger (OBC) 107. The OBC is preferably connected to a battery pack which is located above the opposing frame rails 151 and the OBC 107.

As further shown in FIG. 32, at least a portion of the electric motor 103 is preferably located to a rear of the front wheel support frame 152 and at least a portion of the inverter 106 is preferably located to a front of the front wheel support frame 152. Accordingly, the electric motor 103 is preferably located farther from a front of the vehicle than the inverter is. Further, the pair of frame rails 151 preferably extends from a front of the vehicle, past the front wheel support frame 152, and to the motor assembly 101.

Figure 33:
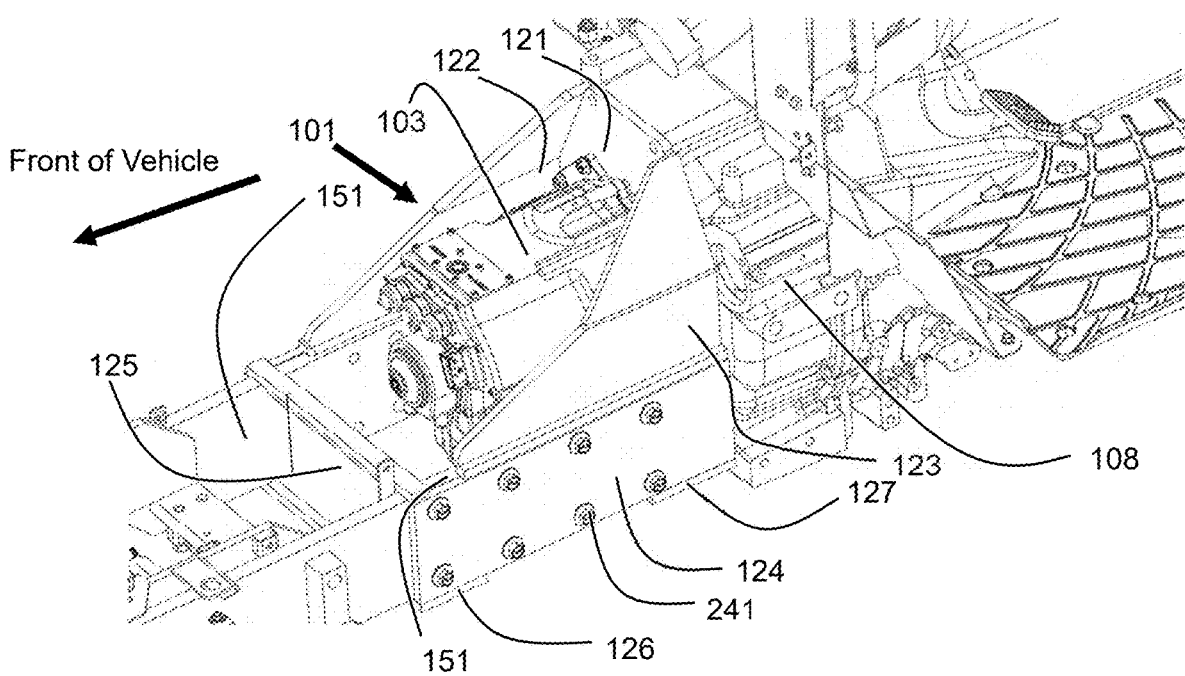
FIG. 33 shows a perspective view of a portion of a vehicle according to a preferred embodiment of the present invention.

FIG. 33 shows a perspective view of a portion of a vehicle according to a preferred embodiment of the present invention. As noted above, the rear of the motor 103 is preferably located to oppose the front of the vehicle. Further, the opposing frame rails 151 are preferably fit into the motor assembly 101 between the lower side plates 124 and the rear plate 125 and also between the lower side plates 124 and the front plate 121. The motor assembly 101 is preferably fastened to the opposing frame rails 151 through the chassis attachment bolts 241.

The electric contacts 131 are provided on a rear surface of the motor 103 such that the electric contacts 131 are opposed to the inverter 106 to facilitate a connection between the electric contacts 131 to the inverter 106 using electrical cables. The inverter 106 is preferably a three-phase inverter which supplies three individual/different phases of power to the three electric contacts 131.

Figure 34:
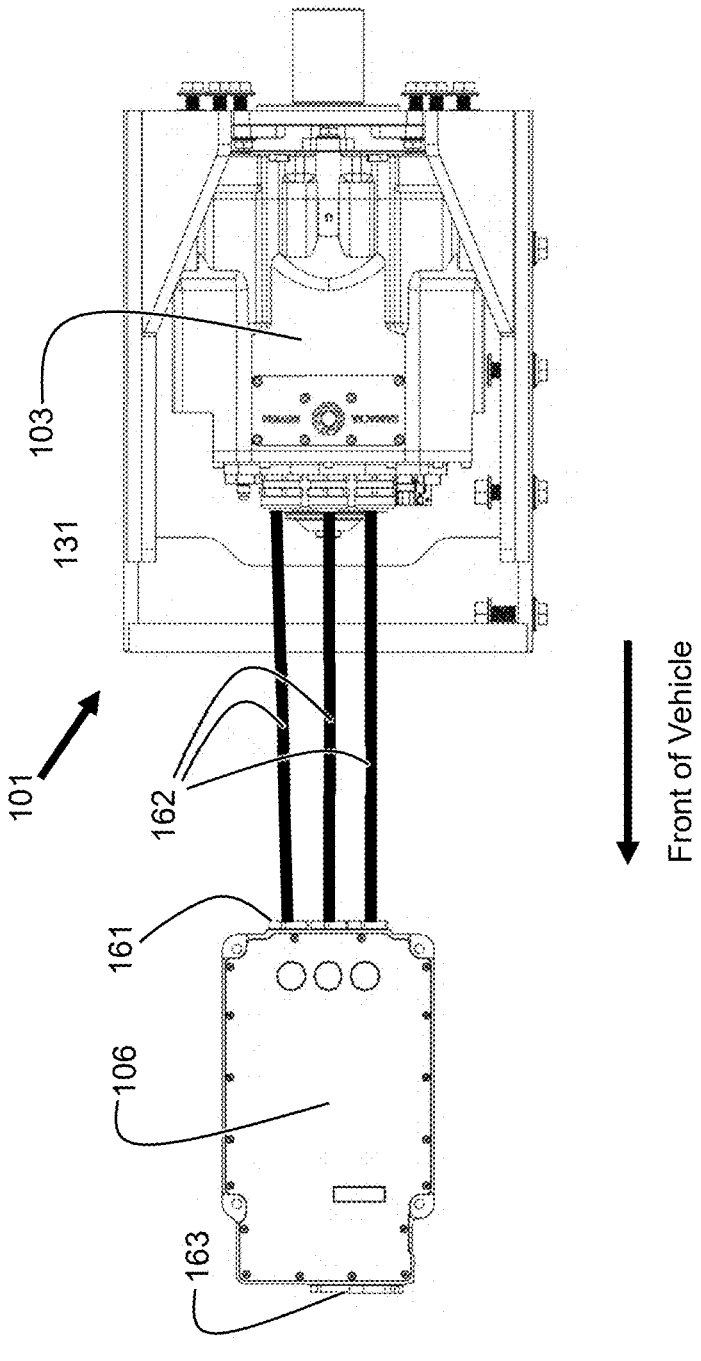
FIG. 34 shows a schematic of a preferred electrical connection between an inverter and a motor according to a preferred embodiment of the present invention.

FIG. 34 shows a schematic of a preferred electrical connection between the inverter 106 and the motor 103. The inverter preferably includes inverter terminals 161 which are connected to the electrical contacts 131 of the motor 103 through lead wires 162. There are preferably three inverter terminals 161 which are respectively connected to individual ones of the three electrical contacts 131. The inverter 106 preferably further includes a High Voltage DC (HVDC) terminal 163 which is used to connect the inverter 106 to the Power Distribution Unit (PDU) which is housed in the PDU housing 20A of the vehicle previously described. As shown in FIG. 34, the HVDC terminal 163 of the inverter 106 faces in the forward (front) direction of the vehicle. As shown in FIG. 20, the PDU which is housed in the PDU housing 20A is located forward of the inverter 106. As shown in FIG. 2, the PDU is connected to the HVDC terminal of the inverter.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An electric vehicle (EV) comprising:
a battery pack;
an electric motor;
an inverter connected to the electric motor;

a power distribution unit (PDU) connected to the battery pack and the inverter; and a first EV emergency stop switch located at a front surface of the EV;

a second EV emergency stop switch located at a left side surface of the EV;

a third EV emergency stop switch located at a right side surface of the EV; and a fourth EV emergency stop switch located at a rear surface of the EV; wherein each of the first, second, third, and fourth EV emergency stop switch is configured to disconnect the battery pack from the power distribution unit (PDU) when the respective EV emergency stop switch is activated by opening contactors in the battery pack and contactors in the PDU.

2. The EV according to claim 1, wherein the first EV emergency stop switch is located at a side corner portion of the EV.

3. The EV according to claim 1, wherein the first EV emergency stop switch is located at side corner portion of the EV; and the first EV emergency stop switch extends at an angle of less than about 90 degrees and greater than about 45 degrees with respect to a front-rear direction of the EV.

4. The EV according to claim 1, further comprising:

a fifth EV emergency stop switch located at a rear surface of the EV; wherein the fifth EV emergency stop switch configured to disconnect the battery pack from the power distribution unit (PDU) when the second EV emergency stop switch is activated.

5. The EV according to claim 4, wherein the fifth EV emergency stop switch is located on a right rear fender of the EV or a left rear fender of the EV.

6. The EV according to claim 1, wherein the second EV emergency stop switch or the third EV emergency stop switch is located on a cabin frame beam of the EV.

7. The EV according to claim 1, further comprising:

a drive-by-wire (DBW) system including a first mode of operation and a second mode of operation; and a DBW emergency stop switch configured to switch the drive-by-wire (DBW) system from the first mode of operation to the second mode of operation when the DBW emergency stop switch is activated.

8. The EV according to claim 7, wherein the DBW emergency stop switch is located on a dashboard of the EV.

9. The EV according to claim 7, wherein in the first mode of operation, the drive-by-wire (DBW) system controls functions of steering, braking, and acceleration of the EV; and in the second mode of operation, drive-by-wire (DBW) functions of steering, braking, and acceleration of the EV are disabled.

10. An electric vehicle (EV) comprising:

a battery pack;

a power distribution unit (PDU) connected to the battery pack;

a first EV emergency stop switch located at a front surface of the EV;

a second EV emergency stop switch located at a left side surface of the EV;

a third EV emergency stop switch located at a right side surface of the EV; and a fourth EV emergency stop switch located at a rear surface of the EV; wherein each of the first, second, third, and fourth EV emergency stop switch is configured to disconnect the battery pack from the power distribution unit (PDU) when the respective EV emergency stop switch is activated by opening contactors in the battery pack and contactors in the PDU.

11. The EV according to claim 10, wherein the first EV emergency stop switch is located at a side corner portion of the EV.

12. The EV according to claim 10, wherein the first EV emergency stop switch is located at side corner portion of the EV; and the first EV emergency stop switch extends at an angle of less than about 90 degrees and greater than about 45 degrees with respect to a front-rear direction of the EV.

13. The EV according to claim 10, wherein the third emergency stop switch is located on a left cabin frame beam of the EV; and the fourth emergency stop switch is located on a right cabin frame beam of the EV.

14. The EV according to claim 10, further comprising:

a drive-by-wire (DBW) system including a first mode of operation and a second mode of operation; and a DBW emergency stop switch configured to switch the drive-by-wire (DBW) system from the first mode of operation to the second mode of operation when the DBW emergency stop switch is activated; wherein the DBW emergency stop switch is located on a dashboard of the EV.

15. The EV according to claim 14, wherein in the first mode of operation, the drive-by-wire (DBW) system controls functions of steering, braking, and acceleration of the EV; and in the second mode of operation, drive-by-wire (DBW) functions of steering, braking, and acceleration of the EV are disabled.

* * * * *